(12) United States Patent
Meyer et al.

(10) Patent No.: US 7,783,500 B2
(45) Date of Patent: Aug. 24, 2010

(54) PERSONNEL RISK MANAGEMENT SYSTEM AND METHODS

(75) Inventors: Mark Gregory Meyer, Denton, MD (US); Darrell Bruce McIndoe, Brookeville, MD (US)

(73) Assignee: iJET International, Inc., Annapolis, MD (US)

( * ) Notice: Subject to any disclaimer, the term of this patent is extended or adjusted under 35 U.S.C. 154(b) by 1511 days.

(21) Appl. No.: 11/067,666

(22) Filed: Feb. 28, 2005

(65) Prior Publication Data

US 2005/0182722 A1 Aug. 18, 2005

Related U.S. Application Data

(63) Continuation-in-part of application No. 10/947,435, filed on Sep. 23, 2004, now Pat. No. 7,343,303, which is a continuation-in-part of application No. 09/619,245, filed on Jul. 19, 2000, now Pat. No. 6,842,737.

(51) Int. Cl.
*G06Q 99/00* (2006.01)
(52) U.S. Cl. ..................................... 705/1.1
(58) Field of Classification Search ............... 705/1, 705/1.1

See application file for complete search history.

(56) References Cited

U.S. PATENT DOCUMENTS

| | | | | |
|---|---|---|---|---|
| 5,768,578 A | 6/1998 | Kirk et al. | .................. | 707/100 |
| 5,806,040 A | 9/1998 | Petruzzi | ...................... | 705/36 |
| 5,819,284 A | 10/1998 | Farber et al. | ................ | 709/203 |
| 6,009,408 A | 12/1999 | Buchanan | .................... | 705/11 |
| 6,067,539 A | 5/2000 | Cohen | .......................... | 707/2 |
| 6,418,417 B1 | 7/2002 | Corby et al. | .................. | 705/35 |
| 6,606,605 B1 | 8/2003 | Kolls | | |
| 6,662,195 B1 | 12/2003 | Langseth et al. | ........... | 707/200 |
| 6,697,824 B1 | 2/2004 | Bowman-Amuah | | |
| 6,785,274 B2 | 8/2004 | Mahajan et al. | ............ | 370/390 |
| 6,842,737 B1 | 1/2005 | Stiles et al. | | |
| 6,937,147 B2 * | 8/2005 | Dilbeck et al. | ............. | 340/506 |
| 2001/0027388 A1 | 10/2001 | Beverina et al. | | |
| 2001/0047264 A1 | 11/2001 | Roundtree | .................. | 704/275 |
| 2002/0051540 A1 | 5/2002 | Glick et al. | | |
| 2002/0100803 A1 | 8/2002 | Sehr | | |
| 2003/0189590 A1 * | 10/2003 | Carman | ..................... | 345/733 |
| 2003/0225612 A1 * | 12/2003 | DeSimone et al. | ........... | 705/13 |
| 2003/0225687 A1 | 12/2003 | Lawrence | .................... | 705/38 |
| 2004/0000585 A1 | 1/2004 | Silverbrock et al. | | |

(Continued)

FOREIGN PATENT DOCUMENTS

WO WO 2004/061596 7/2004

OTHER PUBLICATIONS

"iJet and Airo Wireless Partner to Combine Real-time Travel Alerts with Pinpoint-Accurate Location Solution In Single Mobile Phone," iJet Press Release, Sep. 13, 2003.*

(Continued)

*Primary Examiner*—Jonathan Ouellette
(74) *Attorney, Agent, or Firm*—Wolff Law Offices, PLLC; Kevin A. Wolff

(57) ABSTRACT

A method and system for providing expatriate risk management are disclosed. The method includes receiving intelligence from at least one intelligence source, receiving asset information, and generating a risk assessment report based on the intelligence and an employee profile.

21 Claims, 56 Drawing Sheets

U.S. PATENT DOCUMENTS

| | | | |
|---|---|---|---|
| 2004/0039617 A1 | 2/2004 | Maycotte et al. | 705/5 |
| 2004/0107125 A1 | 6/2004 | Guheen et al. | |
| 2004/0166879 A1* | 8/2004 | Meadows et al. | 455/456.1 |
| 2004/0215551 A1* | 10/2004 | Eder | 705/38 |
| 2005/0013417 A1 | 1/2005 | Zimmers et al. | |
| 2005/0015362 A1 | 1/2005 | Ostertag et al. | |

OTHER PUBLICATIONS

International Search Report and Written Opinion dated Aug. 17, 2007.

iJET Press Release from website, *iJET and AIRO Wireless Partner to Combine Real-Time Travel Alerts with Pinpoint-Accurate Location Solution in Single Mobile Phone*, dated Sep. 15, 2003.

International SOS (an AEA Company) Global Security Services "The Most Effective Call for Help is Still SOS," article cited by Examiner.

iJET Press Release from website, *iJET Launches Worldcue® Expat*, dated Feb. 19, 2003.

Examination Report for UK IPO, Application No. GB0707794.4—Dated Sep. 7, 2009 (4Sheets).

* cited by examiner

| General | Comments | Metadata | Primary Contact | Alt Contact | Ratings |

Source Owner: Overseas Security Advisory Council
Source Address 1: Bureau of Diplomatic Security
Source Address 2: U.S. Department of State
Source City: Washington  State: DC
Postal Code: 20522-1003  Country: USA
Source POC:
Source Telephone: 202-663-0533  Source Fax: 202-663-0868
Source Email: osac@dsmail.state.gov  Source URL:

[Update] [Cancel]

Copyright 2004 iJET Travel Intelligence, Inc. All rights reserved.

| Primary Profile <First Name> <Last Name> | Print | Save |

- 4101 — Profile
- 4102 — User Preferences
- 4103 — Emergency Contact
- 4104 — Travel Documents
- 4105 — Personal Info
- 4106 — Medical Info
- 4107 — Vehicles
- 4108 — Images
- 4109 — Trip Profile
- 4110 — Configure Reports

- Last Name — 4111
- First Name — 4112
- Middle Name — 4113
- Employee ID — 4114
- Alt Employee ID — 4115
- National ID (SSN) — 4116
- Citizenship 1 — 4117
- Citizenship 2 — 4118
- Birthplace — 4119
- Date of Birth — 4120
- Gender — 4121
- Primary E-Mail — 4122
- Alt E-Mail 1 — 4123
- Alt E-Mail 2 — 4124

Photo — 4125

Primary Contact Information — 4126

- E-Mail
- Phone Day
- Phone Night
- Phone Mobile
- FAX
- Pager
- Other
- Street Address
- City
- Country
- Postal Code Copyright 2005 iJET Travel Intelligence, Inc. All rights reserved.

| Primary Profile <First Name> <Last Name> | Print | Save |

- 4101 — Profile
- 4102 — User Preferences
- 4103 — Emergency Contact
- 4104 — Travel Documents
- 4105 — Personal Info
- 4106 — Medical Info
- 4107 — Vehicles
- 4108 — Images
- 4109 — Trip Profile
- 4110 — Configure Reports Add Passport — 4128
Add Visa — 4129

X [E] Passport Information — 4127

Passport Country: _____
Passport Number: _____
Passport Expiration [Day] [Month] [Year]
Place of Issue: _____

X [E] Visa Information

— 4130

Copyright 2005 iJET Travel Intelligence, Inc. All rights reserved.

| Primary Profile <First Name> <Last Name> | Print | Save |

- 4101 — Profile
- 4102 — User Preferences
- 4103 — Emergency Contact
- 4104 — Travel Documents
- 4105 — Personal Info
- 4106 — Medical Info
- 4107 — Vehicles
- 4108 — Images
- 4109 — Trip Profile
- 4110 — Configure Reports 4144
Blood Type    Select from List
Notes [           ]

Allergies — 4145
Select from List   ADD >>
                   << REMOVE

4146
Chronic Conditions
Select from List   ADD >>
                   << REMOVE Add Medical Contact X [E] Type  First_Name  Last_Name  △▽

4147
- E-Mail
- Phone Day          Phone Night
- Phone Mobile       FAX
- Pager              Other
- Street Address
- City
- Country
- Postal Code Copyright 2005 iJET Travel Intelligence, Inc. All rights reserved.

Group Profile

Add Group — 4160

4161 — X [E] Group_Name  Group_Type   Add Member △▽

4162 — X [E] Relationship  First_Name Last_Name   △▽

View Profile

- E-Mail
- Phone Day
- Phone Night
- Phone Mobile
- FAX
- Pager
- Other
- Street Address
- City
- Country
- Postal Code

— 4163

Copyright 2005 iJET Travel Intelligence, Inc. All rights reserved.

*Fig. 41f*

FIG. 43 worldcue® PRO

| AIRLINE | DATE | DESTINATION | HOTEL | CSAR |

From date: 02/22/2005  clear
To date:  clear
Limit to Company:
— All —
Include Sub-Companies: ☐
Detail Level: Simple Results

[SEARCH]  [PRINT RESULTS]

4504 — Contact Selected Traveler

[World Map]  [Feedback]  [HELP]

POWERED BY ijet® TRAVEL RISK MANAGEMENT

4500

4501 — 9 matching Travelers/Trips 4502  4503

| Traveler | Company | Trip Name | Contact |
|---|---|---|---|
| holly croyle | iJET Employees | Trip to Worldwide ⊙ | ☐ |
| AR Greene | iJET Employees | Trip to Panama ⊙ | ☐ |
| Terrie Lanham | iJET Employees | Trip to Sierra Leone ⊙ | ☐ |
| Notraveler Link | iJET Employees | Trip to Luxembourg ⊙ | ☐ |
| Traveler Linkless | iJET Employees | Trip to Peru ⊙ | ☐ |
| Brian McVeigh | iJET Employees Tech | Brazil | ☐ |
| Stefani Papula | iJET Employees | Trip to London ⊙ | ☐ |
| Jennifer | iJET | Trip to Kuwait | ☐ |

⊙ indicates a Worldcue® TRAVELER itinerary https://worldcue.ijet.com/tic/tracker/SearchByDate.action#

Copyright 2005 iJET Travel Intelligence, Inc. All rights reserved.

PERSONNEL RISK MANAGEMENT SYSTEM AND METHODS

This application is a continuation-in-part of U.S. patent application Ser. No. 10/947,435, filed Sep. 23, 2004, now U.S. Pat. No. 7,343,303 which is a continuation-in-part of U.S. patent application Ser. No. 09/619,245, now U.S. Pat. No. 6,842,737, filed Jul. 19, 2000, the entire disclosures of which are hereby incorporated by reference as if set forth fully herein.

This disclosure contains information subject to copyright protection. The copyright owner has no objection to the facsimile reproduction by anyone of the patent disclosure or the patent as it appears in the U.S. Patent and Trademark Office files or records, but otherwise reserves all copyright rights whatsoever.

BACKGROUND OF THE INVENTION

1. Field of the Invention

The present invention generally relates to a system and methods for risk management; more particularly, the present invention relates to a system and methods for assessing and mitigating risk associated with one or more assets.

2. Background Information

Millions of travelers and people living abroad are afflicted with problems each year, problems involving their health and safety, the timeliness and quality of their trip or assignment, and their familiarity with their trip destination or assignment location. Further, asset managers and security directors must assess and/or mitigate increased risk to assets such as people or facilities caused by a variety of factors such as security threats or transportation issues. These problems cost time, money, and even lives. Whenever a travel problem or in-country threat event occurs, however, typically the information necessary to avoid it, or solve it, is available somewhere, if only the traveler, employee, expatriate, or asset manager had known about it. Thus, there is a pressing need to develop a system which continually monitors the world for pertinent travel- and location-related information, on the one hand, and on the other hand, delivers relevant information to travelers, expatriates, or asset managers when, where, and how they need to use this information.

SUMMARY OF THE INVENTION

The method and system of the present invention have met the above-described needs by providing a method and system for the automated delivery of travel information when, where, and how travelers need it.

The invention provides a method for providing travel-related information to a consumer having a consumer-specific profile. This method includes acquiring information from at least one information source; transforming the acquired information into information pertinent to travel related activities; using rules for applying the transformed travel information to the consumer-specific travel profile; and, creating a product for said consumer indicative of the results of the application of the transformed travel information to the consumer-specific travel profile. A system implementation of this method is also provided in another aspect of the invention. It can be appreciated that the invention can also be embodied in a computer-readable medium.

In a further aspect of the invention, an information system segment is provided that is structured for use in a system for providing travel related information to a consumer with a consumer-specific profile. This information system segment includes a collection subsystem for obtaining information from at least one data source; an analysis subsystem for filtering the obtained information to identify its travel related characteristics; and, a distribution/storage subsystem for directing the filtered data to at least one portion of the system for providing travel related information.

It is therefore an object of the present invention to provide, in one aspect, a system based on five elements: a global operations center, which continuously collects, analyzes, and processes information pertaining to travel from at least one information source; a data store for holding the information; a profiling system, for capturing and maintaining traveler profiles; a rules engine for applying rules pertaining to travel based on the traveler's profile; and a plurality of online products that incorporate and deliver the relevant travel information.

It is a further object of the invention to provide, in another aspect, a continuous creation of information in an intelligence operations center, and its storage in the data store, to provide travel related information on a plurality of global destinations.

It is a further object of the invention to provide, in another aspect, a profiling system that captures a traveler's profile, triggers the application of relevant rules (e.g. if the traveler has a respiratory problem, and the altitude of the destination is sufficiently high, then a warning notice will be retrieved), and retrieves pertinent information from the data store.

It is a further object of the invention, in another aspect, to package travel information in an electronic product and deliver that product in an on-line environment.

It is a further object of the invention to provide, in another aspect, connectivity with an external, global airline reservation system, such that the invention is associated with the act of buying an airline ticket, for example, as well as for boats, trains, and other similar consumer transportation.

Furthermore, embodiments may include receiving travel intelligence from at least one travel intelligence source, receiving asset information from at least one asset information source, and generating a risk assessment report based on the travel intelligence and the asset information.

In addition, embodiments may include maintaining an employee or expatriate profile for one or a group of expatriates and their dependents. Such embodiments may also include receiving travel or location related intelligence from at least one travel intelligence source, maintaining employee or expatriate asset information from at least one asset information source, and outputting risk assessment reports based on the travel or location related intelligence and the asset information.

These and other objects of the present invention will be more fully understood from the following description of the invention and by reference to the figures and claims appended hereto.

BRIEF DESCRIPTION OF THE DRAWINGS

A full understanding of the invention can be gained from the following detailed description of the invention when read in conjunction with the accompanying drawings in which:

FIGS. 29a and 29b are exemplary general interactive pages showing general details associated with a source according to at least one embodiment;

FIG. 32 is an exemplary contact interactive page showing contact information associated with a source according to at least one embodiment;

FIG. 33 is an exemplary source ratings page according to at least one embodiment;

FIGS. 41a through 41f are example profile information pages in accordance with at least one embodiment;

FIG. 43 is an example employee profile interactive page according to at least one embodiment;

FIGS. 45a through 45c are example query results interactive pages according to at least one embodiment;

DETAILED DESCRIPTION OF THE EMBODIMENTS

Travel Information Logical and Functional Architectures

In the method and system of the present invention, a logical architecture and its corresponding functional architecture are provided that can operate on an Internet-based information exchange medium or another similarly structured and suitable medium. This architecture permits a breadth of information sources from which information related to travel, in particular, can be gathered, transformed and provided to a consumer in the form of a product and/or service.

As used herein, the term "travel-related information" includes any information which is related to a particular mode of travel or travel destination. As used herein, a "consumer" can be an individual, a plurality of individuals, a company, and/or any other entity that uses travel-related information. As used herein, a "consumer-specific profile" can include any information that relates to a consumer's travel preferences, such as, but not limited to, any one or more of the following: destination, mode of travel, health condition of traveler, travel risks associated with a particular destination, and the like. An "information source" as used herein can be any electronic, written, verbal or other source from which data can be derived. A "product" as used herein can refer to a product and/or a service.

Figure 1:
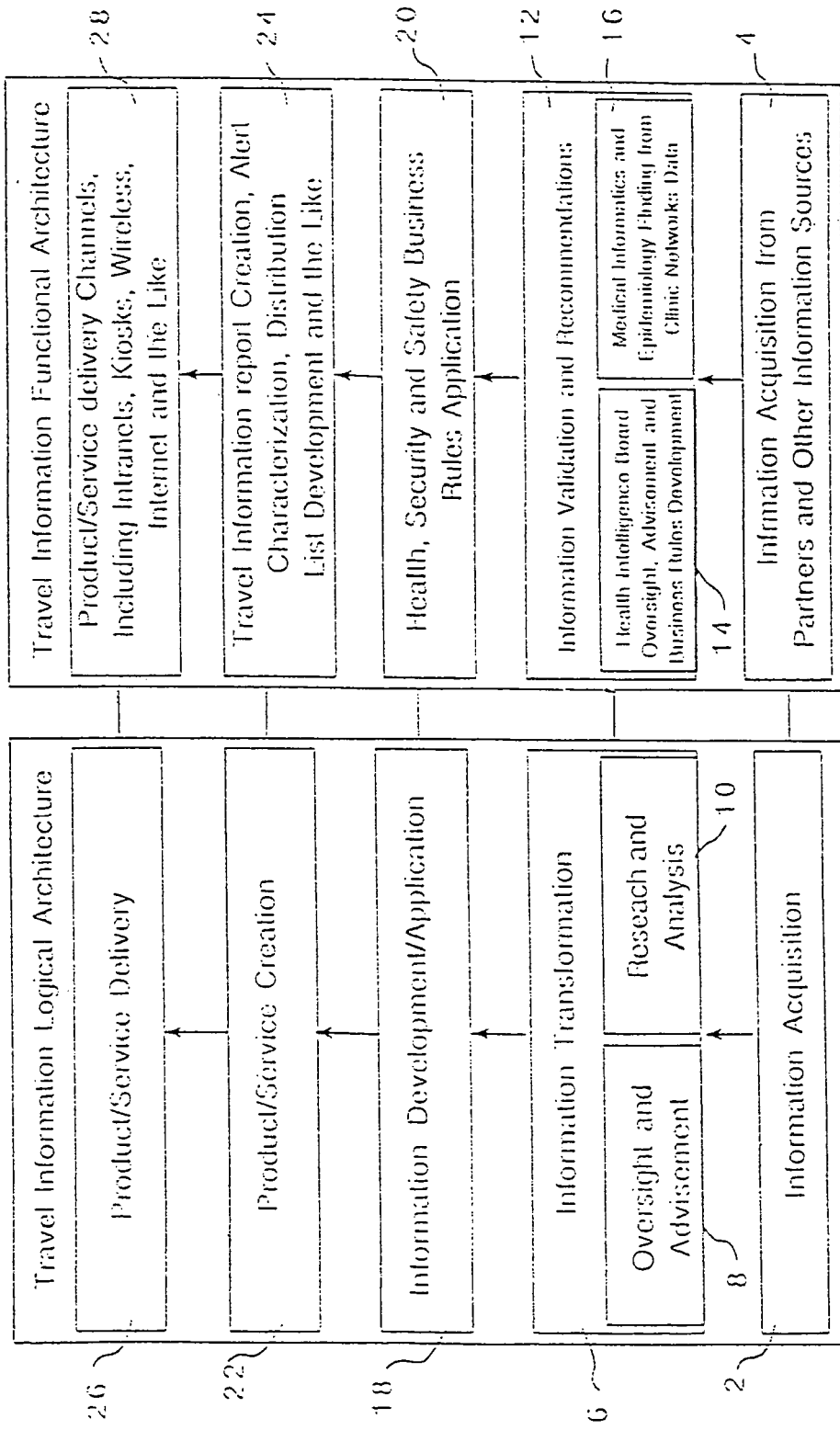
FIG. 1 is a logical and functional architecture diagram showing an embodiment of the method and system of the present invention.

Referring now to FIG. 1, in the form of the invention shown, the method and system of the present invention can be represented as five architectural layers that represent data processing from information acquisition to product/service delivery. In the information acquisition layer 2, information regarding travel can be acquired from information sources 4 such as other Internet sites. In performing the function of information acquisition, these information sources 4 may or may not be partnered with the home Internet site from which travel analysis is delivered to the individual consumer.

Referring again to FIG. 1, in the information transformation layer 6, data retrieved from information sources in layer 2 are processed through at least two logical steps in the method and system architecture: one is an oversight and advisement step 8 and another is the research and analysis step 10. A functional architecture of the invention corresponding to the information transformation 6 logical architecture can be provided that can be designated as an information validation and recommendations 12 function. The oversight and advisement step 8 can include, for example, processing acquired data through a health information board, performing an advisement function, and developing business rules 14 for treatment of current and future travel data related to health and medicine. The research and analysis step 10 of the information transformation layer 6 can include, for example, applying medical information and epidemiology findings from clinic networks 16 that are researching the status of communicable diseases at a given travel destination. In the information transformation layer 6, data acquired is validated and recommendations for further processing of that acquired data through the travel method and system of the invention are developed.

Referring again to FIG. 1, in the information development/application step 18, business rules, some of which can be substantially continuously and dynamically generated in the oversight and advisement step 8 of the method and system, are applied to the travel data. In this step 18, factors such as health, security and safety business rules 20 are determined and applied relative to the acquired and transformed travel data. In the product/service creation step 22 of the method and system of the present invention, a report is generated 24 for use by a consumer to evaluate a decision regarding travel to a particular country or region of the world. Also, in this step 22, activities such as alert characterization and distribution list development 24 (discussed in more detail hereinafter) are produced and provided as products/services for the consumer.

Referring again to FIG. 1, product/service delivery 26 occurs with regard to providing the travel information to a consumer. In this step 26, the consumer receives desired information regarding travel to and from a particular location of the world. The product/service delivery step 26 can be performed through a variety of suitable delivery channels 28, including without limitation, the Internet, wireless communication media and apparatus, business intranets, kiosks or other virtual and/or physical locations from which it is desirable for a consumer to request and obtain travel information.

Referring again to FIG. 1, in summary, the functional architecture of the invention is a layered architecture, with five distinct functional layers corresponding to the logical architecture layers. The information acquisition layer 2 includes a unique collection of travel information sources and a robust set of mechanisms for acquiring varied information sources. The information transformation layer 6 includes extract, transform, and load sub-processes, and a unique, external application of expert research and analysis. The information development/application layer 18 includes interactions with subsystems such as alert and event monitoring; extract, transform, and load sub-processes; and external oversight, advisement, and travel business rules development such as by industry experts. The product/service creation/delivery layers 22,26 include content management and global travel information, including workflow, version control, personalization, and content integration; creation of unique, personalized products based on a combination of personalized travel profile information of the global travel information; and a rich and diverse set of delivery channels.

It can be understood by one skilled in the art that the foregoing logical steps can be applied, for purposes of implementing the method and system of the present invention, to a plurality of functional modules. It can be further understood that the specific functional architecture aspects of the invention described herein are intended to be illustrative, and not limiting, as to the scope of the invention.

Travel Information Technology Implementation Architecture

Figure 2:
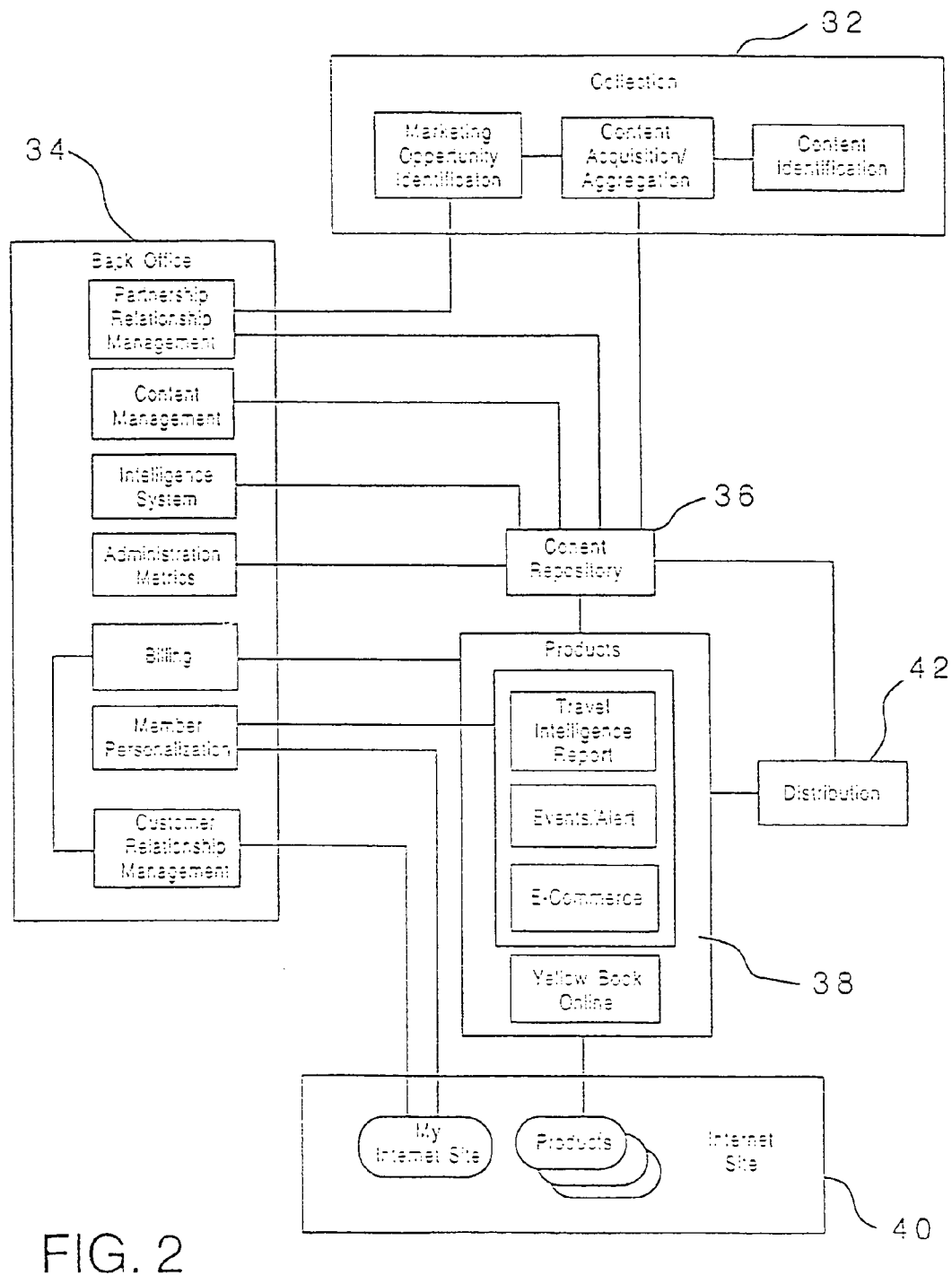
FIG. 2 is a block diagram of an embodiment of the present invention.
Figure 3:
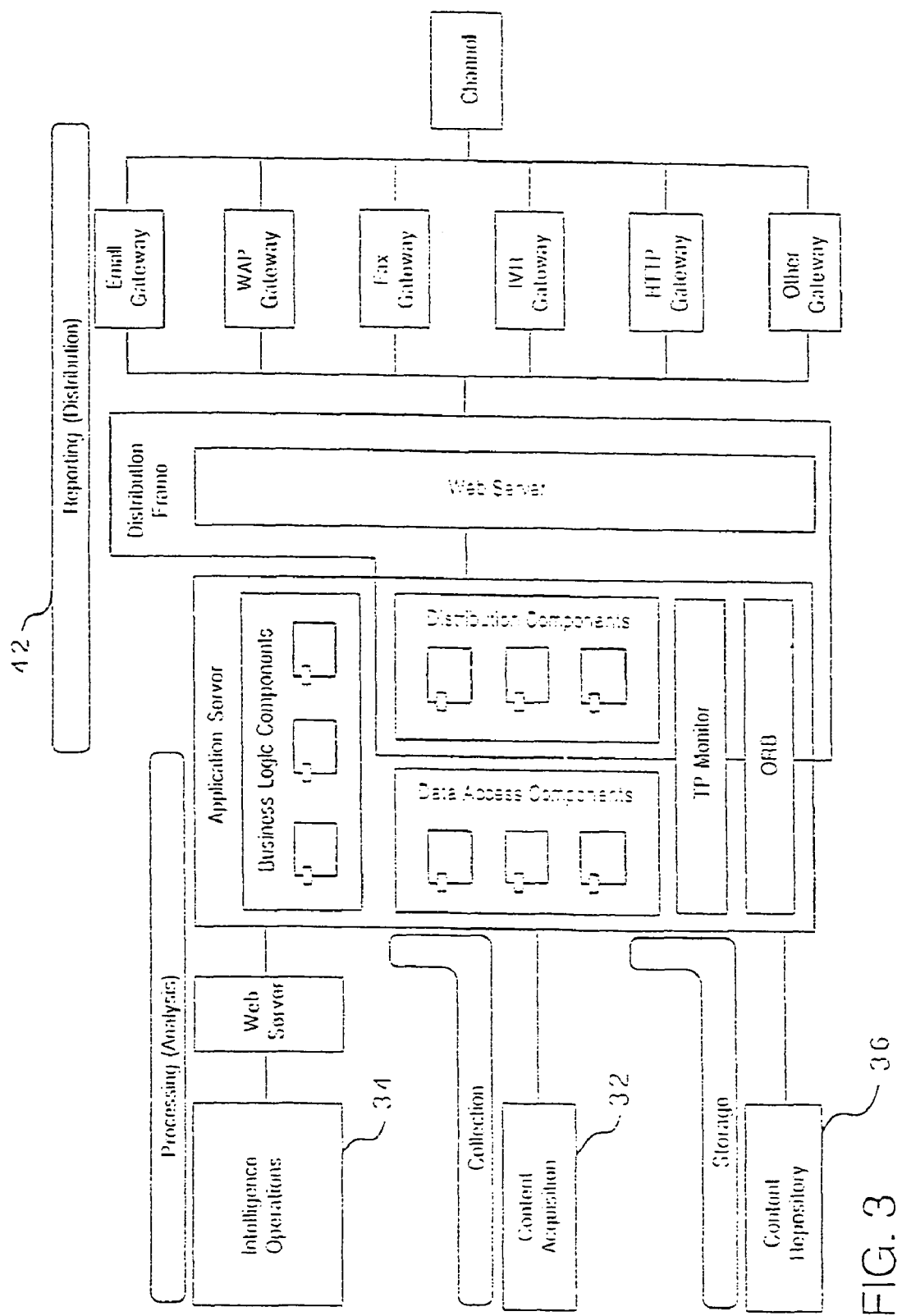
FIG. 3 is a block diagram of an embodiment of the present invention.

In summary, referring now to FIGS. 2 and 3, the technology implementation architecture of the invention is a descriptive set of a plurality of technology subsystems or segments, each of which can be considered as part of one of several functional systems: collection 32, back office 34, content repository 36, products 38, internet site 40, and distribution 42. FIGS. 2 and 3 illustrate the relationships between and among these different technology segments.

Content Identification Segment (CIS)

Figure 4:
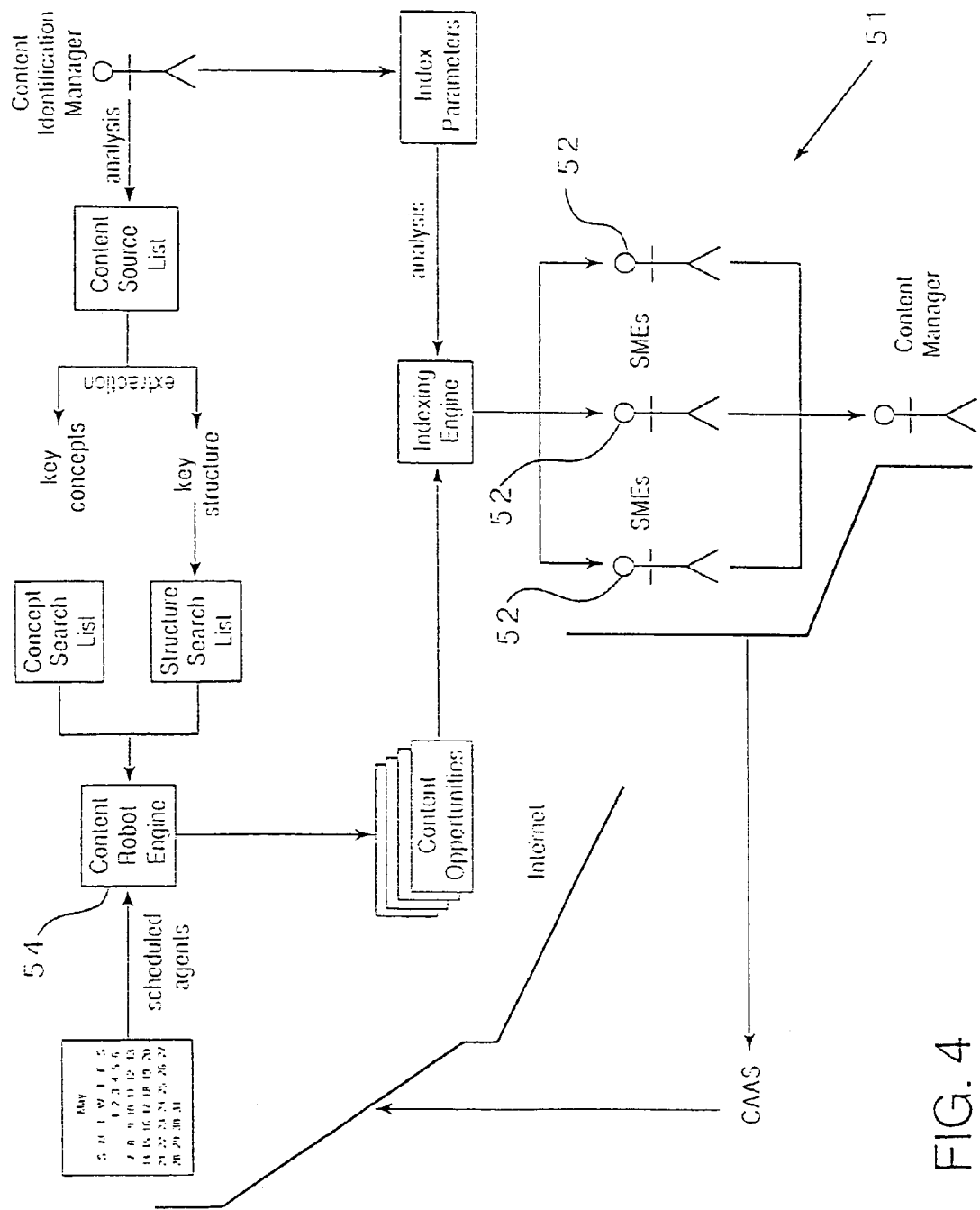
FIG. 4 is a flow diagram of an embodiment of the present invention.

Referring now to FIG. 4, a content identification segment (CIS) (51) relates to the initial and ongoing identification of information sources such as internet sites that enhance the products and services provided by the invention. The CIS (51) also enables the determination of sites in use that should, based on subjective or objective criteria, no longer be relied upon for accurate, timely, or value-added content.

Content in the invention can be identified by manual methods performed by subject matter experts (SME's) 52 or individuals with domain expertise using public search engines, for example. In another aspect of the invention, once a base set of content sources has been established, an automated robot process 54 can be employed to identify potential sites on a regular basis. To improve their performance, such robot processes can be monitored and reviewed by the SME's 52 on a regular basis with periodic validation of the criteria driving these robots. In general, the robot process begins by returning identified site lists. Refinements can then be added by applying SME-developed context to text returned by these robot processes.

With this SME-developed context, a high-level classification of the sites returned can be developed. The granularity of robot 54 returns be fairly coarse initially, and more finely grained as identification techniques are honed. Likewise, the levels of classification of robot 54 returns can be limited, with additional levels added as identification techniques are honed. Multiple levels of robot activity can therefore be implemented in accordance with the invention.

A blanket robot can exist, for example, that combs the web simply for the word "travel," then discards duplicate hits or hits outside of <Title> or <meta> tags. Ultimately, these robot processes may evolve to several robot processes that can look for specific occurrences of the word "travel" in conjunction with other words (e.g., "health") in very specific structural elements of the document (e.g., only if both words occur in both the <title> tag and in <meta name=keywords> tag). It can be appreciated that the robot technology can also be effective for non-HTML sources, provide mechanisms for natural language queries, and can be able to route hit returns substantially automatically to specific SME's 52.

Content Acquisition/Aggregation Segment (CAAS)

Figure 5:
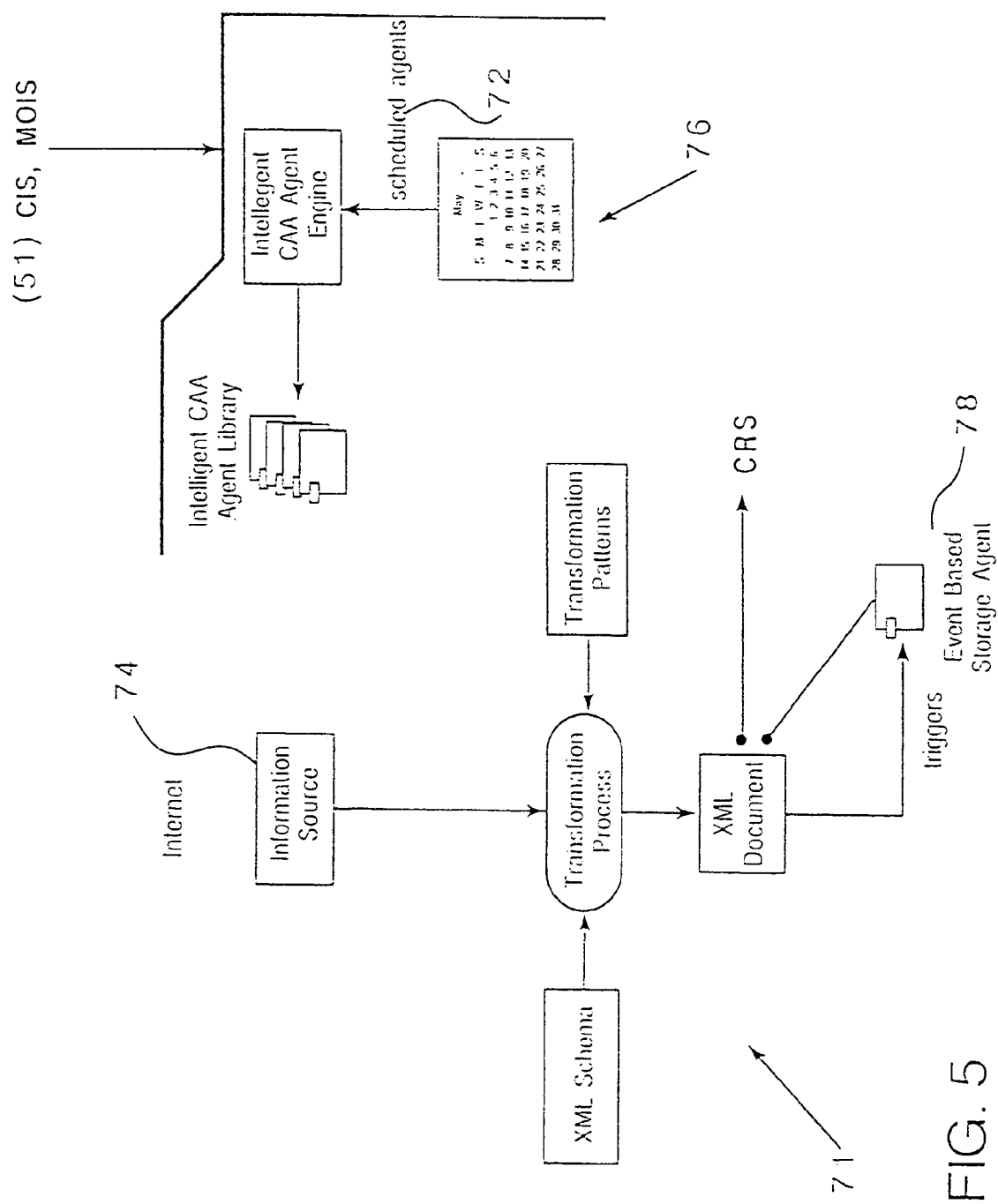
FIG. 5 is a flow diagram of an embodiment of the present invention.

Referring now to FIG. 5, in the invention a CAAS (71) defines the processes by which identified content (see CIS (51) discussion above) is acquired and classified as belonging to a specific domain, then stored in a format by which the content management system (see CMS (131) discussion hereinafter) can use.

The CAAS (71) includes developing agents 72 to retrieve identified content from an information source 74 and implementing a scheduling mechanism 76 to initiate these agents. In general, content acquisition schedules 76 range from completely static (e.g., a single agent initiation for the power requirements in France) to hourly (e.g., a five-day weather forecast for Paris). Notification agents 78 can also be developed and scheduled for initiation at regular intervals. These notification agents 78 can inform content acquisition personnel that a particular content source has changed in content or structure.

If a relatively simple change in content is indicated, the acquisition agent 72 can be manually initiated to bring in the latest content for a given information source 74. Integration with the Administration Segment (ADMS) (181) (discussed hereinafter) is required for this process, as an initial acquisition agent schedule 76 is sparse until the frequency at which site content changes is understood. If a notification agent 78 returns information on a content structure change, for example, content management personnel can modify the corresponding acquisition agent 72 so that the change content is correctly acquired. In addition, an environment can be created whereby SME's can create ad hoc acquisition and notification agents for alert purposes. In another aspect of the invention, the modification of acquisition agents 72 can be automated and based on the return information of notification agents 78. It can be appreciated, however, that some manual oversight is desirable in this process.

Content Repository Segment (CRS)

In the invention, the content repository segment (CRS) 91 stores, manages, and distributes substantially all acquired travel information that is considered persistent.

Figure 6:
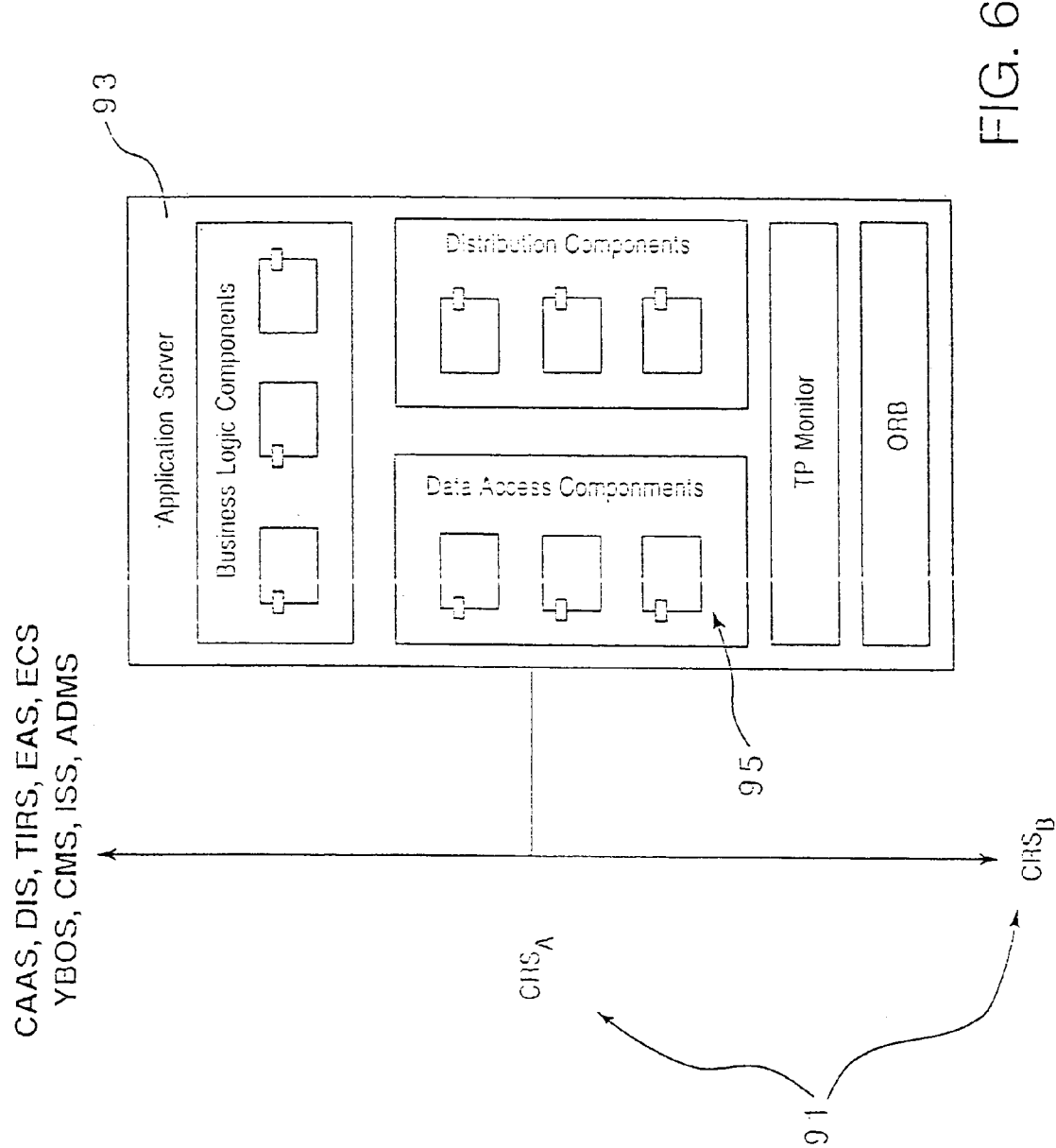
FIG. 6 is a system diagram of an embodiment of the present invention.
Figure 7:
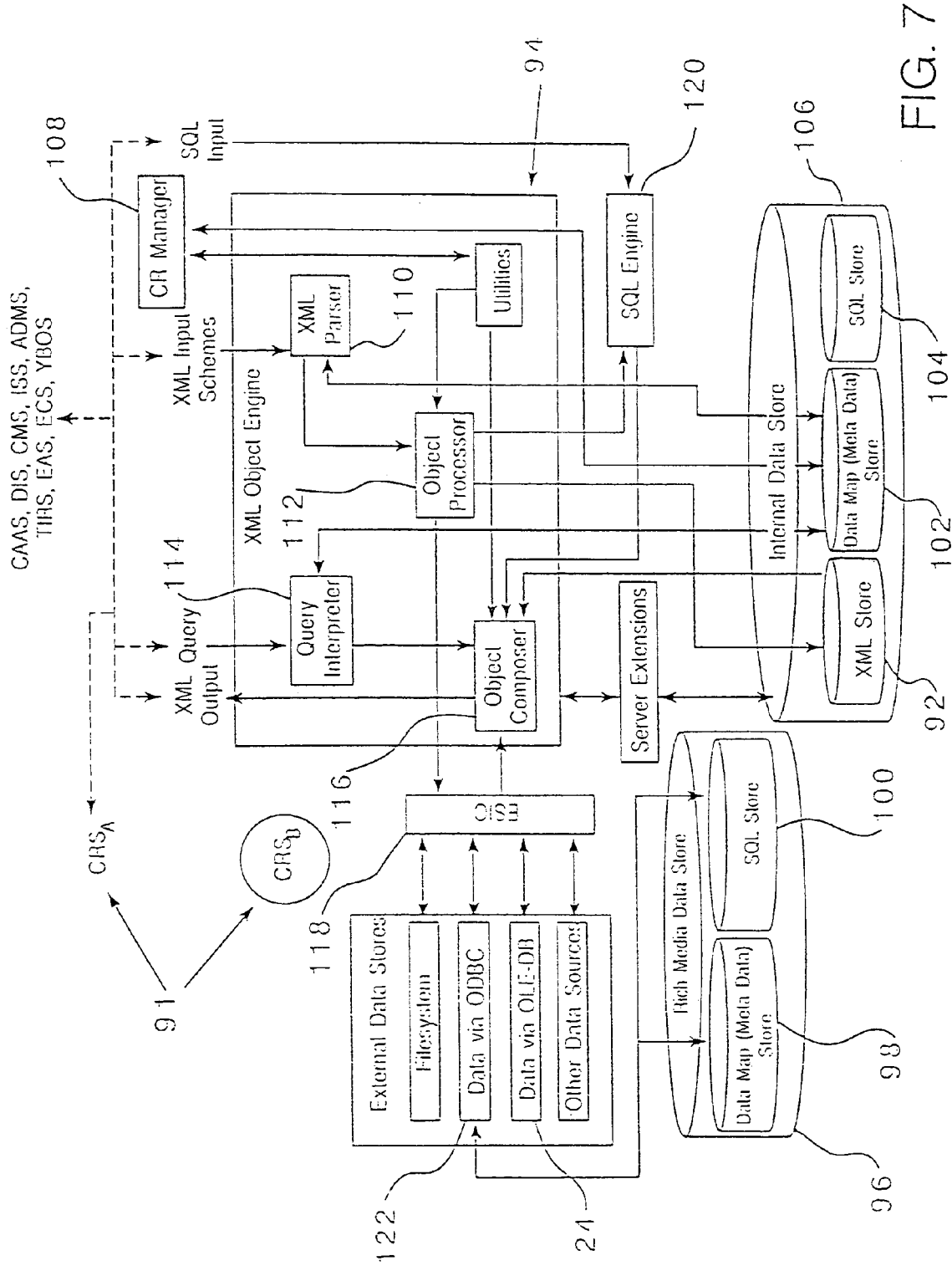
FIG. 7 is a system diagram of an embodiment of the present invention.

Referring now to FIGS. 6 and 7, the content repository can be considered a "hub" for content and data. Although the content repository 91 includes both relational and object XML data stores 92, it can be accessed and managed through a central mechanism and driven by a single engine 94. The content repository 91, as shown, can provide facilities to store, view, import, organize, modify, export, and query travel-related information. It can include one or more physical data stores 92,96,98,100,102,104,106; the data engine 94; an integrated tool set for development; and, a centralized management facility 108.

It can be appreciated, in an alternative aspect of the invention, that the content repository 91 could support extended data types including user-defined types and extended data types of audio and video. The content repository 91 can also include portions of the application of business logic in the data model.

In one embodiment of the invention, the content repository comprises several technological components. A component environment is a dedicated content object layer. An application server 93 is provided that stores and processes data access/storage components 95. Services are enabled with Java Database Connectivity (JDBC) and open database connectivity (ODBC) drivers. An object request broker (ORB) is also employed (an object request broker) to manage object-to-object messaging and inter-ORB communications. The XML object engine 94 stores/retrieves XML objects from data stores 92,102,104 and has functionality based on schemas stored in a data map store 102. An XML parser 110 is included that checks syntactical correctness of schemas in the data map store 102 and ensures the formation integrity of incoming XML objects. An object processor 112 is included as a component to physically store XML data in the XML store 92. A query interpreter 114 resolves XML Query Language (XQL) requests and interacts with the object composer 116 to retrieve XML objects according to the schema stored in the data map store 102. The object composer 116 is provided to construct the information objects, based on storage and retrieval rules defined in the data map store 102, and return them as XML documents. There are also various utilities in this embodiment, including those that support directory and tree-oriented loading of XML objects. An external storage integration component (ESIC) (118) permits applications to access data regardless of database type or location.

The data map (meta data) store 102 serves as the content repository's 91 knowledge base. The data map store 102 contains the schemas that hold the rules according to which XML objects are stored and composed, such as: (1) storage and indexing of XML objects within the content repository, (2) mapping of data to different data structures to enable the integration of existing data, and (3) executing user-defined application logic with a server extension function associated with an object. An SQL engine 120 manages an internal SQL store 104; executes SQL statements; and, accepts SQL statements in a number of ways: internally, from the object engine 94; from applications, which can be either embedded or through standard database interfaces such as ODBC (122), JDBC, or OLE-DB (124); and, from the content repository manager 108. The CR manager 108 provides an administration tool implemented as a graphical user interface (GUI) that runs in standard web browser. In addition, server extensions permit user-defined functions to be incorporated into the content repository 91.

Content Management Segment (CMS)

Figure 8:
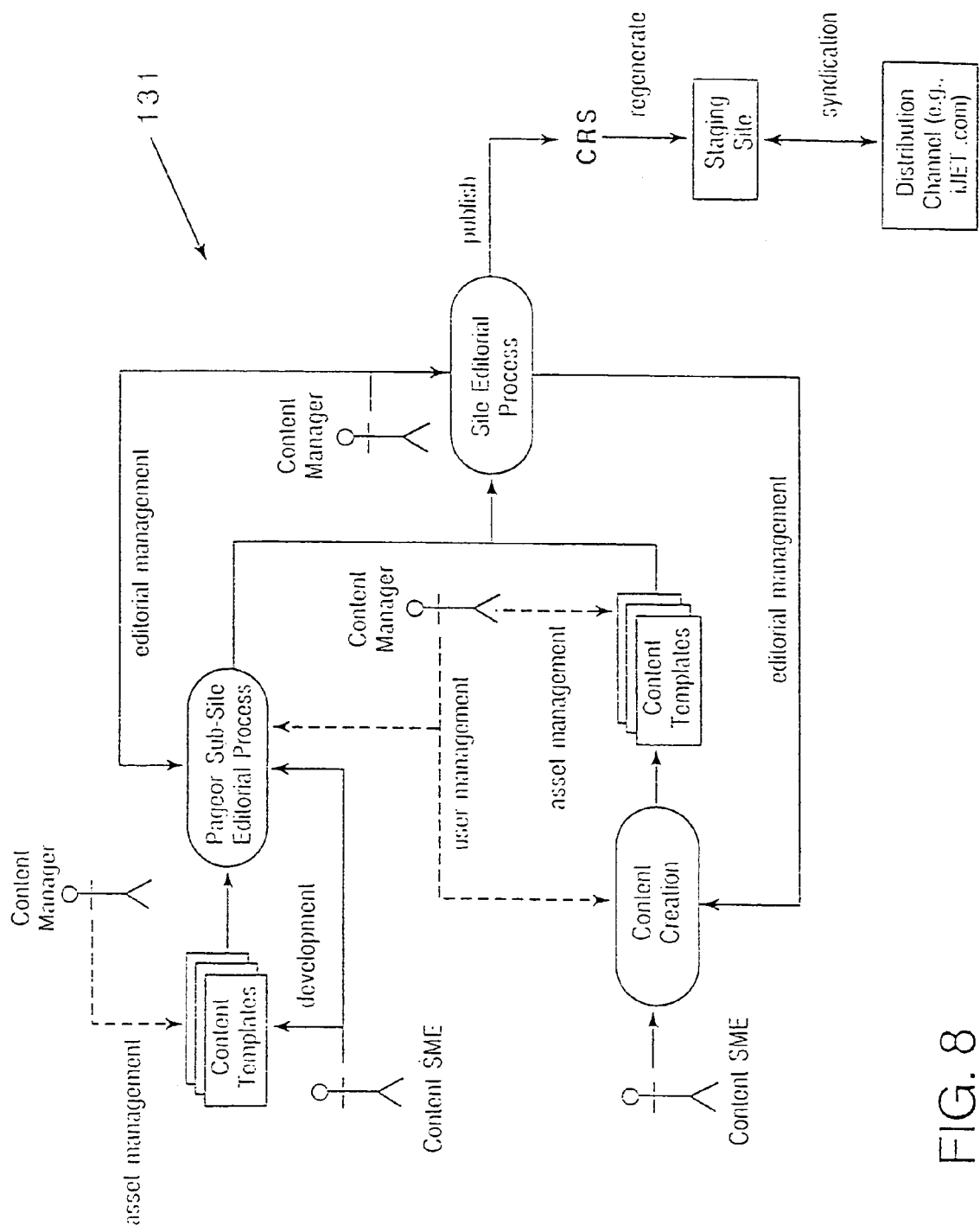
FIG. 8 is a flow diagram of an embodiment of the present invention.

Referring now to FIG. 8, in the form of the invention shown, a content management segment CMS (131) can be defined by the processes and technologies by which content is managed. Content management technologies include content and design control, contributor/user access control, site control, asset control, publication, and workflow. A universal (i.e., generic) presentation format can be developed, along with XML document schema, and content binding to page layouts can be implemented. Substantially all content, including text, graphics, styles, themes, and other assets, can be stored as objects in a high-performance relational database. For performance reasons, all content provided by the invention, as presented to a content consumer, comprises static pages in flat file systems. This content can be dynamically generated on an as-needed basis (e.g., one particular page every minute, one particular subset of pages every week, and the like).

After initial implementation, interaction with ADMS (181) and CRMS determines style and design modifications. In another aspect of the invention, implementation of ancillary services such as advertising management and syndication mechanisms can be incorporated into the invention. It can be appreciated that content can be translated and global sites can therefore be developed in English, Spanish, German, French, Japanese and other suitable languages to which the invention can be adapted.

Travel Information Report Segment (TIRS)

Referring now to the figures, in another embodiment of the invention, a travel intelligence report (TIR) can be generated that includes trip information necessary to make informed decisions regarding pre-travel preparation and enhancement and enjoyment of travel related activities. In one aspect of the invention, the TIR can be divided into four major sections: Pre-Trip Information, Destination Information (for one or more destinations), General Advice, and Products and Services. Within each section is a set of information categories, each of which contains several information requirements. Each of these requirements can be customized to (1) the traveler, based on his/her personal profile, (2) destination, and (3) related issues such as season of travel.

The Pre-Trip section travel categories include Alerts, Entry/Exit Requirements, and Pre-Trip Health considerations. Alerts may include, but are not limited to, Safety/Security, Weather, and Transportation. Entry/Exit Requirements can include all legal, health, and custom issues that are important for entering and leaving a particular destination. The Pre-Trip Health section can also include required and recommended immunizations, health risk considerations, and the like.

Typical travel categories and information requirements in the Destination section includes, but is not limited to:

1. Safety/Security: Social Stability, Crime, Airline, Game Parks
2. Weather/Environment: Climate & Terrain, Natural Risks, Environment, Weather Chart & Forecast
3. Transportation: Air Travel, Water Transportation, Road/Overland Travel, Taxi, Mass Transit, Train Travel, Rental Cars
4. Money: Cash & Credit, Taxes, Cost of Living
5. Telecommunications: Phone/Electric, Internet, Contact Information, Mail, Radio
6. Social Customs: Behavior, Religion, Women's Issues, Business Hours, Public Holidays & Events
7. Legal: Prohibited Items, Penalties
8. Language: Official Language
9. Health: immunizations, nearest hospital, health insurance, health risks One feature of the TIR is that it can be a hyperlinked report. Consumers have the ability to expand or contract particular information requirements to see detail or concise descriptions for a given TIR, information which has come directly from the global operations center. The TIR can be printed directly from a browser, or saved in a variety of electronic formats, but it is also "alive" in the sense that a traveler can return to it online at anytime up to thirty days after the conclusion of his trip and access the latest information based on his profile. In fact, if an alert level event occurs during the life of the report it will trigger the transmission of an e-mail (or other push technology) warning from the report to the traveler. In this way the report, and the operations center behind it, become the traveler's own personal intelligence agency.

The TIR can also include a rating (such as from 1 to 5 in tenth increments, for example), which is a weighted-average of the total risk of the trip represented by the TIR as determined by criteria applied to the travel data in the TIR. This rating can be illustrated, for example, by a series of "jet" graphics printed on the TIR.

Member Personalization Segment (MPS)

Figure 9:
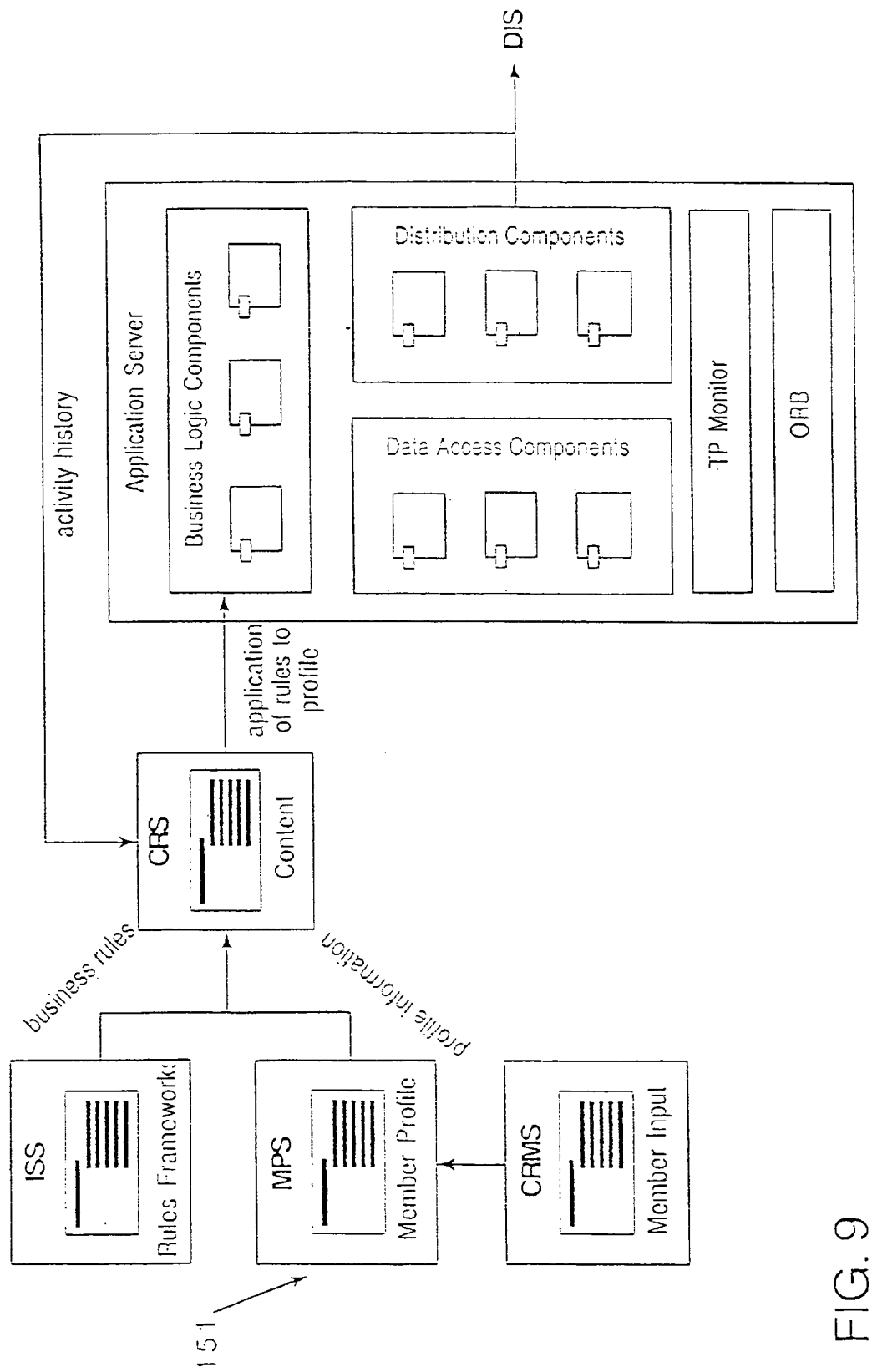
FIG. 9 is a system diagram of an embodiment of the present invention.
Figure 10:
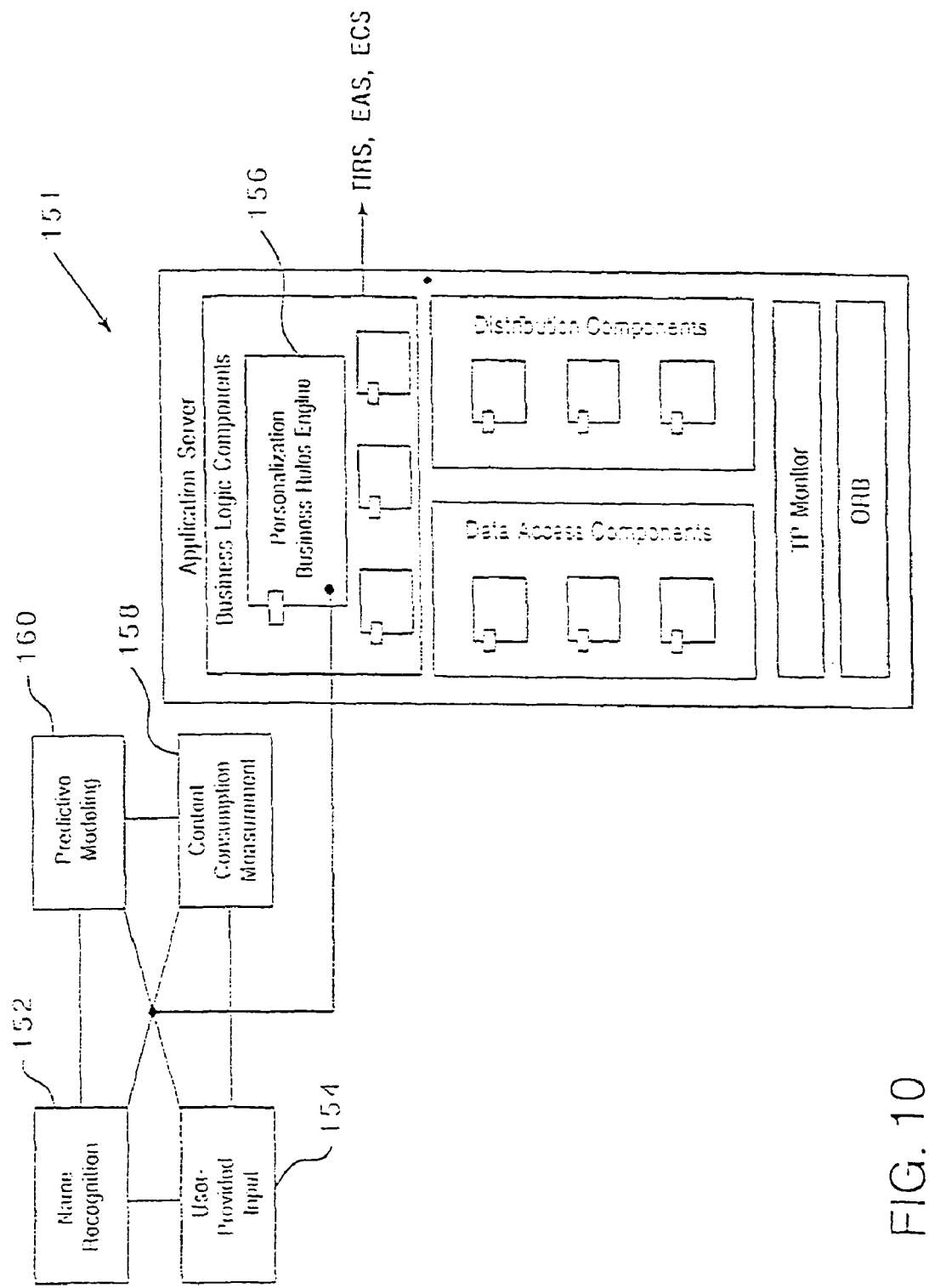
FIG. 10 is a system diagram of an embodiment of the present invention.

Referring to FIGS. 9 and 10, a member personalization segment (MPS) (151) defines the functions and processes by which the products and services of the invention are personalized to a specific consumer. In addition to personalization of product/service offerings, the MPS (151) provides a mechanism to apply targeted marketing to the travel community.

The MPS (151) includes, for example, the following information: static, stored personal information; name recognition 152; and, user-provided information 154. In one aspect of the invention, a personalization business rules engine 156 interacts with this information, along with input from business rules frameworks applied to ISS (351). It can be appreciated that the information sophistication level can increase to provide the following processes: content consumption measurement 158; adaptive content and navigation; predictive modeling 160; segmentation; and behavioral personalization.

Billing Segment (BIS)

Figure 11:
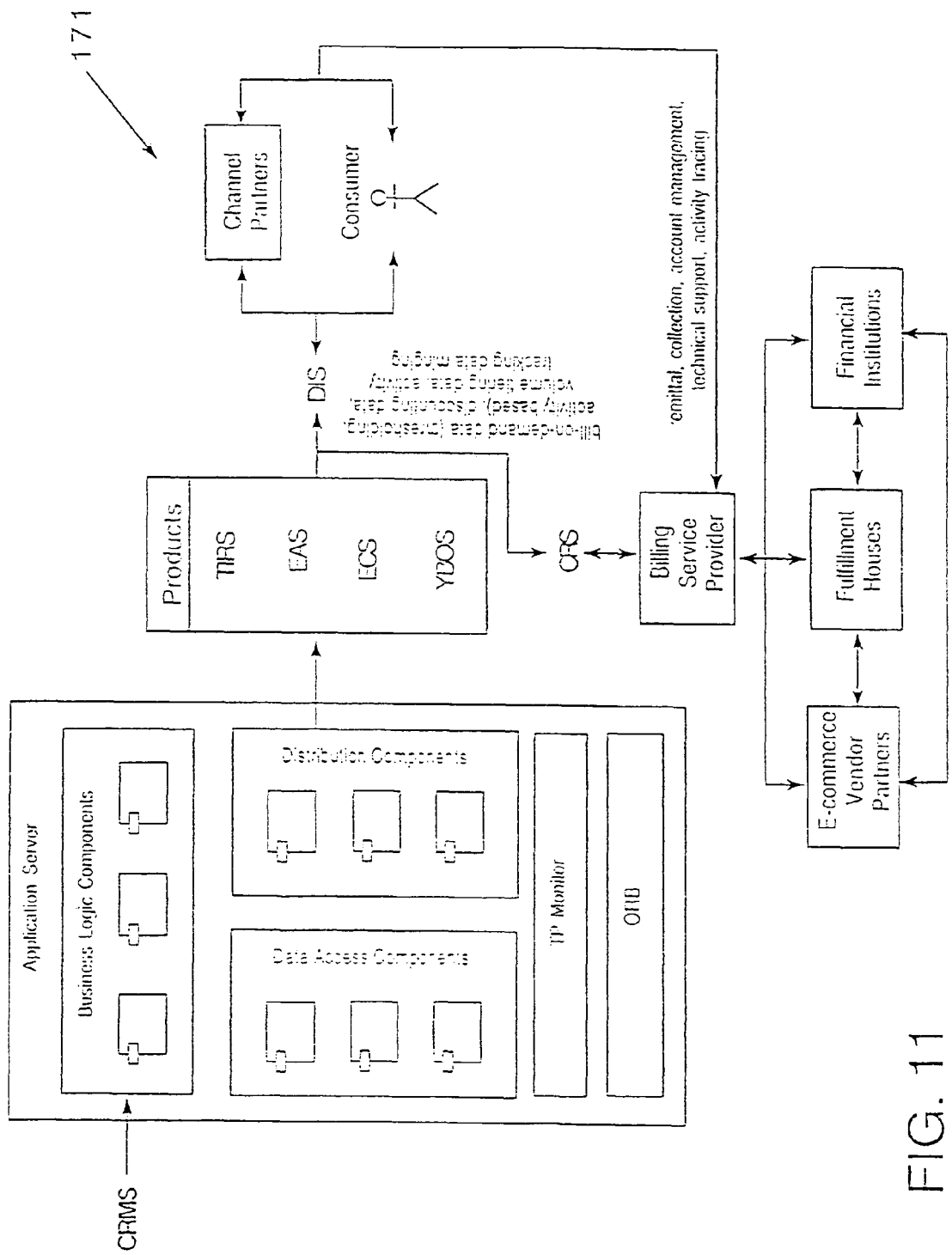
FIG. 11 is a combined system/flow diagram of an embodiment of the present invention.

Referring to FIG. 11, a billing segment (BIS) (171) can be employed to define the billing and payment architecture for products and services provided by the invention. The BIS (171) can be associated with the TIR's and channel partners (e.g., e-Ticket TIR). Billable activity can also be captured within the distribution segment (DIS) (190) then routed to BIS (171) and CR5 (91) (for updating partner detail records and consumer detail records.

In one aspect of the invention, BIS (171) includes, for example, the following functionality: rules-based messaging to tailor invoicing for specific partners; e-mail based invoice presentation, with a secure uniform resource locator (URL)-link back to the invention internet site for invoice details; a comprehensive customer-care system for issues such as dispute management; an ability to implement prearranged payment plans; and, flexible payment processing, including payment returns and payment confirmation. It can also be appreciated that credit card payments can be accommodated by the invention.

In another aspect of the invention, a cost model for alerts can be determined based on factors such as (1) alert level, (2) number of delivery channels, and (3) type of delivery channel.

With regard to syndication of content, a cost model can be developed for the invention to accommodate granular syndication requirements. For example, one partner may choose to syndicate the entire invention content, while another partner may choose a vertical (e.g., information requirement) or horizontal (e.g., geographical) subset to such syndication. Also related to CMS (131) are the requirements associated with localization. For example, if a channel such as the internet site of the invention is localized for a foreign country, currency considerations are an important consideration.

In another embodiment of the invention, to satisfy these additional requirements, a multi-service BIS (171) considers the following: volume tiering, discounting, multi-format invoicing, billing-on-demand (including threshold, activity-based, and billing in advance), and direct debit processing. In an alternative embodiment of the invention, the billing function can be out-sourced to a service provider.

Administration Segment (ADMS)

Figure 12:
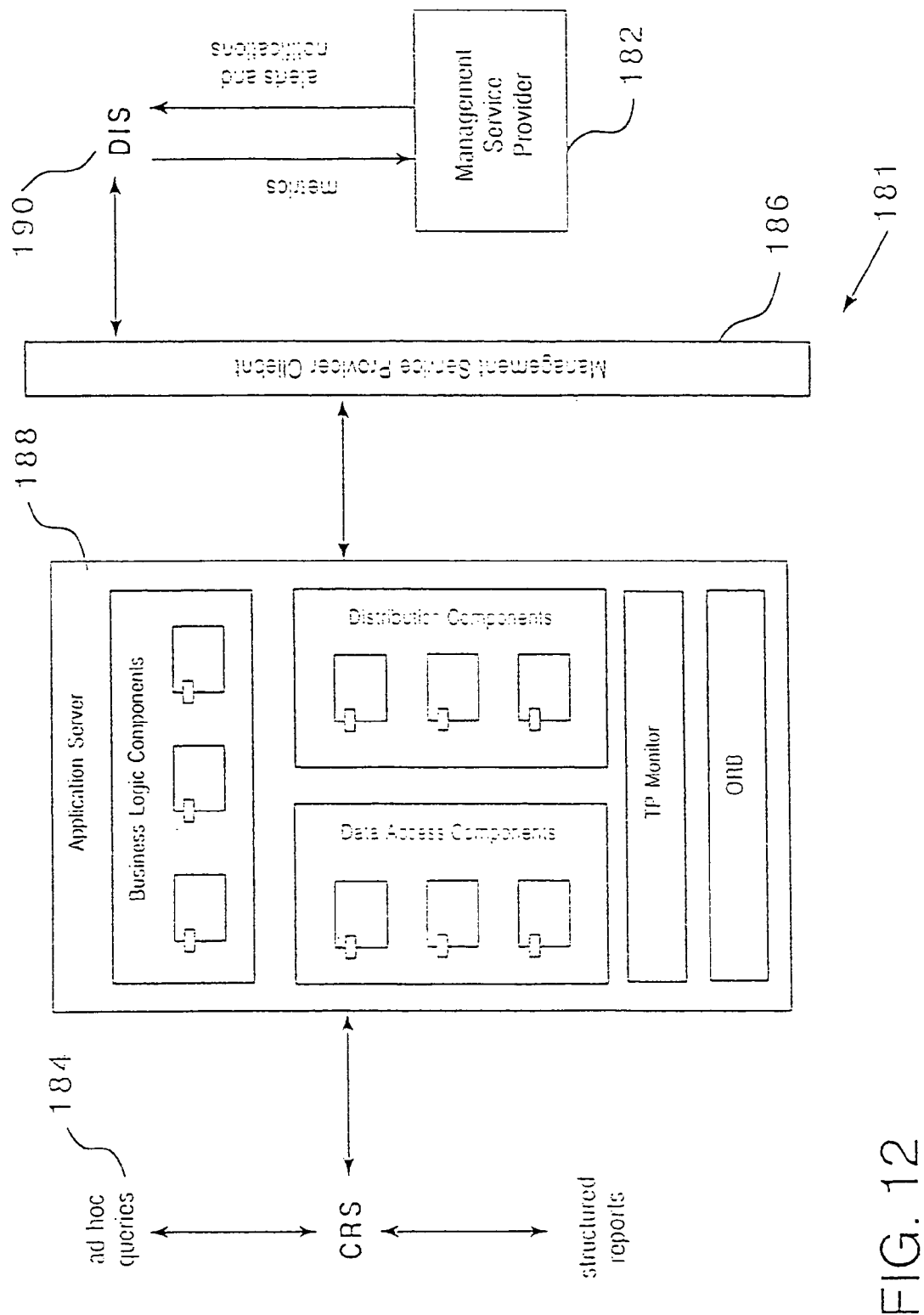
FIG. 12 is a system diagram of an embodiment of the present invention.

Referring now to FIG. 12, an administration segment (ADMS) (181) defines the administration and reporting necessary to maintain a robust, active set of systems and a proactive approach to determining return on investment (ROI) on system processes. Management of the systems of the invention can take place internally such as by personnel, externally by the INFS provider, and/or externally by a management service provider 182.

Internally, structured reports are used to measure ROI of several processes, including internet site analysis (navigation, content consumption, activity paths, and the like) and content acquisition ROI. Ad hoc mechanisms 184 can be used for targeted data mining and analysis. Key elements of this internal reporting mechanism are the determination of content acquisition cost vs. content use (i.e., ROI of destination-specific products).

Externally, base operating system (OS)-level functionality can be managed by collocation FNFS partner(s). This functionality includes security, redundancy, load balancing, and the like. By placing a management service provider client 186 between the invention's internet site application services 188 and the DIS (190), one can also manage process, transaction, and infrastructure issues.

In addition, a plurality of metrics can be captured and analyzed. Process metrics include end-to-end transaction response times, actual transactions: target transaction ratio, start-to-finish transaction ratios for key business processes, availability or service level agreement (SLA)-ratios of partners. Transaction metrics can include activity response times, including product (e.g., TIR's, EAS (201)) production and distribution, session ID transaction information, performance based on volume of product creation/distribution, replication updates per unit time (including product, email, etc.).

Infrastructure metrics can include web server metrics, including connection rates, connected users, data transfer rates, and number of connections, database metrics, including database transactions, file sizes, deadlocks, memory cache hit ratios, memory optimization, user logins, logout rate, and user connections; and, server metrics, including packet traffic, queue size, disk and memory utilization, and session errors.

Event/Alert Segment (EAS)

Figure 13:
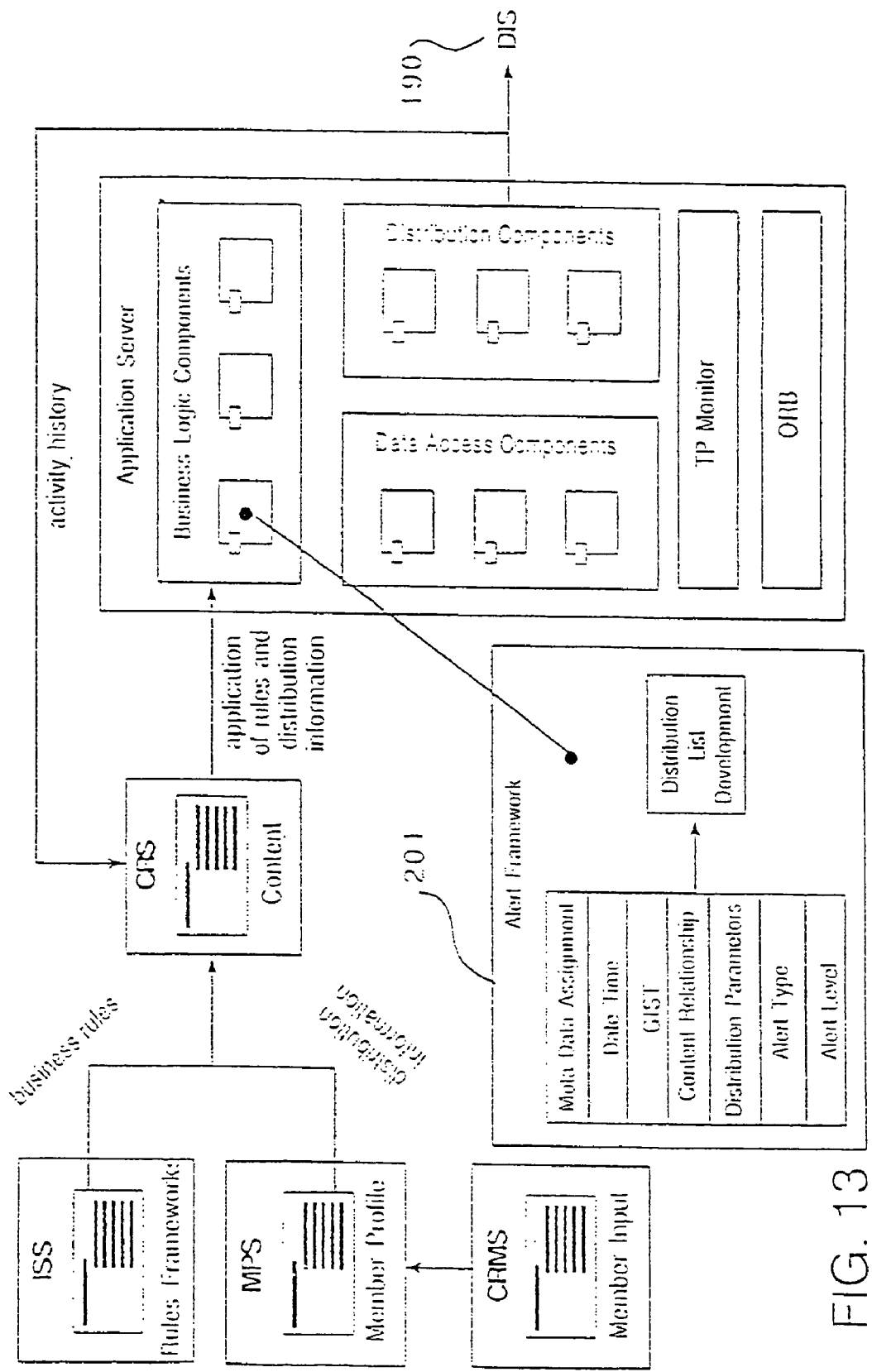
FIG. 13 is a system diagram of an embodiment of the present invention.
Figure 14:
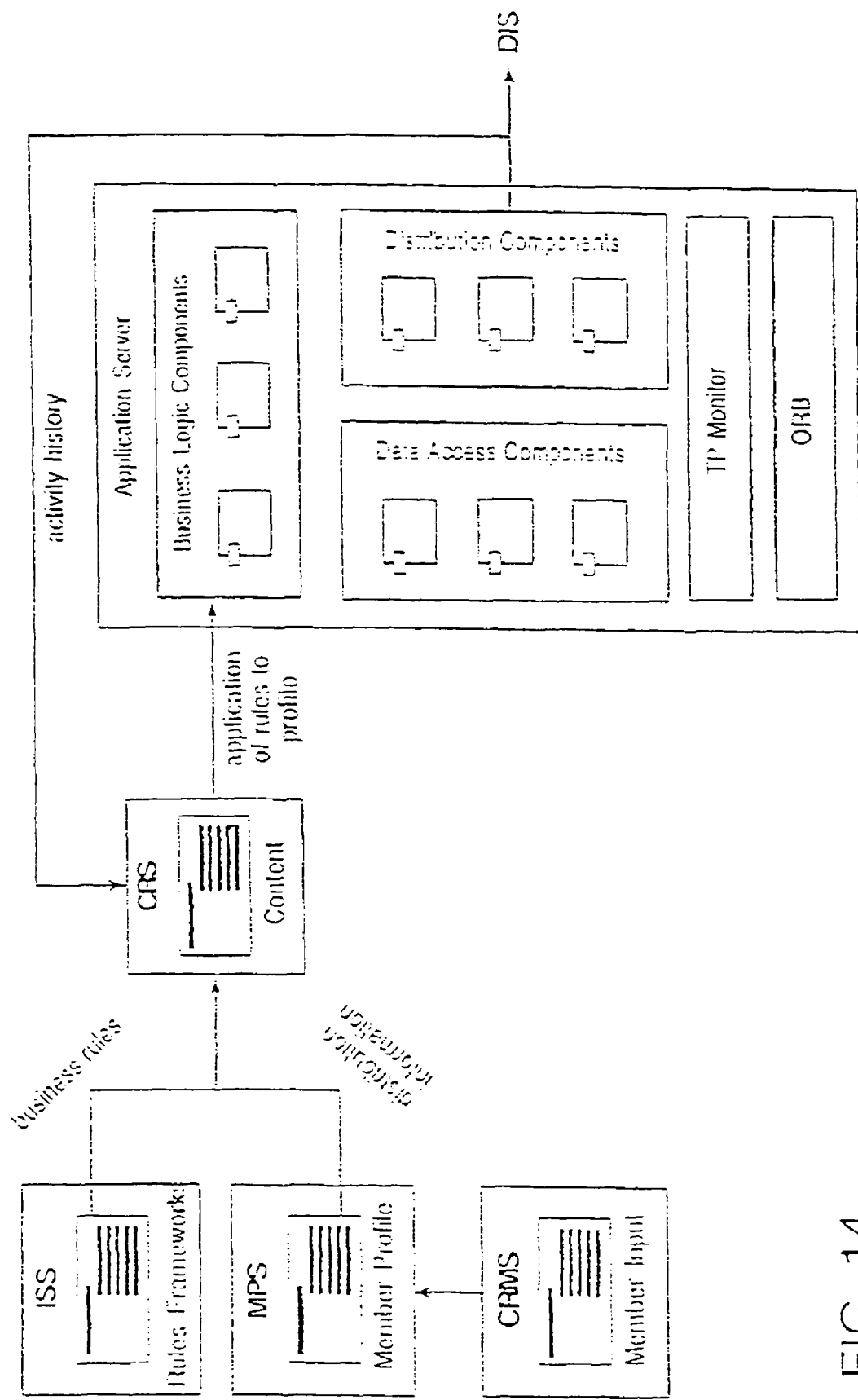
FIG. 14 is a system diagram of an embodiment of the present invention.
Figure 15:
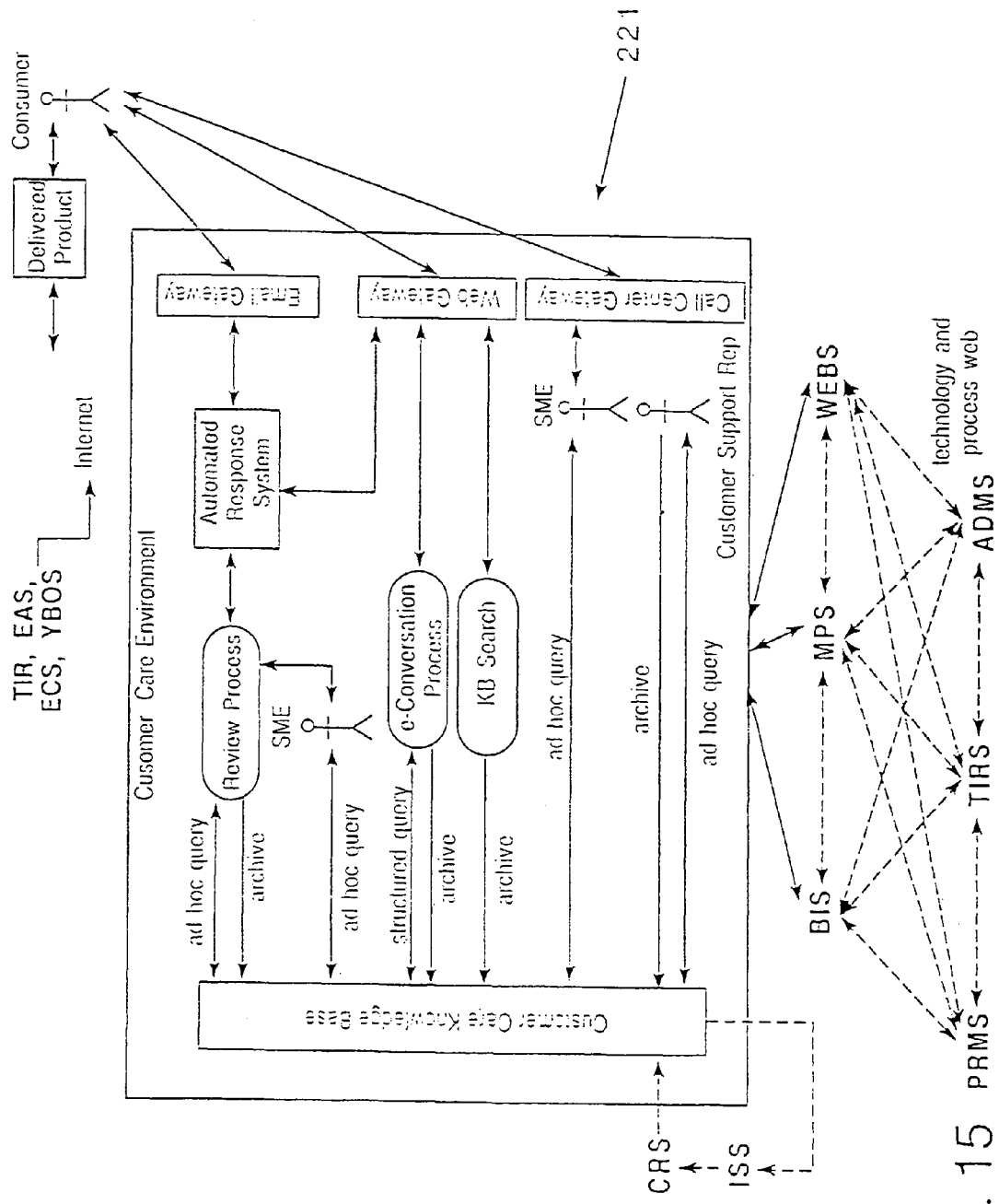
FIG. 15 is a flow diagram of an embodiment of the present invention.

Referring now to FIG. 13, an event/alert segment (EAS) (201) is responsible for the identification, selection, management, and distribution definition of events and alerts. The EAS (201) can support both manual and automated systems. The manual systems permit an Analyst, for example, to generate an Alert and forward it to the EAS (201) for processing. The EAS (201) can process an Alert by queuing it in priority order to a selection system operated by an Event Reporting Analyst. Alerts are reviewed to ensure that the system does not flood the distribution network with low grade or otherwise relatively insignificant Alerts. The Analyst can modify both the Alert content and attributes (duration, region of interest, level, and the like). An Alert can be sent back to one or more designated Analysts for review and comment as a high priority message. Once the Event Reporting Analyst releases an Alert, the EAS (201) determines the applicable members and establishes the distribution orders for the Alert. This information is passed to the Distribution Segment (DIS) (190) to perform transmission of the Alert to various distribution networks, such as by pager, e-mail, and other suitable communication avenues.

In another aspect of the invention, automated systems can be deployed that perform keyword spotting and category analysis to identify potential candidate content for Alert generation. Keyword spotting involves scanning incoming content for specific keywords or combination of keywords using regular expression analysis defined in a Keyword Dictionary. Examples of such keywords for Alert reporting are "hurricane", "strike", and the like. Other keywords would include specific names of countries, airlines, and the like.

Once keywords are identified, Category Analysis is used to determine who should review the content. For example, a message with "France", "United" and "strike" could be automatically routed to the European Desk Analyst and the Transportation Domain Expert as "high priority" content for review.

The method and system of the invention addresses the need to provide multiple Event Reporting Analysts as a role. This role can be passed from shift to shift, and there can be multiple Event Reporting Analysts operating concurrently. If there are multiple Event Reporting Analysts operating, the system can maintain a single, global work queue but resist multiple Event Reporting Analysts from working the same Alert simultaneously.

An important aspect of this embodiment of the invention is the ability to identify, review and select events for Alert reporting. Alerts can have, for example, three (3) levels of significance. A Level 1—High Priority/Critical Alert could be considered one that can directly impact the health, safety, or schedule of the traveler. Examples of Level 1 Alerts could include weather alerts, flight delays and cancellations, actual strike actions, and the like. A Level 2—Medium Priority/Warning Alert relates to information that may have an impact on the health, safety or schedule of the traveler. Examples of Level 2 Alerts include imminent weather conditions, strike advisories, social unrest, airport facility issues, and the like. A Level 3—Low Priority/Informational Alert is related to information that the traveler should be aware of about his/her trip. Examples of Level 3 Alerts can include major events being held at a given destination, financial situations such as money valuation issues, visits of a major head of state, and the like.

In another aspect of the invention, the EAS (201) technology is a subset of ISS (351) technology (discussed hereinafter).

E-Commerce Segment (ECS)

Referring now to the figures, an e-commerce segment (ECS) of the invention provides the consumer with the opportunity to purchase travel associated products, that can be appropriately matched with the consumer's travel itinerary and profile. The ECS can be implemented as conventional hyperlinks at the end of a TIR: these links can be generic and/or targeted to the consumer based on predetermined criteria (e.g., season, destination country). These links are preferably only linked to the source provider for the product.

In another aspect of the invention, targeted contextual e-commerce can also be implemented on the TIR. This contextual e-commerce can be member profile-specific and combined with trip specifics to recommend particular products to the consumer. The consumer can then be linked and transacted through specific channels of the internet site for the invention. It can be appreciated that, instead of dedicated ecommerce platforms being incorporated to implement this type of e-commerce, content agents from CAAS (71) can be used, along with the BIS (171), to achieve this level of e-commerce. This contextual e-commerce can be combined with the internet site of the invention, such as on the personalized "My" internet site section. In addition, the internet site of the invention can employ order fulfillment as a function and service for the consumer.

Customer Relationship Management Segment (CRMS)

A customer relationship management segment (CRMS) (221) of the invention relates to interaction among consumers, site users, and internet site customer service. The CRMS (221) provides a forum in which site users can correspond with a central point of contact (POC) for providing comments and suggestions on products and services provided by the internet site. This feedback can be provided by conventional e-mail links and toll-free telephone numbers, for example.

The CRMS (221) is a virtual contact center, with workflow, routing, queuing, automated e-mail return, single-click email response, and the like. Incoming requests can be automatically comprehended and classified using message content. A response can be automatically composed with an appropriate reply and data can be retrieved to complete and personalize the response. Responses can then be either automatically sent or routed to a review agent or agents who can then send them to the consumer after examination.

In another aspect of the invention, a web-based self-service solution can be implemented that recreates the experience of working with an expert customer service representative.

In addition, an online community can be established by developing discussion forums and a comprehensive knowledge base. In connection with this knowledge base development is a process whereby content suggestions are automatically routed to SME's for analysis and inclusion in the content store.

In another aspect of the invention, CRMS can also include targeted feedback campaigns and e-mail solicitations. The CRMS can be integrated with the ADMS (181) (for metrics relating to customer activity, retention, and referrals), the MPS (151) (to provide customer-provided input and behaviors for personalization), the MOIS (261) (for establishing additional marketing opportunities), the BIS (171) (for billing customer care), and the PRMS (241) (to share technologies and processes). Live person type support can also be out-sourced after a predetermined number of inquiries are noted.

Partner Relationship Management Segment (PRMS)

Figure 16:
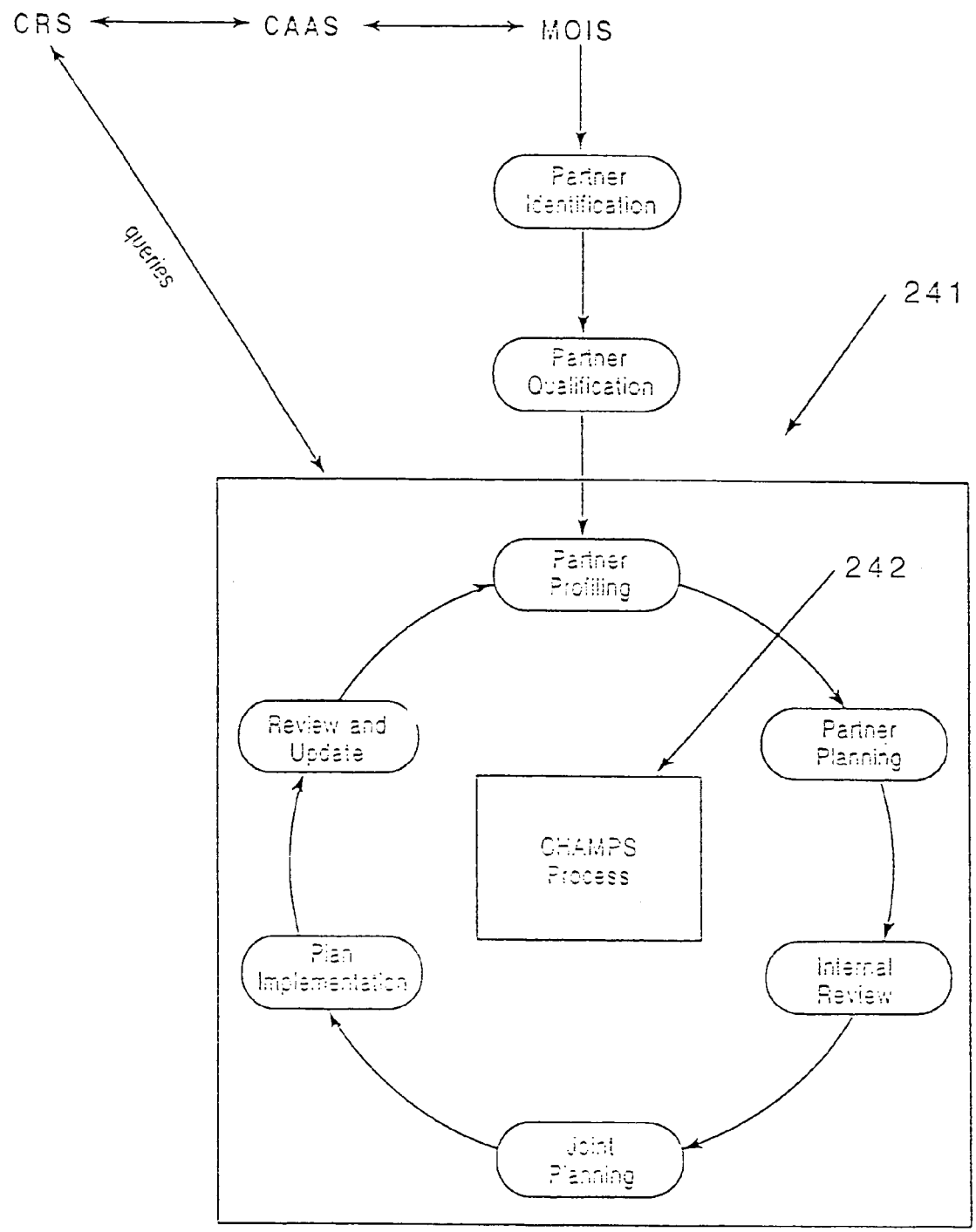
FIG. 16 is a flow diagram of an embodiment of the present invention.
Figure 17:
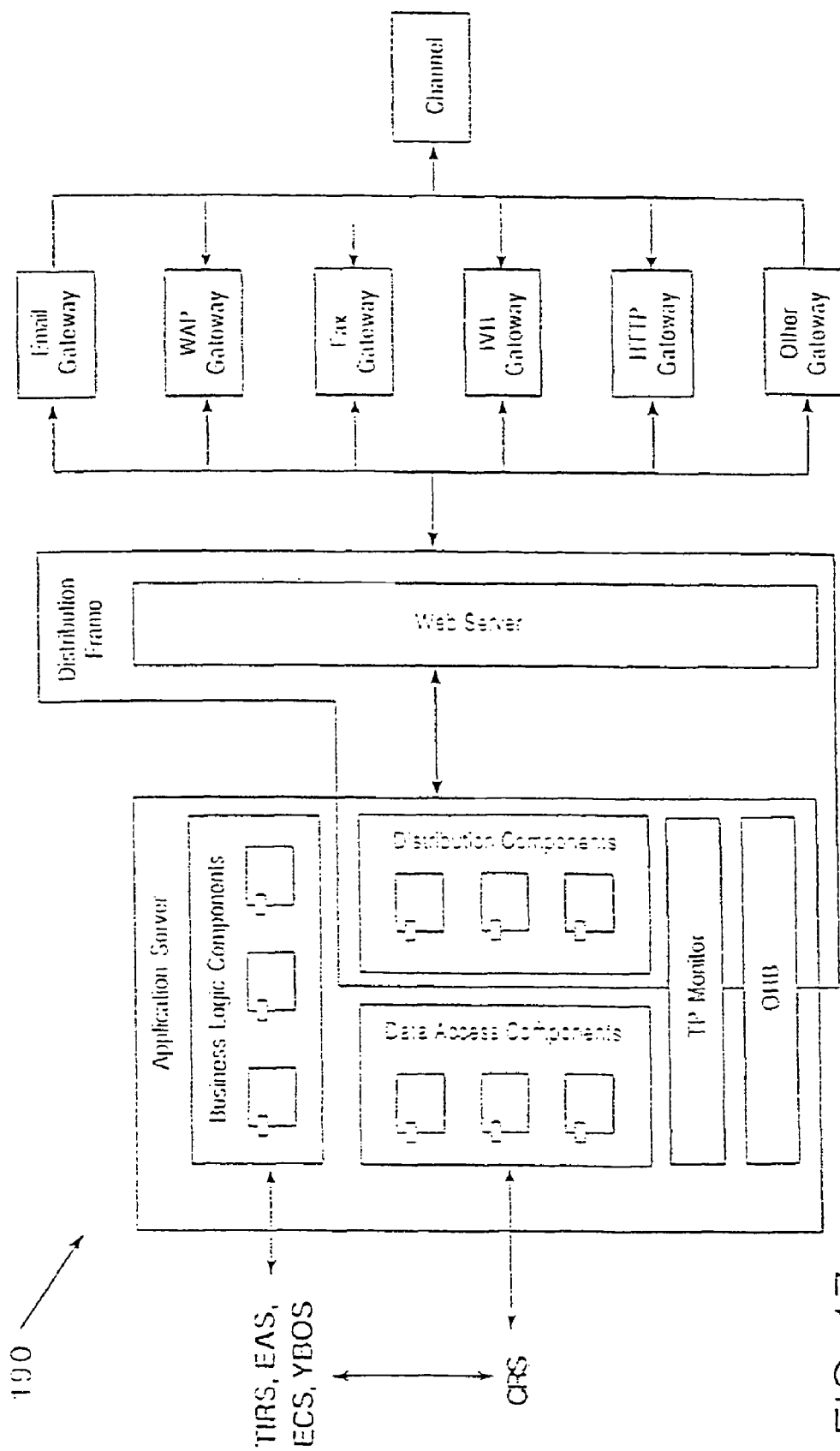
FIG. 17 is a system diagram of an embodiment of the present invention.

Referring now to FIG. 16, in the invention, a partner relationship management segment (PRMS) (241) can encompass both partner lifecycle management and extended enterprise selling. The PRMS (241) can be centered on CHAMPS (Channel and Alliance Management Process) 242 and can concentrate on two areas. Initially, partner lifecycle management can be implemented. This can include partner profiling, partner recruitment, and partner performance monitoring. Integration with MOIS (261) and ADMS (181) is important to implementing this segment.

Enterprise selling can also be addressed. This can include lead assignment, lead distribution and tracking, pricing/quoting, and literature fulfillment. Integration with BIS (171), MOIS (261), and ADMS (181) can be required, as billing customer care and consistent forecasting and reporting can be used:

Lead Assignment—Assigning qualified leads to the right partners at the right time is an important task. Managers can graphically enter business rules for building "decision trees" that decide which partner is assigned each lead. Rule options can include, for example, named accounts, score and qualification-based assignment, and checking to see if a partner is working on another lead in the same account. Multiple lead decision trees for different business models can be supported, as well as optional manual assignment, and lead posting to a pool of partners.

Partner Profiling—Information contained in the partner profile database can enable distributed management of users, customized content, push delivery, and online partner recruitment. This database can store profiles for both individual partners and partner organizations. An organizational profile can include information such as industry focus, location, organizational structure, product authorized to sell and accounts serviced. Individual profiles cover, for example, contact information, certification level, and previous performance.

Channel Partner Recruitment—A challenge for channel managers is the need to recruit qualified channel partners. Channel partner recruitment provides a set of tools to facilitate this recruitment process. Channel managers are able to modify their partner qualification criteria according to the existing partner profiles as well as the current organization needs. Potential partners can be tracked through the recruitment process and analysis can be conducted to determine the optimal way to attract the maximum number of qualifying partners.

Channel Communication—Channel communication can be based on two libraries: a distribution list library and a campaign template library. The distribution lists can be created from the partner database and are able to be filtered by type of partner, level of partner, or other criteria. Lists can be saved (either as a description or as a list of actual partners) and used for future campaigns. The campaign library can allow the marketing user to create new items, such as product announcements or event reminders, based on standard designs. Once the literature is created, the system can then distribute the item to the desired distribution list. Recipients' profiles can be automatically updated to note the information received, and the system monitors and reports on responses.

In an alternative embodiment of the invention, PRMS (241) activity can be coordinated with suitable marketing or sales out-sourcing partners.

Distribution Segment (DIS)

Referring now to the figures, the distribution segment (DIS) (190) is responsible for taking a distribution order and executing it. A Distribution Order can include the item to distribute (i.e., Alert, TIR, etc.) and where to distribute it (i.e. list of e-mail addresses, pager numbers, etc.). The DIS (190) can parse the distribution order and forward it in portions to various distribution systems. These distribution systems can include e-mail, pager, facsimile, wireless, and the like.

The DIS (190) provides advantages with regard to error handling. If a transmission fails, for example, the invention provides a way to link this information back to the consumer's profile with an explanation of why there was an error. For example, status=XMIT ERROR, "invalid e-mail address: paul@ijet.com".

In another aspect of the invention, the DIS (190) can include an interactive voice response (IVR) capability. Using an IVR System, for example, a member can dial a telephone number (800, 900 or direct) and enter his/her member number and personal ID number (PIN) security code to gain access to his/her account. Using the IVR System and a series of selection options, the member can retrieve Alerts, TIR updates, etc. For example, "Press 1 for Alerts", "Press 2 for a TIR Update", "Press 3 for Options", "Press 4 for a Person", etc. If the member presses "1", the system can move to a second level, dynamic menu of options based on the active Alerts for the member. The Alerts can be listed in priority order with unread Alerts prioritized first. The system can, for example, list the Alerts "Press 1 Air Canada Strike", "Press 2 Snow Storm Hits Montreal", and the like. The member can select an entry at any time without listening to the entire list. By entering a selection, the system can read the selected entry. The member can select Back, Next, Pause, or Replay at any time while the message is being played.

Marketing Opportunity Identification Segment (MOIS)

Figure 18:
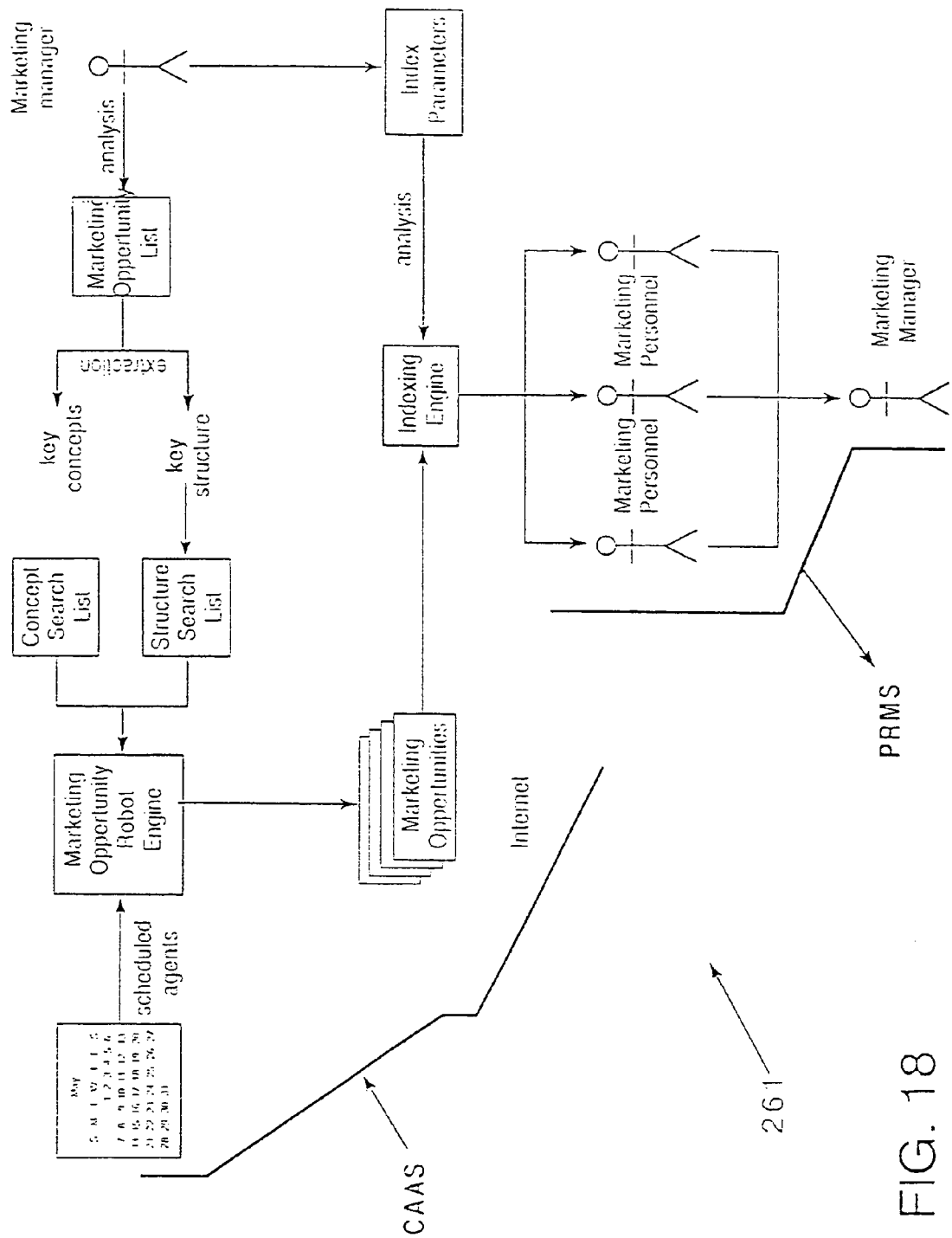
FIG. 18 is a flow diagram of an embodiment of the present invention.

Referring now to FIG. 18, a marketing opportunity identification segment (MOIS) (261) of the invention shares the technology base of the CIS (51) and conducts the initial and ongoing identification of sites that present marketing and partner opportunities. In one embodiment, once a base set of marketing opportunities has been established, an automated robot process can identify additional potential opportunities on a periodic basis. The robot process can be monitored and reviewed by marketing personnel on a periodic basis, and the criteria which drives these robots can be periodically validated.

This robot process can return identified opportunity lists. Refinements can be added by applying marketing-developed context to returned text. With this marketing-developed context, a high-level classification of the sites returned can be developed. The granularity of robot returns can be fairly coarse initially, and more finely grained as identification techniques are honed. Likewise, the levels of classification of robot returns can be fairly limited or have additional levels added.

In another aspect of the invention, multiple levels of robot activity can be implemented. A blanket robot can be employed, for example, that searches the internet for the word "travel," then discards duplicate hits or hits outside of <Title> or <meta> tags on internet sites that are searched. Another robot process can be utilized that looks for specific occurrences of the word "travel" in conjunction with other words (e.g., "booking") in specific structural elements of a searched site (e.g., only if both words occur in both the <title> tag and in <meta name=keywords> tag). Such robot processes can also be applied to non-HTML sources, can provide mechanisms for natural language queries, and can automatically route hit returns to marketing personnel or out-sourced marketing/sales organizations affiliated with the internet site of the invention.

In an another embodiment, MOIS (261) information can be funneled to out-sourced sales and marketing resources and/or the PRMS (241).

Yellow Book Online Segment (YBOS)

Figure 19:
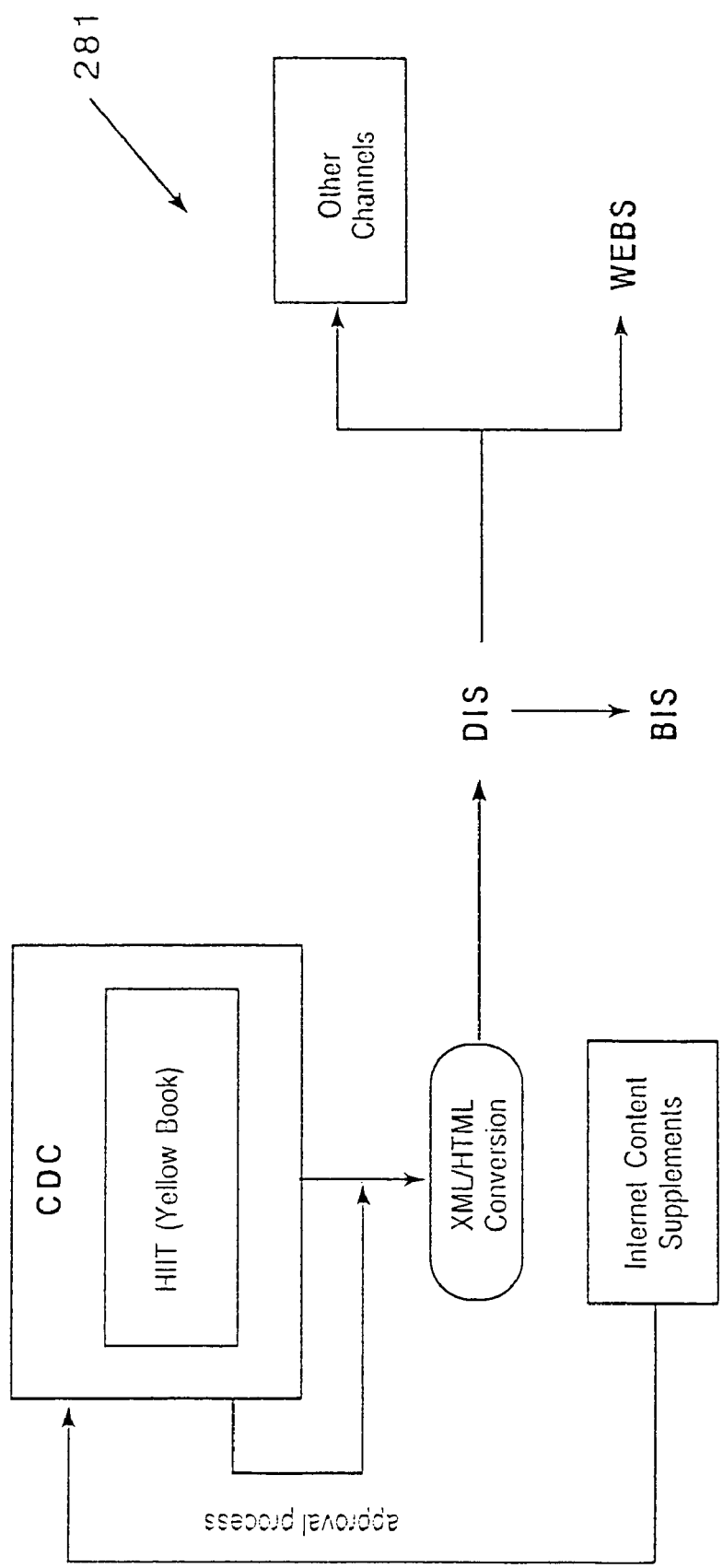
FIG. 19 is a flow diagram of an embodiment of the present invention.

Referring now to FIG. 19, in another aspect of the invention, the yellow book online (YBO) (281) can be provided as a segment including an electronic version of the CDC's Health Information for International Travelers. The YBO (281) can be a verbatim translation of the print version, with a full-text search and retrieval mechanism. In another embodiment, the YBO content can be syndicated to other internet sites via the use of a direct search link to the YBO (281) on the internet site or through a content window displayed directly from the internet site.

In another aspect of the invention, further employment of the YBO (281) can include enhanced input conditions for a search (e.g., full-text search only on a specific country) and enhanced output (e.g., optional summaries of page "hits"). The Yellow Book Online will provide the core health information for the system.

Web Segment (WEBS)

Figure 20:
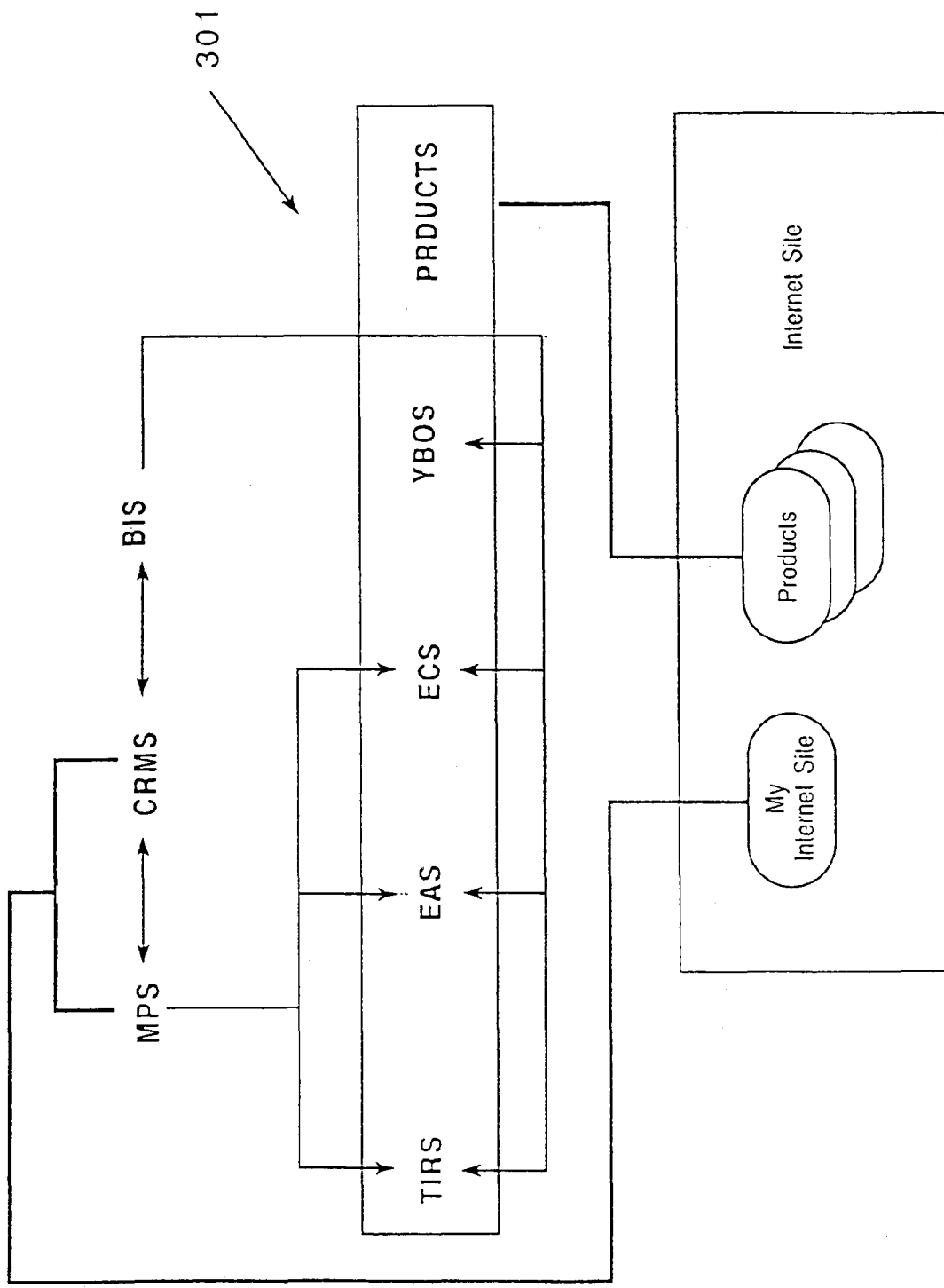
FIG. 20 is a conceptual flow diagram of an embodiment of the present invention.

Referring now to FIG. 20, a web segment (WEBS) (301) of the invention as shown represents the situation where the internet site is a distribution channel for its content, products and services.

Technology Infrastructure Segment (INFS)

Figure 21:
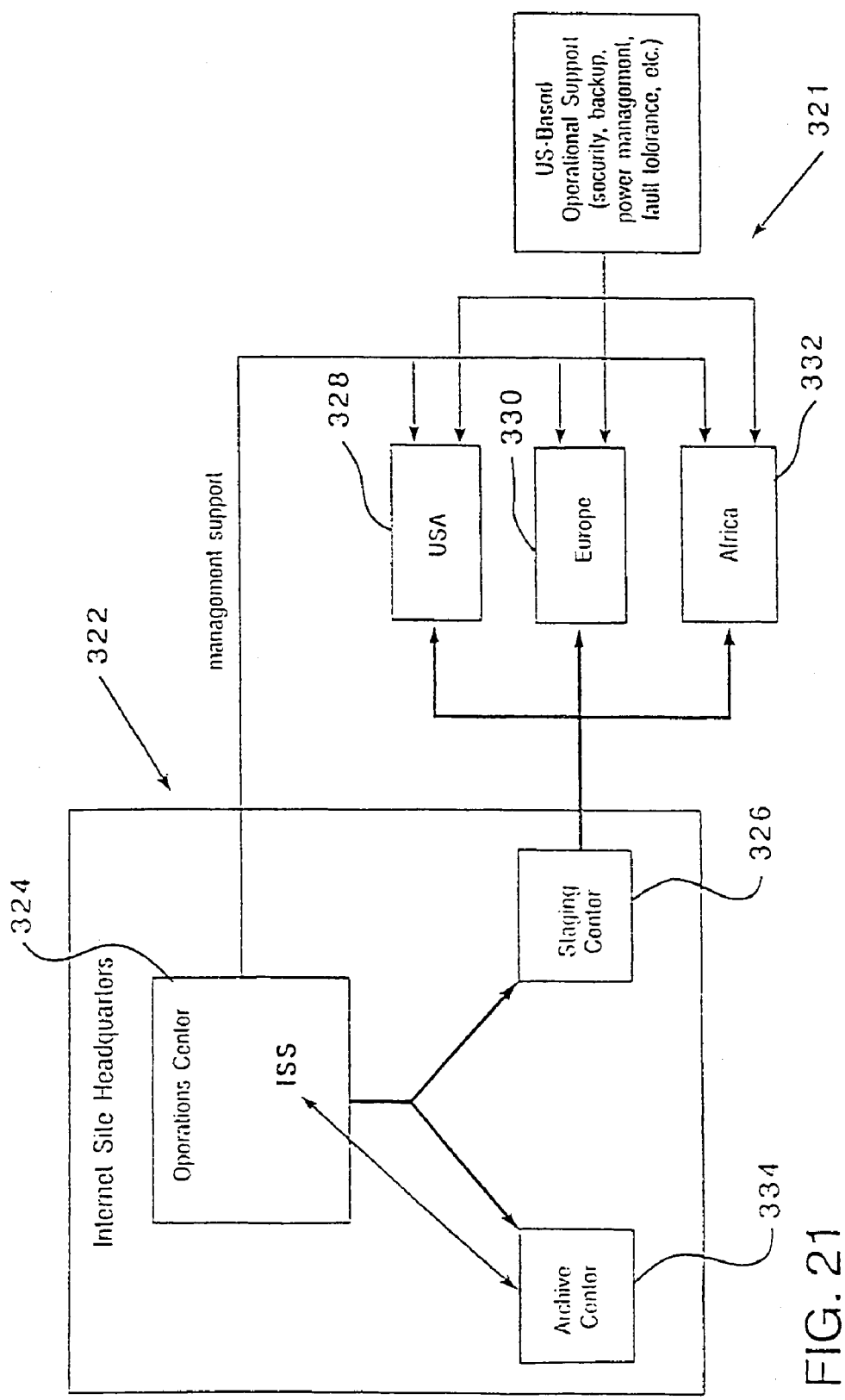
FIG. 21 is a system diagram of an embodiment of the present invention.
Figure 22:
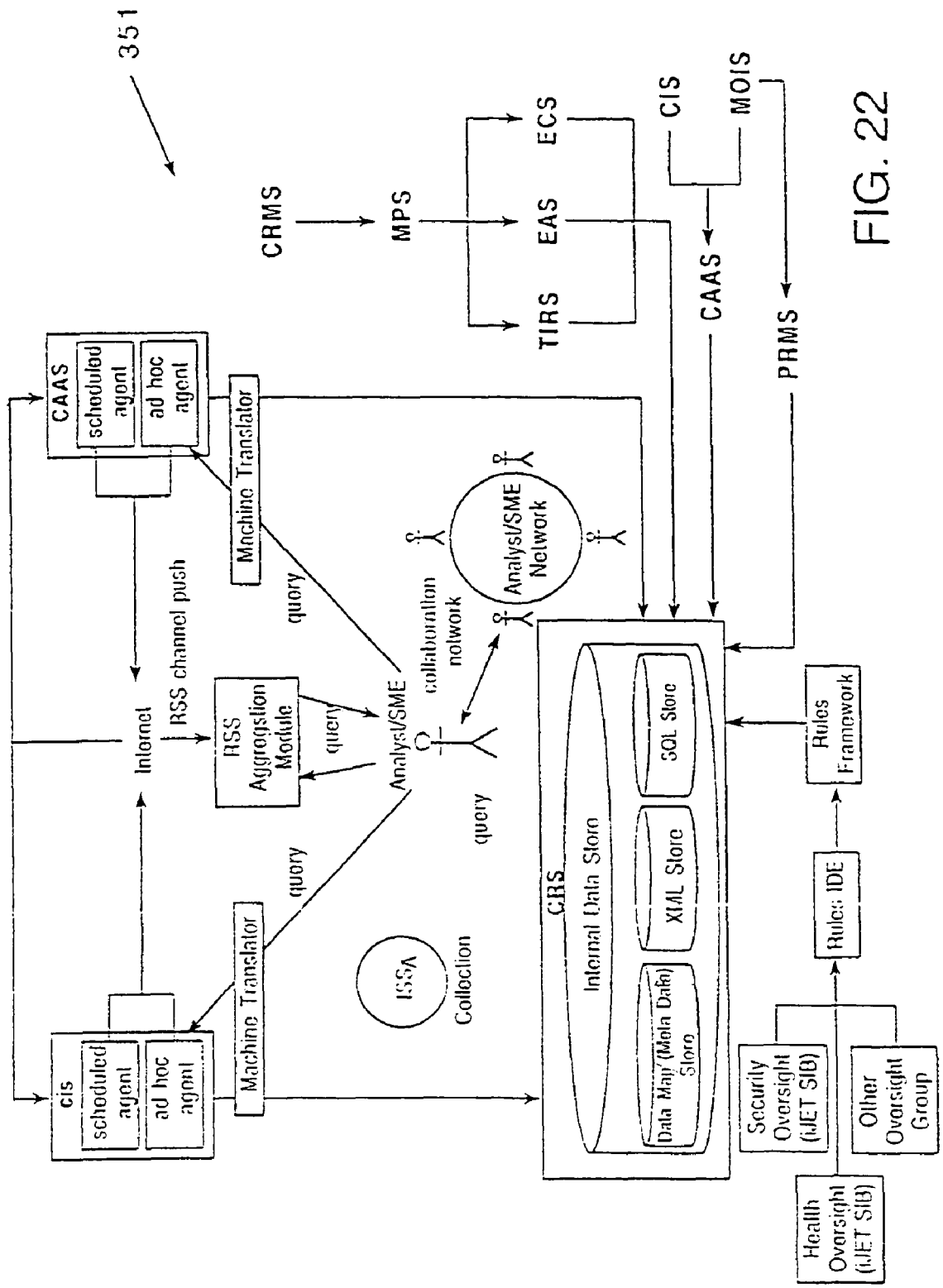
FIG. 22 is a system diagram of an embodiment of the present invention.

Referring now to FIG. 21, in another aspect of the invention, an infrastructure segment (INFS) (321) is provided that includes an operations center and a staging center along with a collocated site in, for example, the United States, Europe, Africa and other suitable international locations. In this embodiment, the primary information activity occurs at an internet site headquarters 322 with an operations center 324. This information activity can then be staged to a staging center 326, and then replicated to one or more of the collocated sites 328,330,332.

In another aspect of the invention, an archive center 334 can be created at the internet site headquarters. This archive center 334 can store all travel information activity, including historical, administrative, and metric data. This archive center 334 can also be integrated with the ISS (351) so that business information mining and new product creation can be supported.

It can be appreciated that these collocation services can be top-tier, including caching network operations and RAIS (redundant array of independent systems) in a load-balanced environment. Services can include, but are not limited to, the following:

Bandwidth Services
Multi-line local area network (LAN) Connection
Reporting Services
Proactive, Multi-Channel Notification
Bandwidth Reports
Network Caching
Managed Monitoring Services
  Network Monitoring
  URL Monitoring
  Reboot Service
Multi-path Services
Data Vault Services
Security Services
  Intrusion Detection
  Vulnerability Analysis
  Managed Firewall
Information System Segment (ISS)

In one embodiment of the invention, an information system segment (ISS) (351) has three functional subsystems: Collection, Analysis, and Distribution/Storage.

In the invention, the Collection subsystem centers on an analyst or SME who has domain or geographic expertise. Standard content feeds for his/her domain are substantially continuously being examined, as is existing content in the CRS (91). In addition, more focused content is captured by ad hoc queries through both the CIS (51) and the CAAS (71). These queries can be run through a machine translator prior to content acquisition if specialized, foreign language content resources are presented as information sources. In addition, based on return set content, machine translators can also be used prior to CRS (91) storage. Analysts/SME's can also use an RSS Aggregation Module. This module can allow each analyst/SME to develop his/her own, personalized set of headline content that can be scanned on a regular basis.

The CRS (91), outside of its standard data structure, has pre-applied templates that ensure the validity of information returned in analyst/SME queries. These templates are in the form of rules frameworks that are defined by partners such as a Health Information Board (HIB). The Collection subsystem relies on the interfaces between CRMS, PRMS (241), and MPS: Partner and Member activity history and itinerary information can contribute greatly as a background to information activity. Also key to the Collection subsystem is a collaboration network that the analyst/SME participates in with other analysts/SME's. Using the collaboration network, queries and return sets can be analyzed by more than one analyst/SME to ensure validity.

In the invention, the Analysis subsystem operates with a marshaled query on information returned by the Collection subsystem. Such queries can be done, for example, by using meta data searches, with On-Line Analytical Processing (OLAP) tools, or using conventional pattern recognition technologies. Return sets from these initial analysis queries are filtered through two pipes: a filter pipe and an index pipe. The filter pipe applies semantics to incoming signals based on meta data associated with them. If this approach is unsuccessful, semantic application can be attempted based on content. Feature extraction can next be performed to ensure that any semantic application considers multi-semantic issues. The index pipe attempts to index incoming signals based on keywords, thematics, and hierarchical clustering.

At least two key elements are associated with the filter and index pipes. The first is operational qualification agents. These agents capture specific, pre-determined linguistic patterns and can be event-based or schedule-based. Once an operational qualification agent captures a signal, the signal is classified and moves on through the system without proceeding through additional filtering and indexing.

Both the filter and index pipes are dynamic mechanisms, which are not only modified manually, but "learn" through the application of an analysis engine. This analysis engine is a network of adaptive fuzzy feature modules (AFFN's) that collectively comprise an adaptive temporal correlation network (ATCN). AFFN's and ATCN's provide managed artificial information and capture patterns and correlations between linguistic elements that are either too time-intensive for humans to capture or practically impossible without computational assistance.

Once a signal has morphed into an information block (i.e., it has some classification associated with it), the block itself can be considered information or, in the case of misclassification, remain information without attached semantics. At this point, the analyst/SME either validates the information or adds semantics to the information. This can be done through using the information block as input to additional mechanisms in the Collection subsystem, or using the collaboration network and additional analysts/SME's to reach a consensus.

In the invention, aggregated information is classified again as supplemental content or as an alert. If it is classified as supplemental content, the aggregated information is forwarded to the CMS (131), where the content manager filters it through an editorial process. At this point, the supplemental content can be discarded, accepted as is and sent to the CRS (91), or sent back to the analyst/SME for additional analysis. If the aggregated information is classified as an alert, it is sent to an alert framework, along with its meta data. Additional meta data is assigned (e.g., data/time, GIST, alert type) and then concomitantly sent to CRS (91) and distribution list development.

In summary, the method and system of the present invention offer a travel information functional architecture that defines and supports gathering, analysis, storage, and personalized product/service delivery of accurate, comprehensive, and personalized travel information. The method and system of the invention provide a breadth and richness of information sources and acquisition, sophistication of external oversight, advisement, and business rule development processes applied to travel information development, diversity of product and delivery mechanisms, and a comprehensive application of supporting business and technology architecture. The result is an online intelligence agency that both feeds into and is driven by the global airline reservation system.

The following example is intended to be an illustration of certain embodiments of the invention and is not intended to limit the scope of the invention:

An Example of the Travel Information System

The travel information system operates in three distinct phases.

In phase one, information is collected from online sources and analyzed by regional analysts. These analysts screen the information, iron out discrepancies, edit and format the information, and send it to the data store.

In phase two, a traveler enters the system through one of many distribution points in the travel industry. An example would be a traveler who decides to purchase a Travel Intelligence Report (TIR) while purchasing an airline ticket from a travel web site. After purchasing the ticket, the traveler is presented with an online profile form, which is already populated with the traveler's client record and e-ticket information, forming the core profile; he can either accept this profile with a single click, or supplement it with more information. In either case this profile form is transmitted online to the internet site, where it triggers the application of appropriate rules, and the retrieval of pertinent content from the data store.

In the third phase, this content is then assembled into a TIR and delivered to the traveler. The traveler can then print and/or download the TIR. At any point up to 30 days after his return the traveler can also pull up the report online and view the latest version. If any significant changes occur to the underlying information, the report e-mails the traveler. In addition, if the traveler has purchased a separate wireless alert product, the traveler can be notified on his wireless platform.

Global Asset Risk Management

Figure 25:
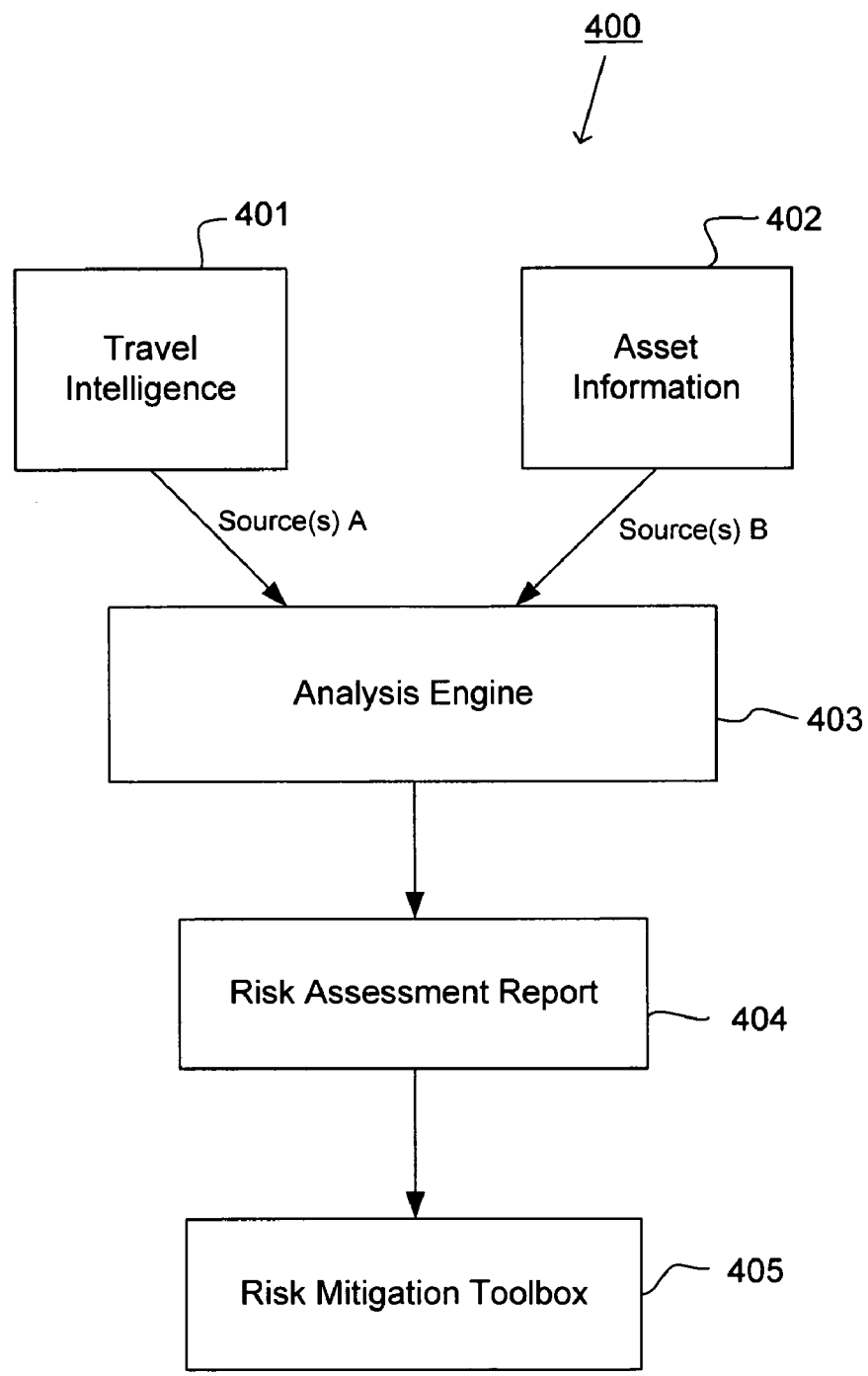
FIG. 25 is a functional flow diagram of a global asset risk management system according to at least one embodiment.

FIG. 25 is a functional block diagram of a global asset risk management system 400 according to at least one embodiment. Referring to FIG. 25, the global asset risk management system 400 may include at least one travel intelligence source 401 and at least one asset information source 402. The travel intelligence source(s) 401 may include the CIS 51 and CAAS 71, or the intelligence or information associated with the CIS 51 and CAAS 71, as described herein. For example, the travel intelligence source(s) 401 may include a notification of an event or evolving security situation that creates an increased risk for nearby assets. In an embodiment, the asset information source 402 may include company proprietary asset information such as, for example, but not limited to, geographic location information for company employees or facilities. In at least one embodiment, the geographic location information may include an objective set of coordinates identifying the location of the asset(s) (e.g., facilities, office locations, or personnel). For example, the geographic location information may include the current or a recent set of Global Positioning System (GPS) coordinates. Furthermore, the geographic location information may include the current or a recent set of coordinates from a Geographic Information System (GIS). In at least one embodiment, the system 400 may include an expatriate management module embodied using a sequence of programmed instructions to configure the system 400 to perform employee or expatriate risk management as described herein.

In at least one embodiment, asset information may include for example, but not limited to, information for traveling employees who are traveling to, from, or through and/or are present in a country outside their home country (e.g., country of citizenship) for a relatively short period of time (e.g., a current travel situation), as well as employees who are present in a country not their home country for an extended period of time. As referenced herein, a "trip" may be associated with a traveler or a current travel situation, while an "assignment" may be associated with a long-term stay in a country that is not the home country. Further, an employee with an assignment for a long-term stay in a country other than the home country for an extended period of time may be referred to as an expatriate. Thus, in an embodiment, an employee may be associated with a trip or an assignment, or both. An employee who is associated with a trip may be a traveler. An employee who is associated with an assignment may be further categorized as an expatriate, a Very Important Person (VIP) such as, for example, an executive, or a dependent. A dependent may be a family member or relative of an employee who also present in a country other than their home country for an extended period of time. In at least one embodiment, the asset information may include a link or attribute to associate a dependent with an employee.

Furthermore, multiple employees, of any of these types, may be associated by the system into one or more groups based on one or more common attributes. For example, a group of employees traveling together to a meeting or a conference may define a group. In at least one embodiment, the system may output a report indicating the total number of employees and their dependents in a given location. The system may thus provide the user with the capability to immediately determine the number of people affected by an event or threat, as well as the total number of people to be transported should evacuation be necessary.

Figure 39:
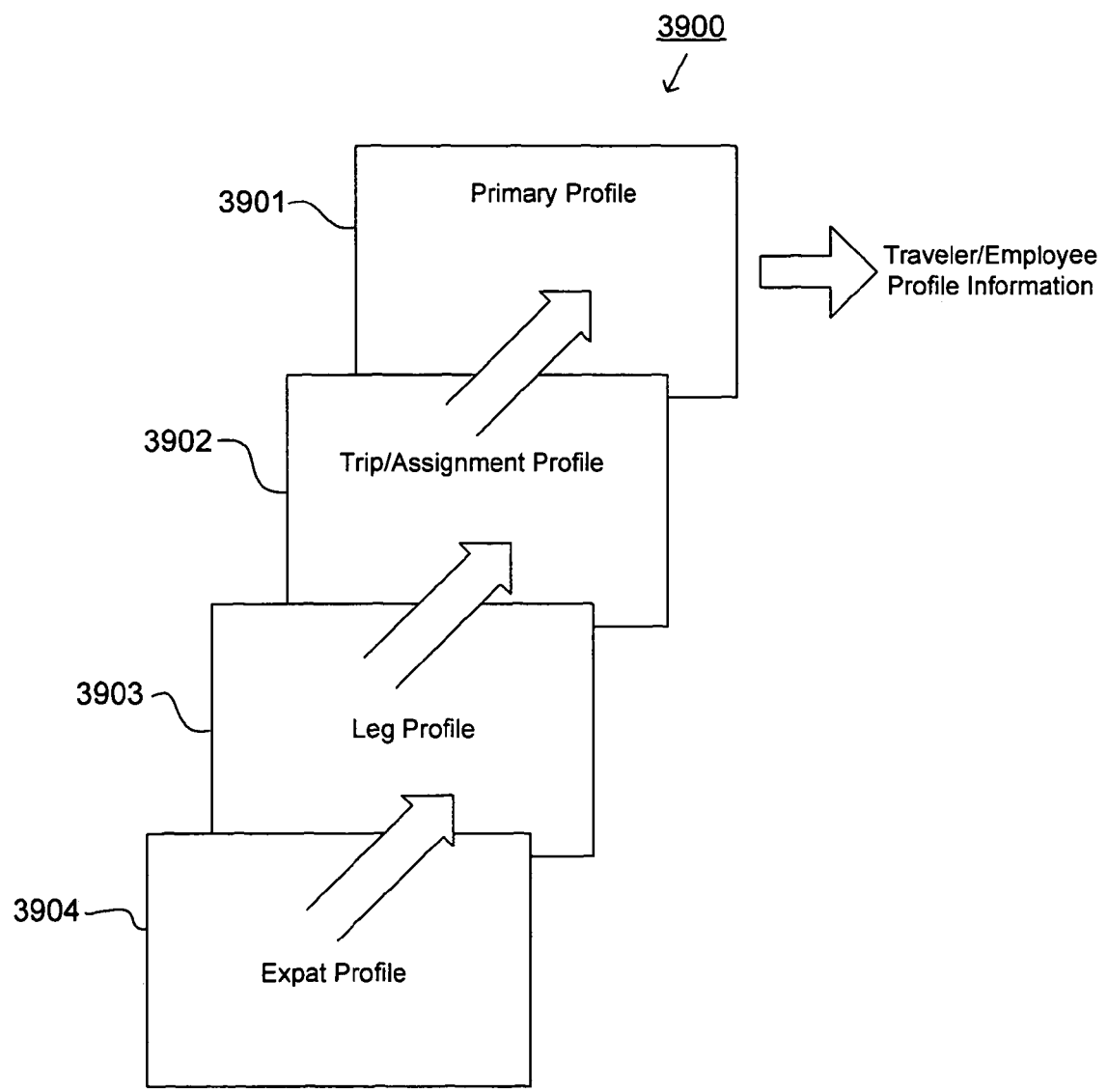
FIG. 39 is an example employee profile hierarchy according to at least one embodiment.

In an embodiment, the system may provide for establishing and maintaining an employee profile. For example, the employee profile may be included with and maintained as asset information. For an Expatriate (EXPAT) employee, the employee or expat profile may include detailed personal information on the Expatriate or Expat Dependent required in the event of an incident (i.e., accident, kidnap, death, etc.) or for overall proactive risk management needs. The employee may be responsible for maintaining his information current in the asset database. In at least one embodiment, the employee profile may be hierarchical such as the example employee profile shown in FIG. 39. Referring to FIG. 39, the hierarchical employee profile 3900 may include four levels, for example. The first level, the Primary Profile 3901, may be the default profile in the system. This typically represents the employee's home base contact information and key travel related information such as Passport, Citizenship, etc. The next level profile is the Trip/Assignment Profile 3902. For expatriates, VIPs, and Dependents, the Trip Profile 3902 may include assignment information. The Trip/Assignment Profile 3902 may override the Primary Profile 3901 with information that is unique for a given trip or assignment such as a rental cell phone number or specific emergency contact information. The third level profile is the Leg Profile 3903. The Leg Profile 3903 may override both the Trip/Assignment 3902 and Primary Profiles 3901 and contains information specific to that leg of the trip. For example, local business offices contact information, local cell phone rental, etc. For expatriates, the employee profile may include additional Expat Profile 3904 data elements such as, for example, photo, handwriting samples, etc. Some of this data may be associated with the Primary Profile 3901 for the employee and other information may be specific to the assignment. In an embodiment, the Expat Profile 3904 may include information for both the Expat (EXPAT) and Expat Dependents (DEP) such as, but not limited to, personal information for the EXPAT and/or Dependents.

In at least one embodiment, each member of a group may inherit a common Primary Profile 3901 and Trip/Assignment Profile 3902. Thus, if the Primary Profile 3901 or Trip/Assignment Profile 3902 is changed, the changes are reflected in each group member employee's profile. However, if a Group Member adds or modifies a Leg, this would be preserved and not affected by changes made to the Primary Profile 3901 or Trip/Assignment Profile 3902. This allows a Group Member to alter the base Itinerary for side trips, ate arrival or early departure, etc.

Figure 40:
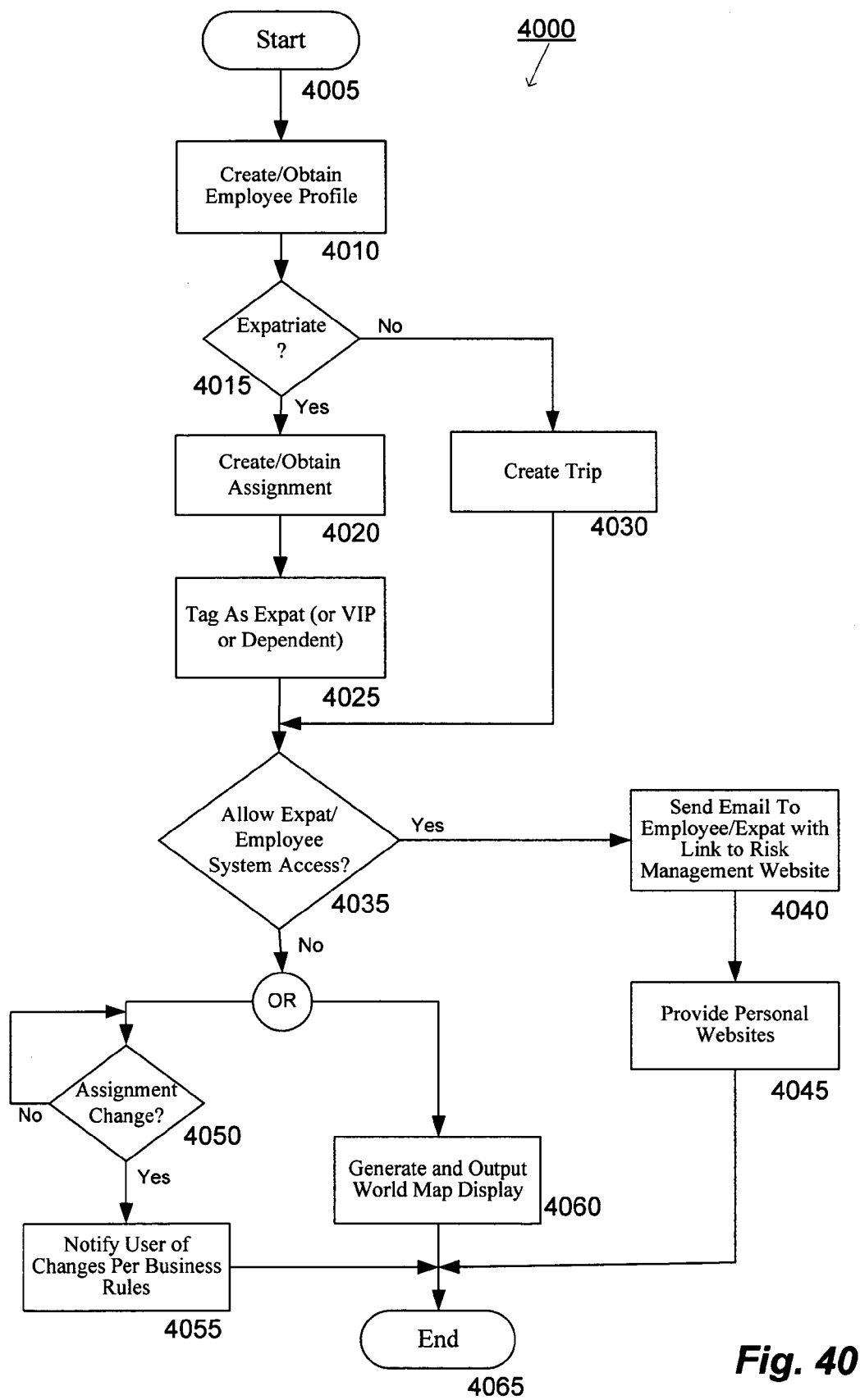
FIG. 40 is a flow chart of a method for establishing asset information in accordance with at least one embodiment.

FIG. 40 is a flow chart of a method for establishing asset information for an employee (including Expats, VIPs, and Dependent type employees) in accordance with at least one embodiment. Referring to FIG. 40, a method 4000 may commence at 4005. Control may then proceed to 4010 at which a user may create or obtain an Employee or Expat Profile either manually or via a bulk loading mechanism from, for example, an Excel spreadsheet input file. The bulk loading capability may support a subset of the Expat Profile data elements. Embodiments may also include the capability to create an Expat Profile and register an Assignment from a web page on the organization's intranet. After the Employee enters his/her identifying information (i.e., Last Name, First Name, Employee ID, E-mail Address, etc.) the system may search for an existing Traveler Profile before creating a new profile in the system.

Control may then proceed to 4015, at which the method may determine if the employee type is Expat, VIP, or Dependent. If the employee type is one of these three, then control may proceed to 4020 to establish an Assignment. In an embodiment, an Assignment may be created manually. Once an Assignment is registered with the system, the system may, optionally (based on company-specific settings), provision the global asset risk management service for the Employee. Control may then proceed to 4025 where, in at least one embodiment, any employee that has an active Assignment (e.g., not expired, current date past the Assignment Departure Date) may be categorized as an Expat by, for example, tagging the employee profile with, or including therein, an "EXPAT" attribute. However, in an embodiment, an Employee may also be an EXPAT with an active Trip. In this case, the Trip may take precedence over the Assignment when reporting on the employee's location. Furthermore, an employee may be categorized as a "Very Important Person" for whom kidnapping or other particular threats have a higher chance of occurrence. For example, to the EXPAT attribute may be added an additional attribute called "VIP." The VIP attribute may enable a user to tag any employee profile as a VIP (e.g., Sr. Executive, Director, Country Manager).

If at 4015 it is determined that the employee is not an Expat (or VIP or Dependent), then control may proceed to 4030, at which a method may establish a Trip. In an embodiment, a Trip may be created manually. Control may then proceed to 4035 where, in at least one embodiment, an indication may be received from a user as to whether or not to allow an Employee/Expat to access a personal website.

If at 4035 the user directs that the Expat web-based service be provisioned for the Expat, then control may then proceed to 4040 at which an Expat Welcome E-mail is sent to the Employee based on, for example, the Expat Profile Primary E-Mail Address. In an embodiment, the Welcome E-mail may include a hyperlink which upon user selection will enable the Employee to access a personalized Expat website which may be, for example, a risk management website. Control may then proceed to 4045, at which the method may include outputting or providing an EXPAT personal web site that includes several additional features accessible by an EXPAT such as, for example, View/Edit Assignment, extended Personal Profile, and Add/Modify/Delete Profiles for a Group (i.e., Family). Furthermore, an EXPAT may be provided the capability to Add Locations to the Assignment for Alert Notification. This may be useful when, for example, an Employee works from the Assignment Location, but travels throughout the Region (i.e., AO or TO).

Control may then proceed to 4050, at which the method may monitor for an Assignment change by an Employee/Expat (including VIP or DEP). If an Assignment change is made, then control may proceed to 4055 at which one or more User Notifications may be provided to inform a user whenever an Assignment is added or changed or when a VIP registers a Trip. Other Notification Rules or business rules may include filters by EXPAT, DEP or VIP to enable a user to focus on Expats and/or VIPs.

In addition, control may proceed to 4060 at which the method may include generating and outputting a report including a World Map. The World Map report may include a filter to display Expats and/or VIPs by, for example, Organizational Unit. An Employee Locator function may provide the user the capability to query and report on only EXPAT/DEPIVIP Employees. Control may then proceed to 4060, at which a method may end.

Figure 23:
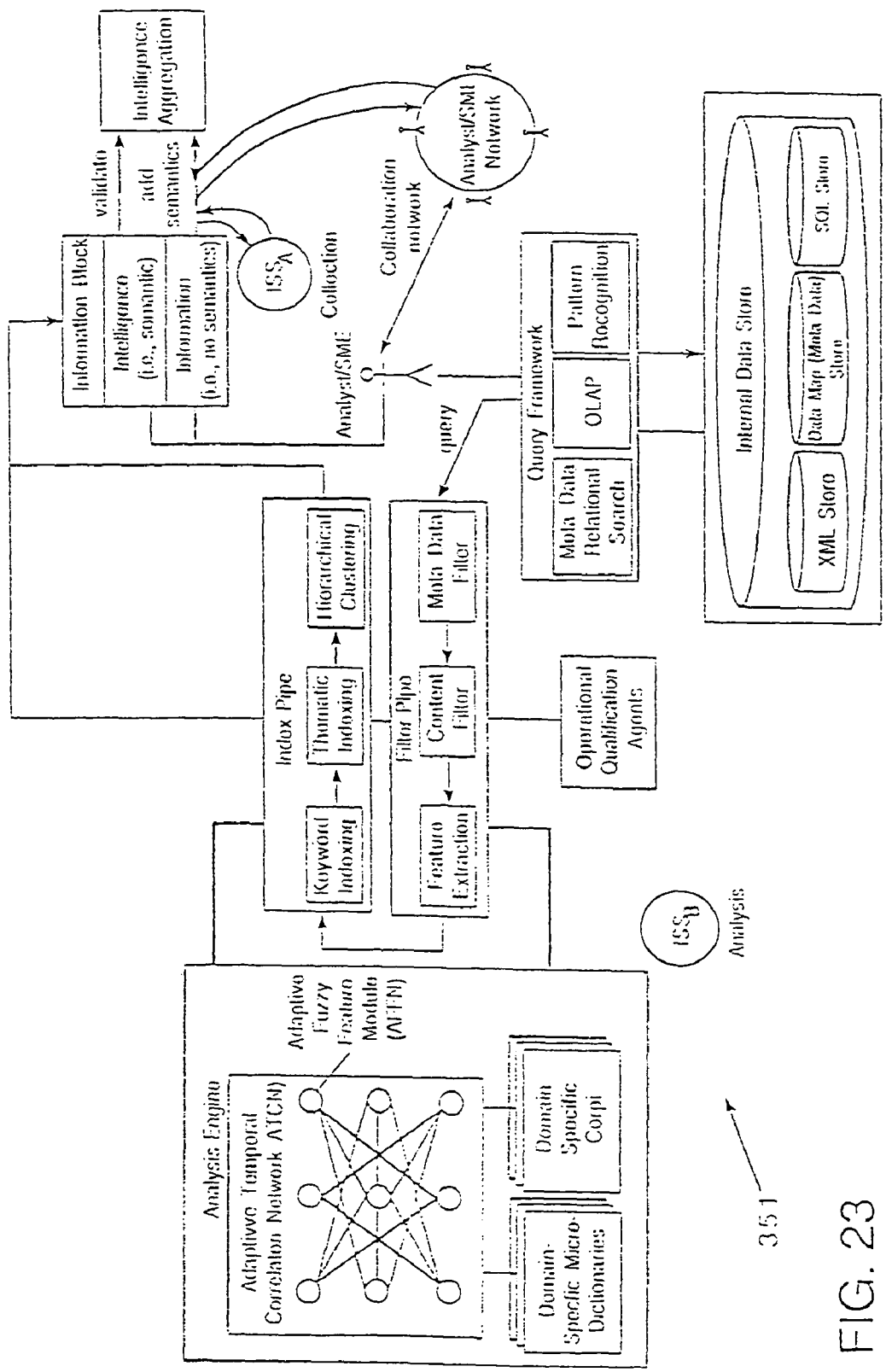
FIG. 23 is a system diagram of an embodiment of the present invention.
Figure 24:
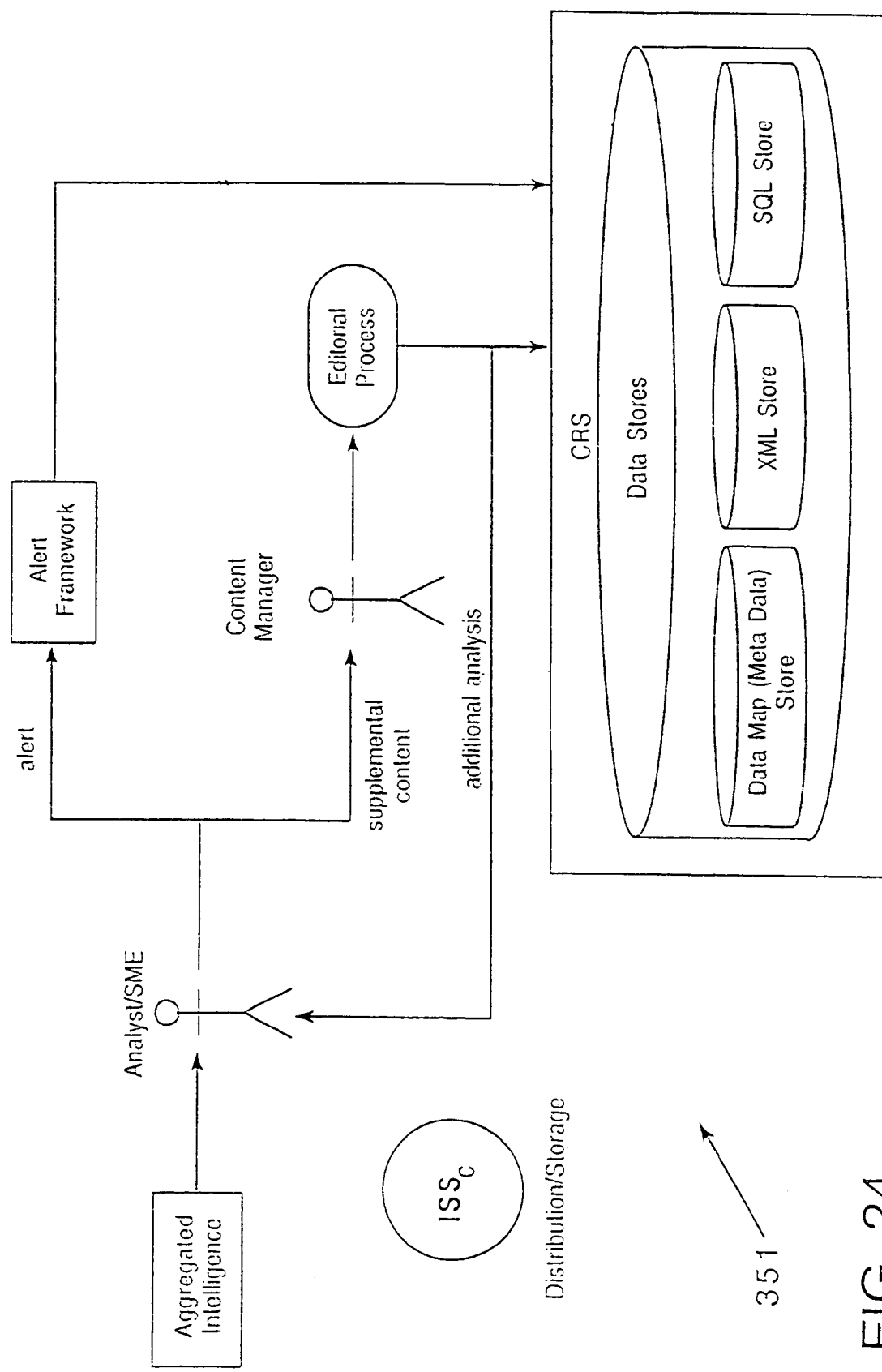
FIG. 24 is a system diagram of an embodiment of the present invention.

Returning to FIG. 4, an analysis engine 403 may receive intelligence or information from the travel intelligence source(s) 401 (e.g., Source A) and the asset information source(s) 402 (e.g., Source B). In an embodiment, the analysis engine 403 may correlate the intelligence information (e.g., Source A) with the asset information (e.g., Source B) to determine if one or more assets is proximate to an intelligence event that could impact the security, health, freedom of movement, or otherwise adversely affect the environment in which the assets operate. An asset may include anything of value that is owned or managed by the organization. Assets may include employees, facilities, material, etc. If so, the analysis engine 403 may produce a risk assessment report 404 by, among other things, mapping or correlating travel intelligence with asset locations. In at least one embodiment, the analysis engine 403 may be as shown and described with respect to FIGS. 3, 7, and 23.

As discussed herein, an area of operation (AO) may refer to the local geographic area where an employee (including EXPAT, VIP, and Dependents) will operate typically bounded by local transportation capabilities (i.e., car, bus, taxi, etc.). A Theater of Operation (TO) may refer to a broader operation geography than the AO that typically requires long-range transportation such as an aircraft or ship. A Threat (or Hazard) may refer to a negative event that may be the source of danger or harm to an Asset. Exposure may be defined as the condition where an Asset may be impacted by a Threat. For example, what Assets (i.e., employees, facilities, etc.) may have been impacted by an earthquake in the AO.

In an embodiment, the global asset risk management system 400 may assign one or more geocodes to an intelligence related event to aid the analysis engine 403 in rendering the determination. The geocode for an intelligence event may include informational elements including, but not limited to, the intelligence category to which the event is assigned, the geographic coordinates of the epicenter of the event (e.g. latitude and longitude coordinates), and a threat perimeter for the event. Thus, each combination of the elements comprising a geocode represents a unique geocode for an event, and an event may have more than one associated geocode (e.g., different threat perimeters). The threat perimeter may be of any shape such as, for example, circular, elliptical, regular polygon, or irregular polygon.

In at least one embodiment, the risk assessment report 404 may be a data set illustrating the vulnerability of an asset or assets in the context of an intelligence event (e.g., threat). By providing the user with an indication of the asset vulnerability in the context of the threat posed by an intelligence event, the user is able to ascertain the risk to the asset and take appropriate mitigating action. The risk assessment report 404 may be a visual output to a user via text, graphics, or a combination thereof. The risk assessment report 404 may further include one or more electronic messages in combination with the output. The risk assessment report 404 may be output to the user, for example, via hardcopy printout, computer terminal display, or mobile device display such as a Liquid Crystal Display (LCD). For example, a risk assessment report 404 may include a worldview or world map display showing the location of assets and threats or events throughout the world. In at least one embodiment, the risk assessment report 404 may be available to one or more persons responsible for risk management within an organization and also made available to the affected employee (including expatriate, VIP, or Dependents).

Further, in an embodiment, the global asset risk management system 400 may provide a risk mitigation toolbox 405 to assist an asset manager or risk manager, or a person or group who is responsible for the asset at risk, to counteract and/or respond to the increased risk environment. The risk mitigation toolbox 405 may include one or more tools that serve to provide the asset manager with information, which may include intelligence or intelligence related information, useful in mitigating the increased risk environment for the asset. In at least one embodiment, these tools may be made available to the employee or expatriate as well. In an embodiment, Dependents may also request to receive this information, by, for example, editing a Dependent profile to enable receipt of such information, tools, or alerts. Examples of such tools include, but are not limited to, references to one or more documents specifying security response procedures, policies or procedures to be implemented in response to particular security threats, and the like. In an embodiment, instead of a link or reference to the document(s), an electronic copy of the document(s) may be made available for download by the asset manager using, for example, a computer equipped with a web browser. Other tools may include a notification system for disseminating travel intelligence or security related information and additional information regarding the asset(s) at risk.

Figure 26:
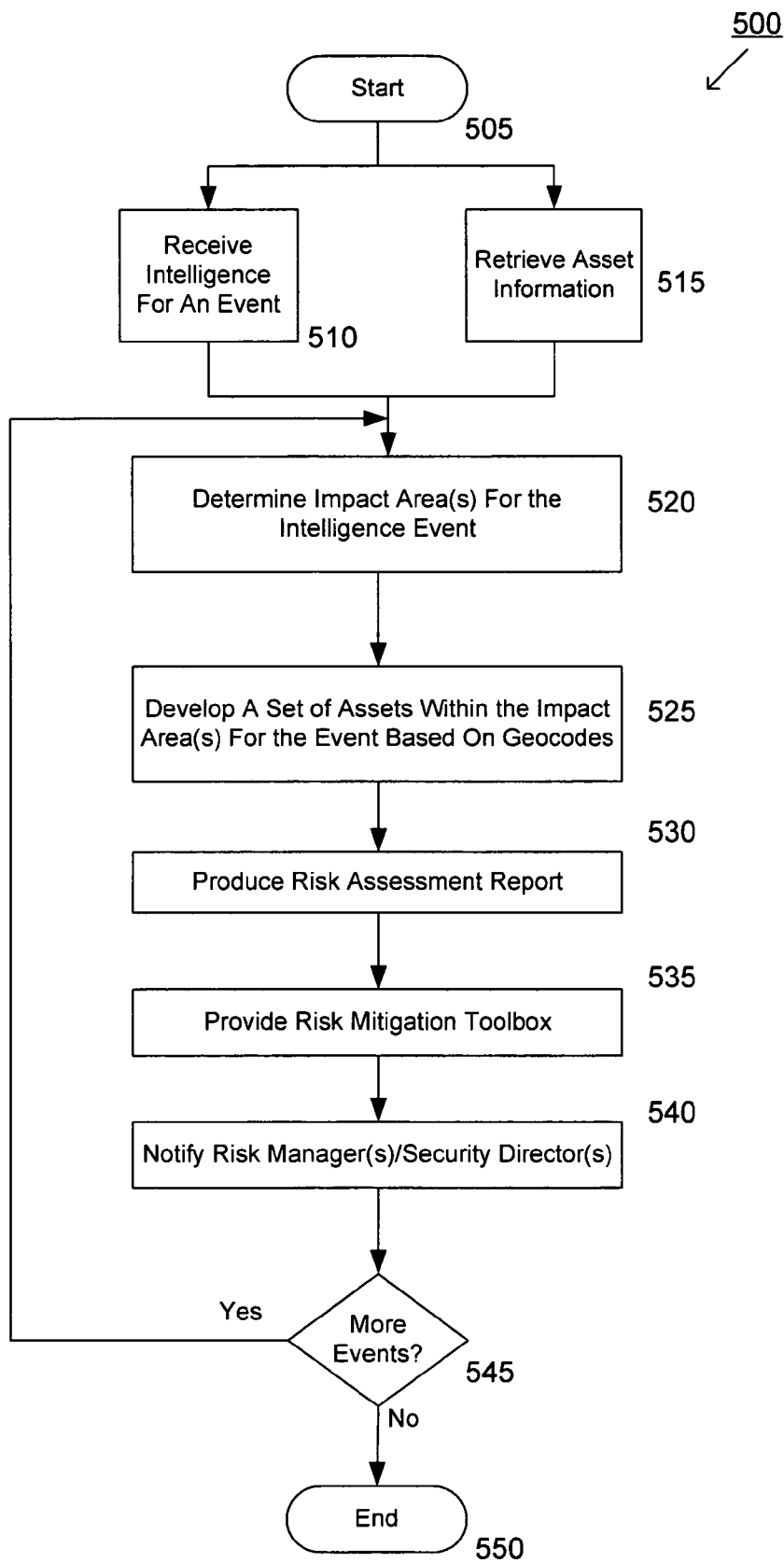
FIG. 26 is a flow chart of a global asset risk management method according to at least one embodiment.

FIG. 26 is a flow chart of a global asset risk management method 500 according to at least one embodiment. Referring to FIG. 26, a method 500 may commence at 505 and proceed to 510 and 515. At 510, a method may include receiving travel intelligence from at least one intelligence source. At 515, a method may include receiving asset information from at least one information source. The travel intelligence source(s) 401 may include the CIS 51 and CAAS 71, or the intelligence or information associated with the CIS 51 and CAAS 71, as described herein. In an embodiment, the asset information source may include company proprietary asset information such as, for example, but not limited to, geographic location information for company employees or facilities, as well as the employee profile information described herein. In at least one embodiment, the geographic location information may include an objective set of coordinates identifying the location of the asset(s) (e.g., facilities, office locations, or personnel). For example, the geographic location information may include the current or a recent set of Global Positioning System (GPS) coordinates. Furthermore, the geographic location information may include the current or a recent set of coordinates from a Geographic Information System (GIS).

Control may then proceed to 520, at which an analysis engine may determine one or more impact areas for an event based on the intelligence or information received from the travel intelligence source(s) and the asset information source(s). In an embodiment, this may include correlating the intelligence information with the asset information to determine if one or more assets could be impacted, in terms of security, health, freedom of movement, or otherwise adversely affected, by the occurrence or non-occurrence of a particular event, at 525. In an embodiment, the method may include assigning at least one geocode to an intelligence event to aid the analysis engine in rendering the impact assessment determination. If the analysis engine determines that one or more assets could be at increased risk due to an event, control may proceed to 530 at which the global risk management may produce a risk assessment report. In an embodiment, the increased risk may be reflected by assigning a correspondingly higher risk rating to the affected asset(s).

Figure 27:
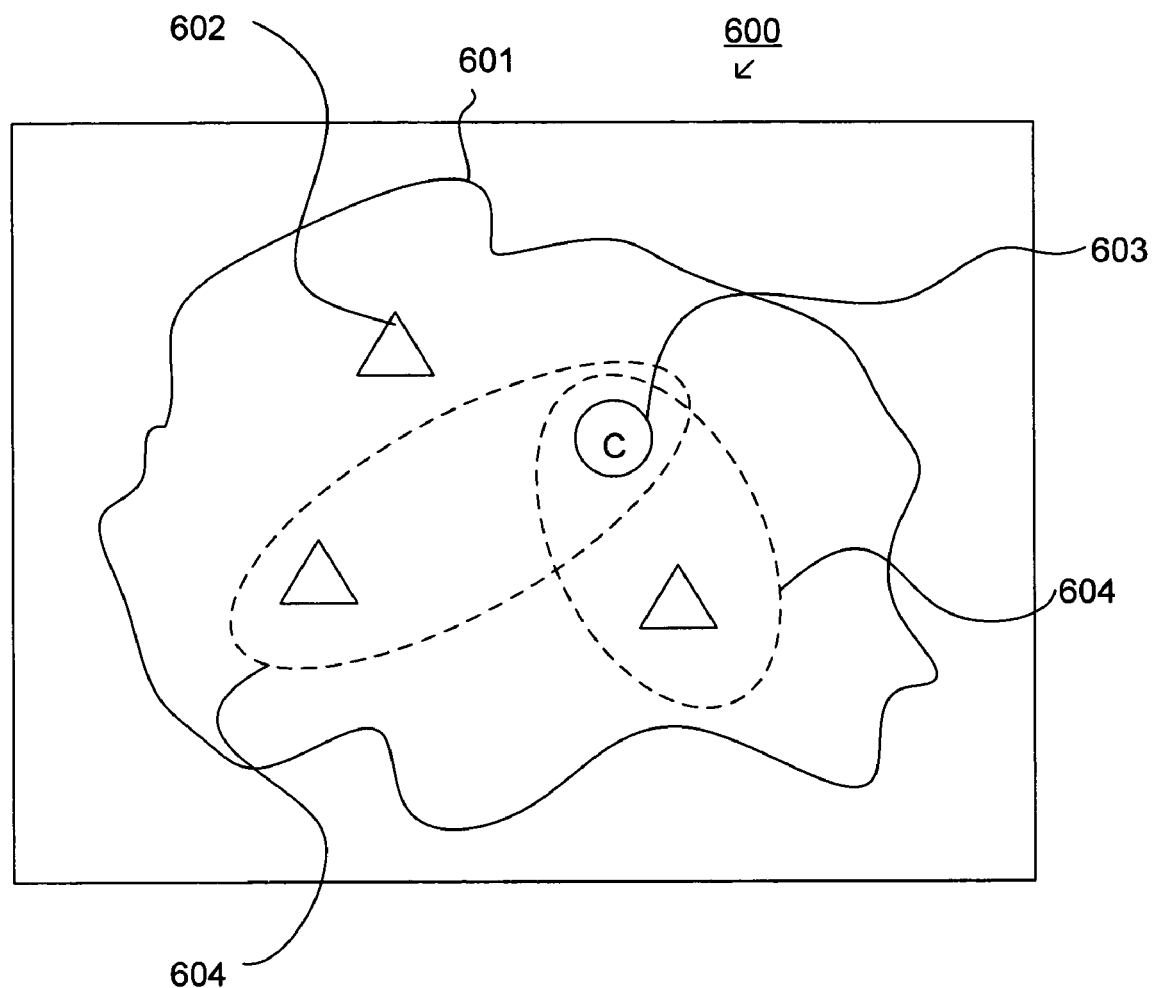
FIG. 27 is an illustration of a risk assessment determination according to at least one embodiment.

FIG. 27 is an illustration of a risk assessment determination or report 600 according to at least one embodiment. As shown in FIG. 27, this determination or report 600 may include identifying an impact area 604 associated with an intelligence event that is categorized as a critical alert. Each such critical alert may be assigned an epicenter 603. A map 601 may include an indication of a one or more asset locations 602 that could be affected by the increased risk environment based on, among other things, the asset being within one or more impact areas 604 associated with the epicenter of a critical alert 603. In an embodiment, multiple categories of impact areas 604 may be provided such as, for example, but not limited to, a transportation impact area or a security impact area. Other categories are possible. In at least one embodiment, the risk assessment report 600 may be output to a user, such as a risk manager or security director, in the form of a visual interactive page that may be displayed using a web browser of a computing or communications device. Alternatively, the risk assessment report 600 may be output via hardcopy print media.

Figure 35:
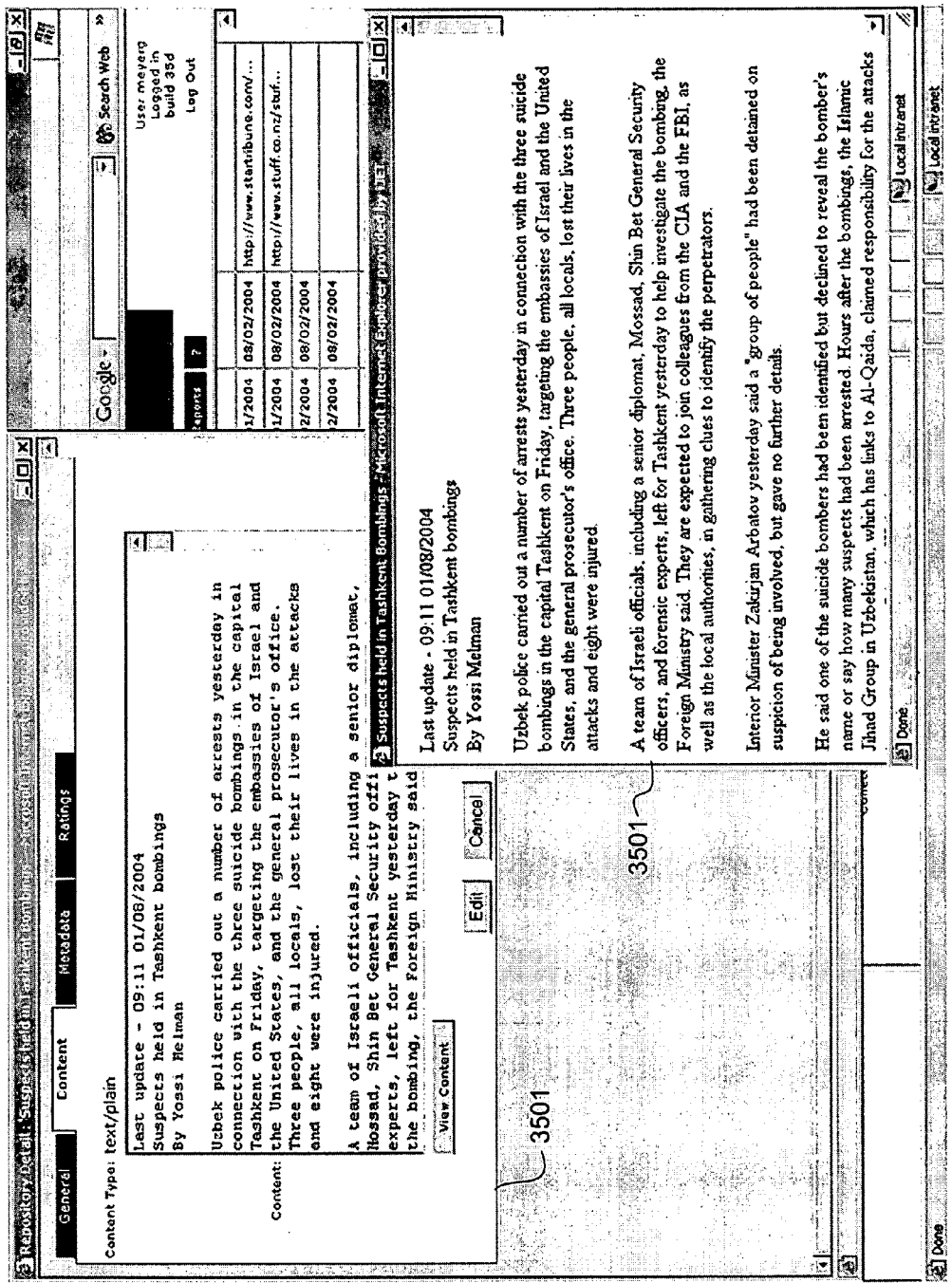
FIG. 35 is an exemplary reference document page in at least one embodiment.

Returning to FIG. 26, control may then proceed to 535, at which a method may include providing a risk mitigation toolbox to assist an asset manager, or a person or group who is responsible for the asset at risk, in responding to the increased risk environment. Examples of such tools include, but are not limited to, references to one or more documents specifying security response procedures, policies or procedures to be implemented in response to particular security threats such as evacuation plans, maps of facilities, and the like. In an embodiment, instead of a link or reference to the document(s), an electronic copy of the document(s) may be made available for download by the asset manager using, for example, a computer equipped with a web browser. An example of an document provided by the risk management toolbox is shown in FIG. 35.

Other tools associated with the toolbox may include a notification system for disseminating travel intelligence or security related information and additional information regarding the asset(s) at risk. The notification system may send a notification to an asset manager or to personnel affected by the event using a variety of communication media. The personnel who receive the notification may be pre-defined and stored by the system. The notification system may further review responses received in reply to a notification message to confirm successful notification delivery. In an embodiment, the notification system may assign different response categories to indicate notification transmission, notification receipt, and confirmation response. In at least one embodiment, the notification system may send notification messages according to a set of business rules. The business rules may include an escalation mechanism for ensuring that a critical alert is received by an asset manager, security director, or other individual or organization responsible for managing the asset(s) at risk. For example, if a notification is sent via e-mail and no confirmation response is timely received, then the escalation mechanism may automatically prompt the system to send the notification using a different communications channel or media for business continuity, such as, for example, triggering a telephone call to the e-mail recipient to ensure her receiving the notification. Multiple levels of escalation using a variety of communications media may be provided, including e-mail, telephone, pager, facsimile, satellite radio, or wireless device. Further, different escalation business rules may be provided for particular individuals.

The additional intelligence may be useful for a security director or asset manager to obtain intelligence for greater contextual understanding of a security threat or increased risk situation. For example, such additional intelligence may include recent intelligence events occurring in a neighboring country near an asset in an impact area. Furthermore, the system 400 may provide additional intelligence by applying the rules engine to a traveler profile as described herein.

Figure 28:
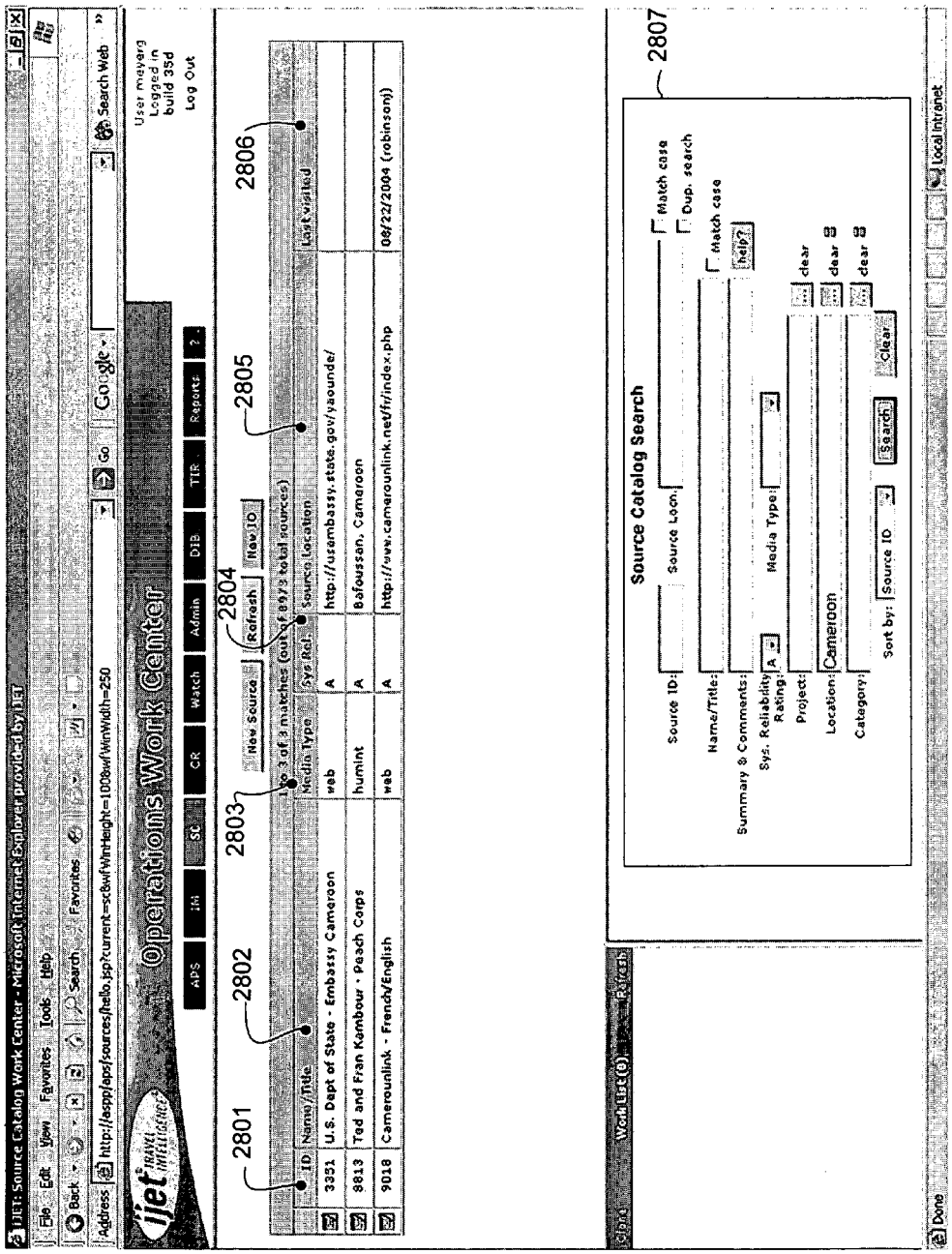
FIG. 28 is an exemplary source catalog page according to at least one embodiment.

Furthermore, in an embodiment, a user of the system 400 may be provided with the capability to determine the reliability of the intelligence used in determining a critical alert. In particular, the Content Identification Segment (CIS) may provide the capability for a user to review the source catalog information associated with an event such as, for example, an event leading to a critical alert. Thus, the system 400 allows the security director or asset manager to apply his personal knowledge in assessing the reliability, for example, of the source(s) of a critical event to be used in developing an appropriate response. In at least one embodiment, a user may interact with the global asset risk management system 400 to review the source catalog information maintained using the CIS. For example, FIG. 28 is an exemplary source catalog page 2800 listing one or more sources of intelligence used in determining a critical alert. Referring to FIG. 28, the catalog page 2800 may include, for each source, a source identifier 2801, a source name/title 2802, media type 2803, system reliability rating 2804, source location 2805, and a last visited date and/or timestamp. Each of these items may be entered by an analyst at an operations center facility of the global asset risk management system 400. Furthermore, the catalog page 2800 may include a source catalog search capability 2807. In an embodiment, the source catalog page 2800 may be an interactive page of a web browser application such as, for example, Microsoft™ Internet Explorer™.

Figure 29A:
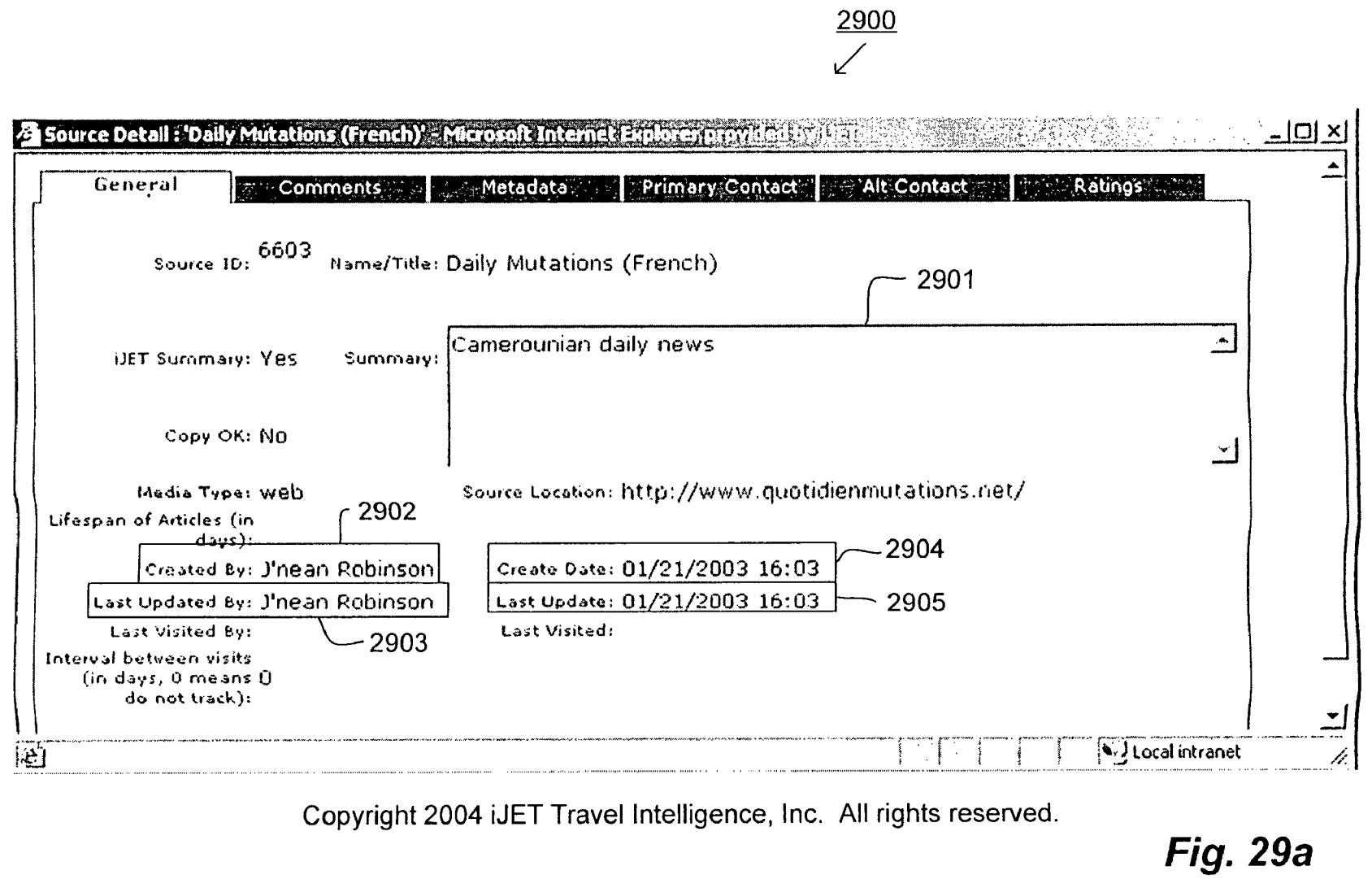

In an embodiment, upon user selection of a source by, for example, using a mouse and cursor to select the line including the above described source information, the global asset risk management system 400 may respond by outputting to the user one or more interactive pages including further detailed information associated with the source. Each source entry may be hyperlinked to the source catalog page or one or more detailed information pages, for example. Such detailed information interactive pages may include, but are not limited to, general information, comments, metadata, a primary contact, an alternate contact, and ratings. The detailed information may be maintained using the CIS. FIG. 29*a* is a first exemplary general interactive page 2900 showing general details associated with a source according to at least one embodiment. Referring to FIG. 29*a*, the general details page 2900 may include a source summary 2901, the name of the creating analyst or person 2902 who created the source, the name of the analyst or person 2903 who last updated the source, the creation date 2904, and the date last updated 2905.

Figure 29B:
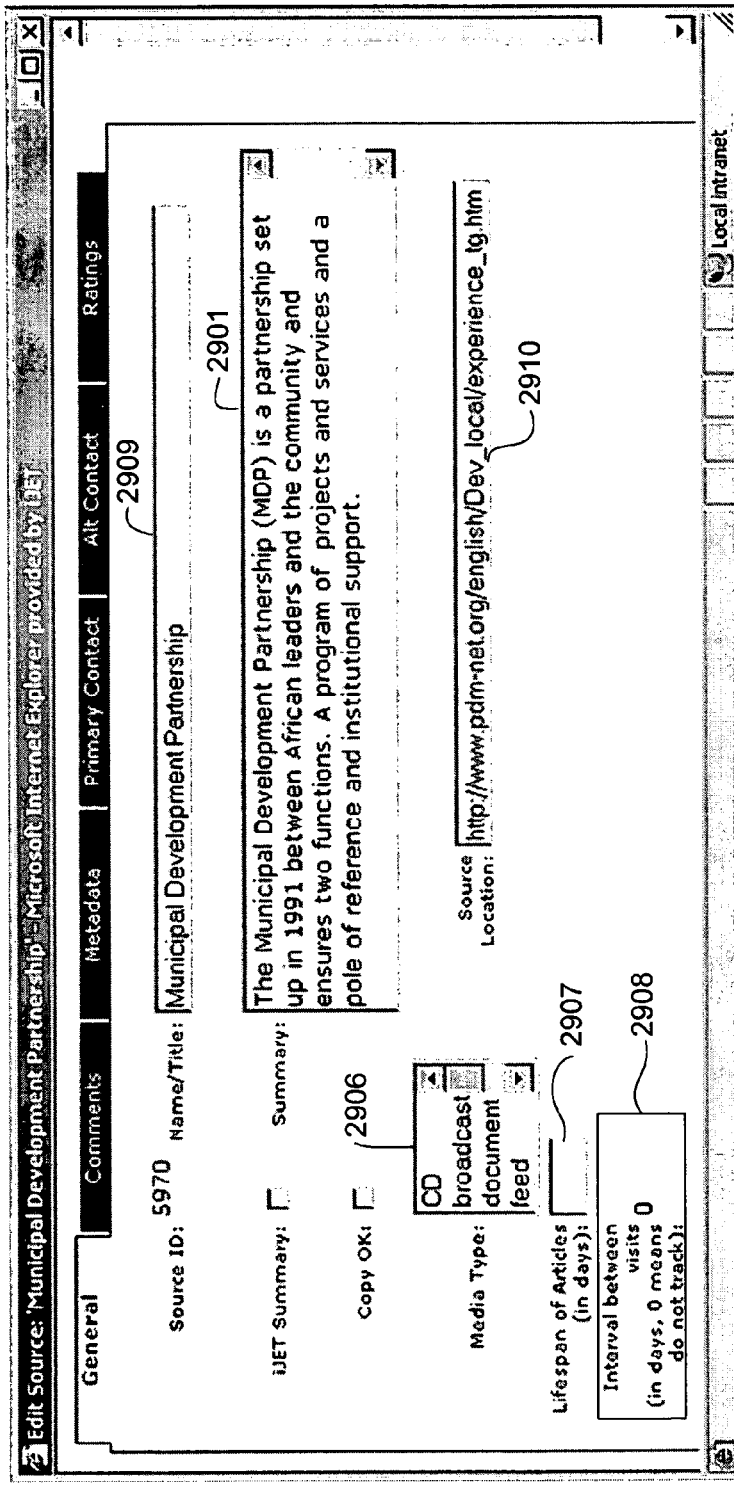

FIG. 29*b* is a second exemplary general interactive page 2950 showing further general details associated with a source according to at least one embodiment. Referring to FIG. 29*b*, the general details page 2950 may further include a media type 2906 associated with the source, a lifespan of the article 2907 if applicable, the interval between visits 2908 to the source using the system 400, the source title 2909, and a source location 2910. The source location 2910 may be a Uniform Reference Locator (URL) for a HTML-formatted web page.

Figure 30:
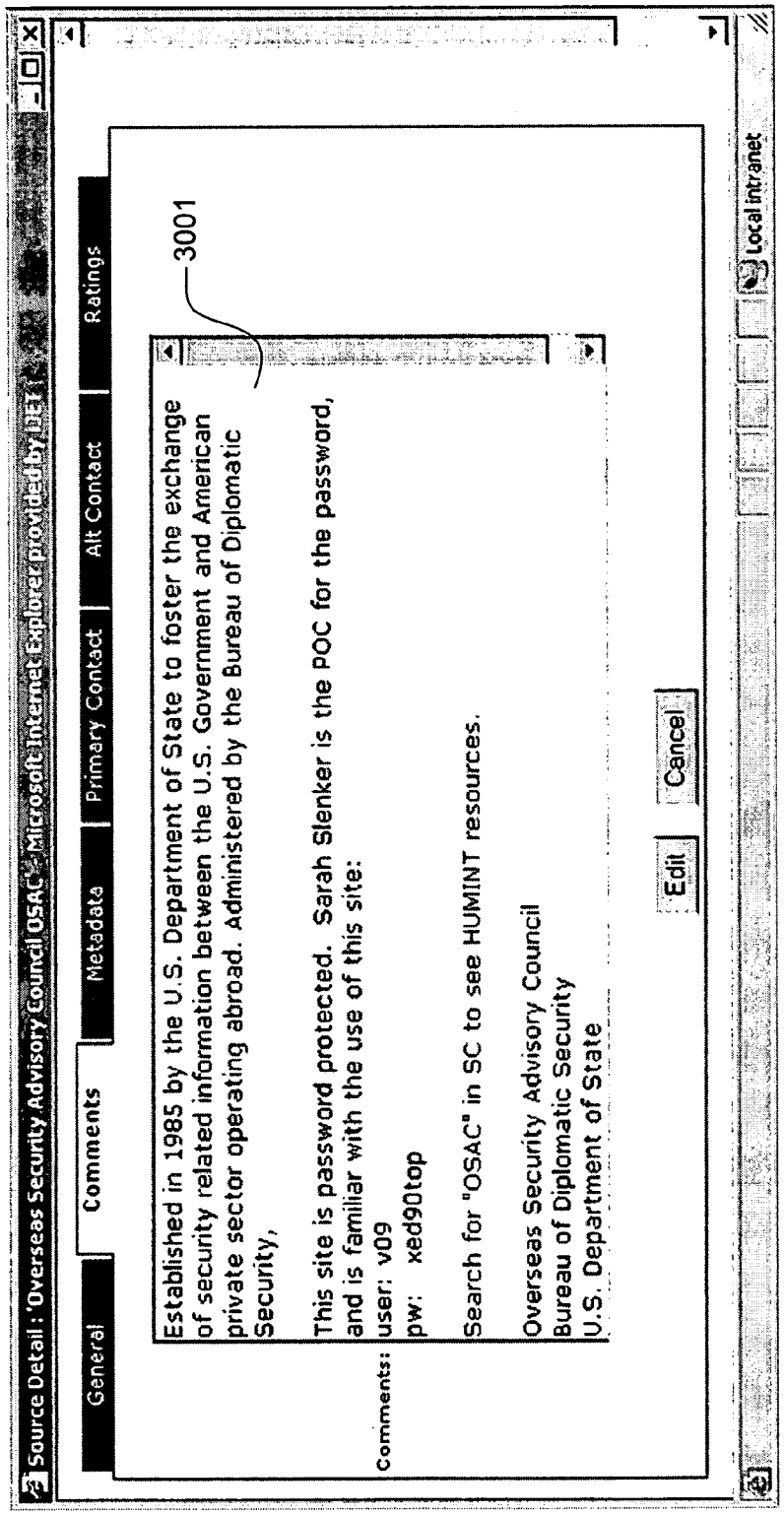
FIG. 30 is an exemplary comments interactive page showing comments associated with a source according to at least one embodiment.

FIG. 30 is an exemplary comments interactive page 3000 showing comments associated with a source according to at least one embodiment. Referring to FIG. 30, the comments page 3000 may further include comments 3001 associated with the source. In an embodiment, the comments 3001 may be entered by an analyst such as a SME.

Figure 31:
FIG. 31 is an exemplary metadata interactive page showing metadata associated with a source according to at least one embodiment.

FIG. 31 is an exemplary metadata interactive page 3100 showing metadata associated with a source according to at least one embodiment. In an embodiment, metadata associated with a source may include information maintained by the system 400 representing relationships of the source to various other informational items beyond the intelligence provided by the source. In an embodiment, each source may be associated with either an intelligence category (e.g., security, terrorism) or location/destination information (e.g., country). For example, referring to FIG. 31, the metadata page 3100 may include a list of projects 3101 associated with the source, a list of the categories 3102 for the source, a list of locations 3103 to which the source pertains, and an overall source category tree 3104.

FIG. 32 is an exemplary contact interactive page 3200 showing primary contact information associated with a source according to at least one embodiment. In an embodiment, contact information associated with a source may include a source owner or entity responsible for the source as well as address and communications contact information for the source owner. Secondary or alternate contact information may be provided on additional contact pages 3200.

Figure 33:
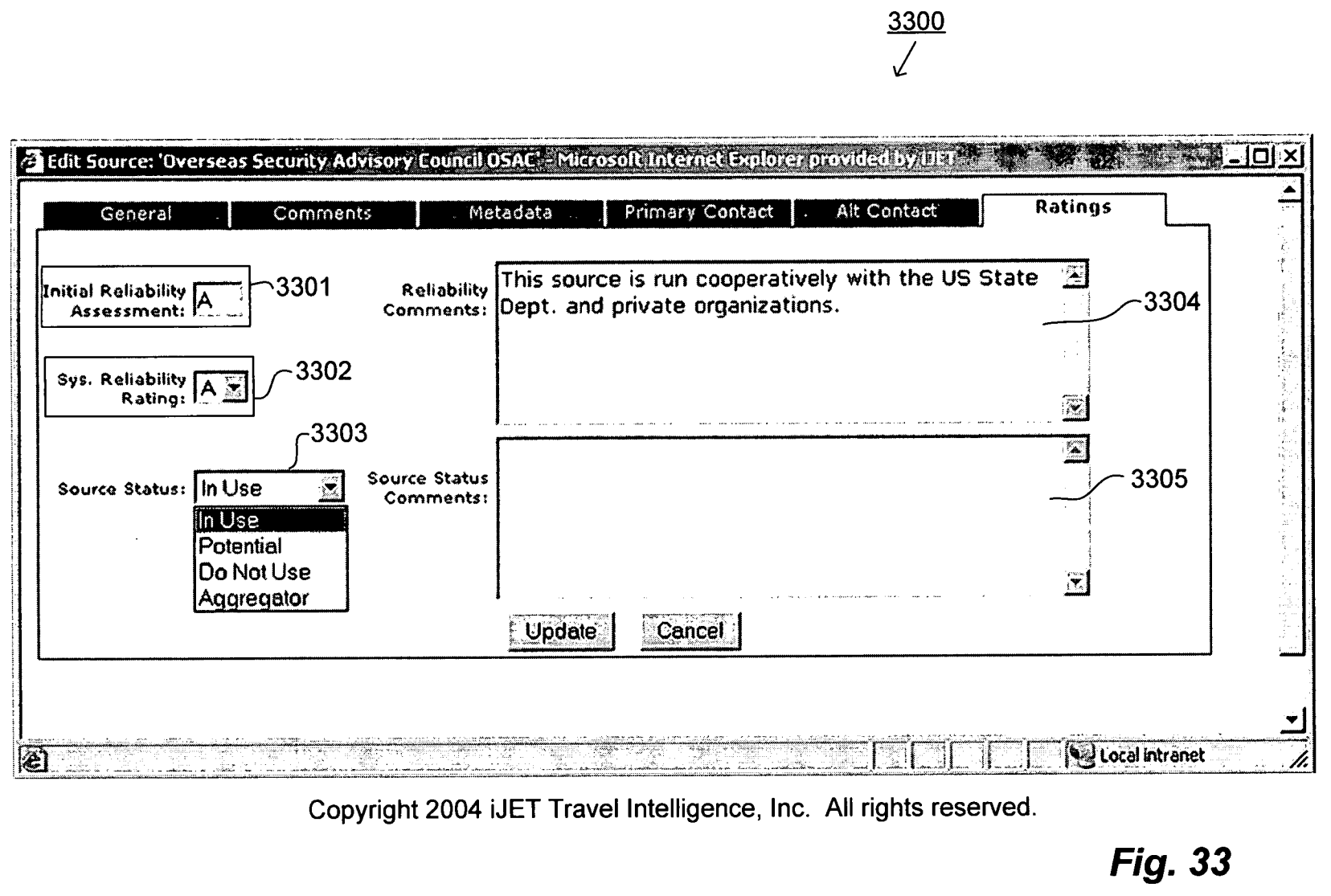

FIG. 33 is an exemplary source ratings page 3300 showing one or more reliability ratings for a source. Referring to FIG. 33, the source ratings page 3300 may include an initial reliability assessment 3301 and a system reliability rating 3302. The reliability rating assessment 3301 and 3302 may be individually assigned a rating such as, for example, "A," "B," or "C," representing a range of most reliable to least reliable, respectively. The initial reliability assessment 3301 may be a one-time rating assigned by an analyst or SME based on, for example, the analyst's past experience involving intelligence from the source. In an embodiment, the system reliability rating 3302 may be determined by the system 400 based on a rating algorithm that takes into account a variety of factors such as, but not limited to, the availability of the source to provide intelligence to agents of the system 400 as described earlier herein. Other factors may include the existence of human in the loop feedback regarding intelligence provided by the source to confirm development of the intelligence using, for example, a trend line analysis. The rating algorithm may assign a mathematical or statistical value to each of the various factors and then compute a reliability rating based on the weighted sum. By comparing the initial reliability assessment 3301 with the system reliability rating 3302, the user may determine the change in reliability of a source over time to aid in assessing the intelligence received from that source. Furthermore, the source ratings page 3300 may further include a source status 3304, reliability comments 3305, and source status comments 3306. The source status 3304 may indicate the current status for a source including, for example, "in use," "potential," "do not use," and "aggregator." Comments 3305 and 3306 may include analyst or SME observations regarding source reliability or status, respectively.

Figure 34:
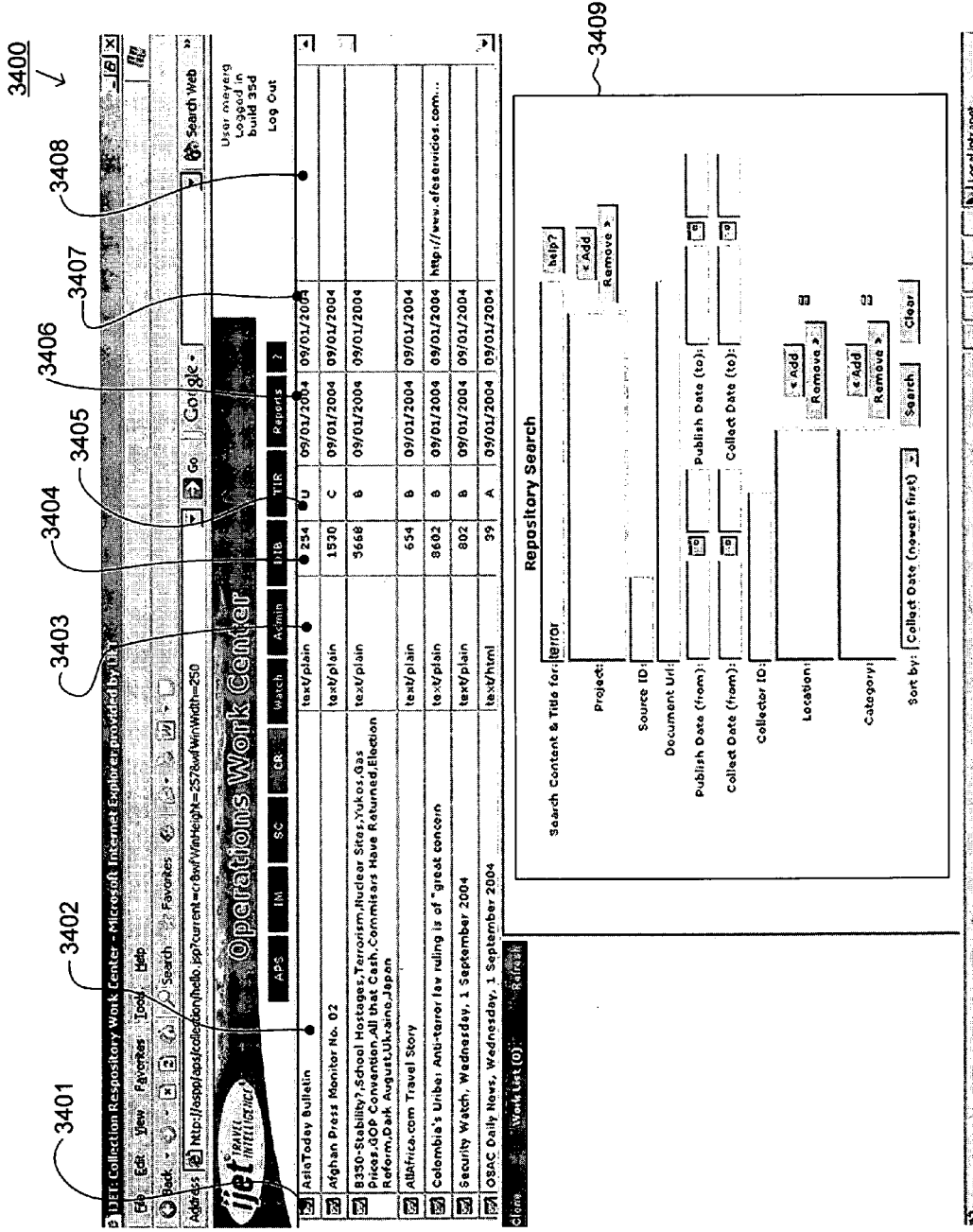
FIG. 34 is an exemplary additional intelligence page in at least one embodiment.

FIG. 34 is an exemplary additional intelligence page 3400 of the risk mitigation toolbox in at least one embodiment. Referring to FIG. 34, the intelligence page 3400 may include for each source listed an edit selection button 3501, source name/title 3402, a media type 3403 (e.g., plain text), a unique source identifier 3404, a system reliability rating 3405, a creation date 3406, a last updated date 3407, notes 3408 (e.g., a URL address of the World Wide Web), and an interactive repository search interface 3409. Upon operator selection of the edit selection button 3404, the system 400 may provide the capability for the user to edit the source information including the data fields shown in FIG. 34. In an embodiment, the system 400 may provide the capability for the user to search the source catalog or repository by entering various search criteria using the repository search interface 3409.

FIG. 35 is an exemplary reference document page 3500 showing a plain text document 3501 and an HTML formatted document 3502 of the risk mitigation toolbox in at least one embodiment.

Figure 36:
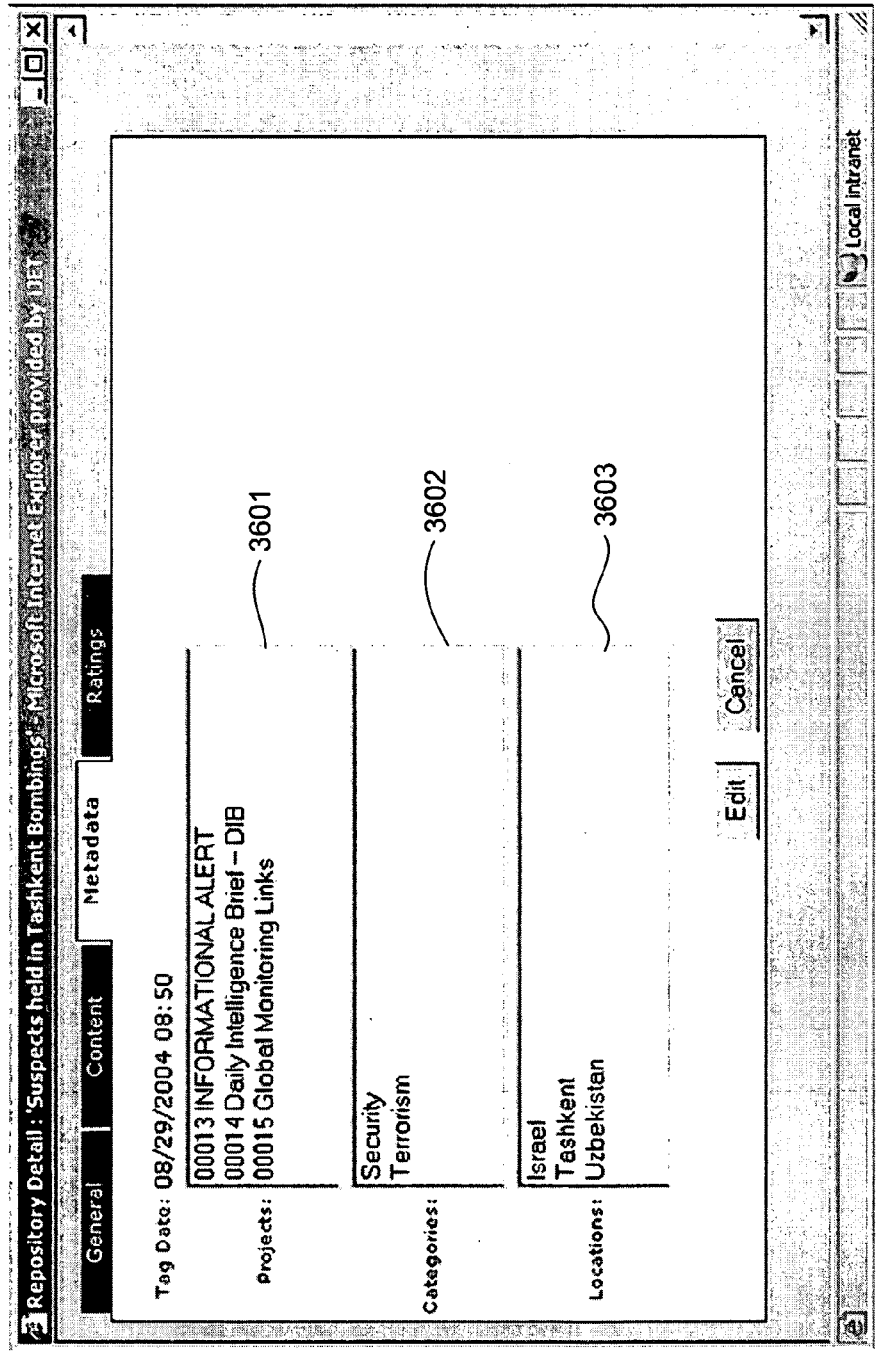
FIG. 36 is an exemplary additional intelligent metadata interactive page showing metadata associated with an additional intelligence source according to at least one embodiment.

FIG. 36 is an exemplary additional intelligent metadata interactive page 3600 showing metadata associated with an additional intelligence source of the risk mitigation toolbox according to at least one embodiment. In an embodiment, additional intelligence metadata associated with a source may include information maintained by the system 400 representing relationships of the source to various other informational items beyond the intelligence provided by the source. For example, referring to FIG. 36, the additional intelligence metadata page 3600 may include a list of projects 3601 associated with the source, a list of the categories 3602 for the source, and a list of locations 3603 to which the source pertains.

Figure 37:
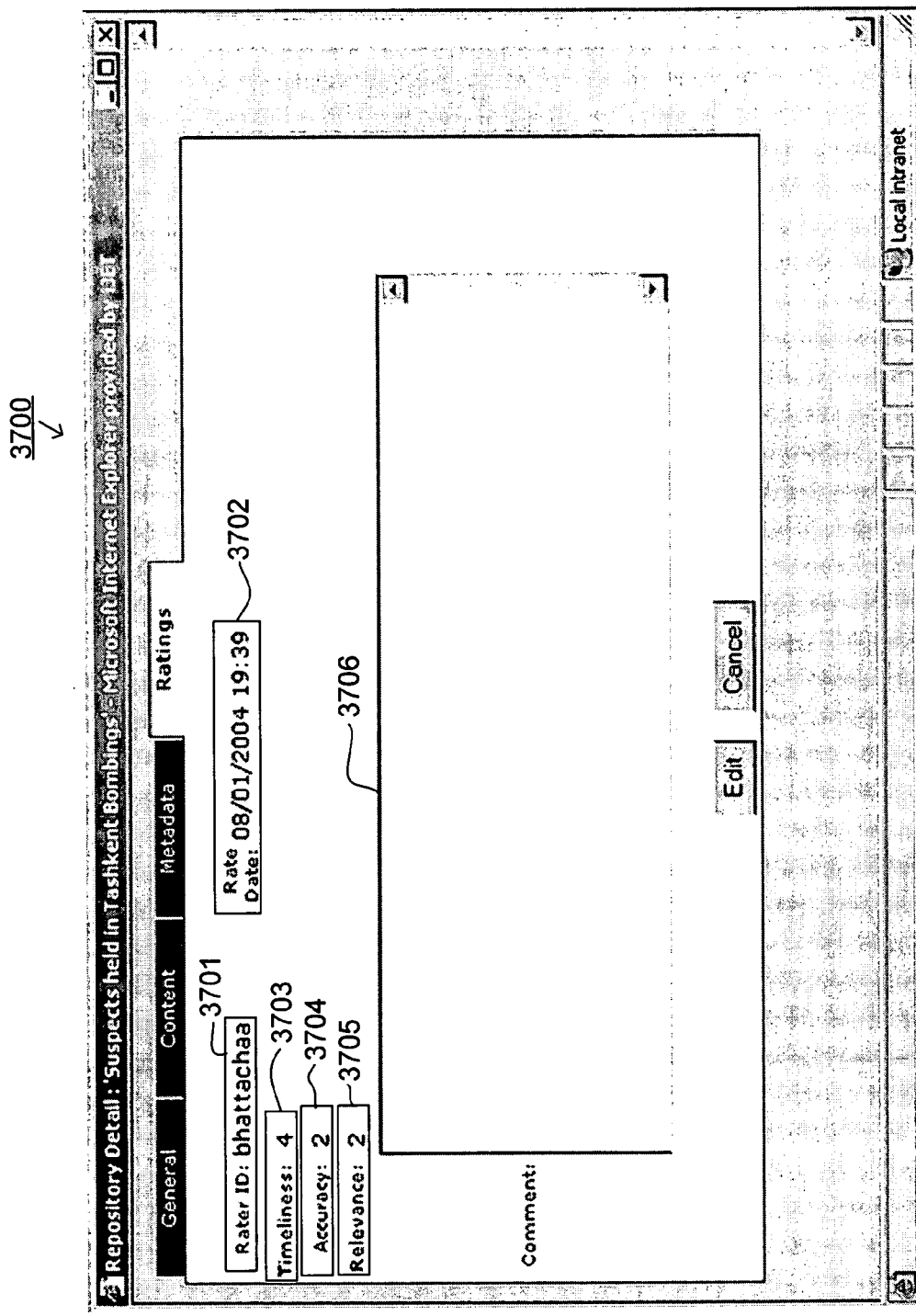
FIG. 37 is an exemplary additional intelligent ratings interactive page showing source ratings associated with an additional intelligence source according to at least one embodiment.

FIG. 37 is an exemplary additional intelligent ratings interactive page 3700 showing source ratings associated with an additional intelligence source of the risk mitigation toolbox according to at least one embodiment. For example, referring to FIG. 37, the additional intelligence source ratings page 3700 may include a rater identifier 3701, a rate date 3702 that may include a date/timestamp, a numerically-scaled timeliness score 3703, a numerically-scaled accuracy score 3704, a numerically-scaled relevance score 3705, and source comments 3706.

In addition, in at least one embodiment, the analysis engine 403 may include a compliance function in which a person seeking to travel to a location adversely affected by a critical event, such as a location within an impact area, must first acquire the approval of the asset manager or security director prior to being permitted to travel to the location. This provides the asset manager the opportunity to ensure that the traveler has received proper training in dealing with the increased risk environment prior to traveling there. In at least one embodiment, this compliance function may be provided in the form an online test for which the traveler must obtain a satisfactory score prior to be authorized travel (e.g., prior to being issued tickets).

It is apparent that the global asset risk management system and methods described herein may by configured to provide many useful asset risk management functions in a variety of embodiments for both fixed and mobile assets including, but not limited to, people, facilities, and containers. For example, the global asset management system 400 may be configured to provide supply chain management by providing a risk assessment for a shipping route for assets or goods in shipment to avoid supply chain interruption (e.g., routing of supply ships around areas of increased risk). In such embodiments, the asset information may include individual shipping container tracking information such as, for example, a container identification code associated with a set of periodically updated geographic coordinates or identifiers. Similarly, the global asset risk management system 400 may be configured to provide personnel tracking by associating a personal identifier with a set of periodically updated geographic coordinates or identifiers. In at least one embodiment, the tracking information may include GPS or GIS coordinates.

Figure 38A:
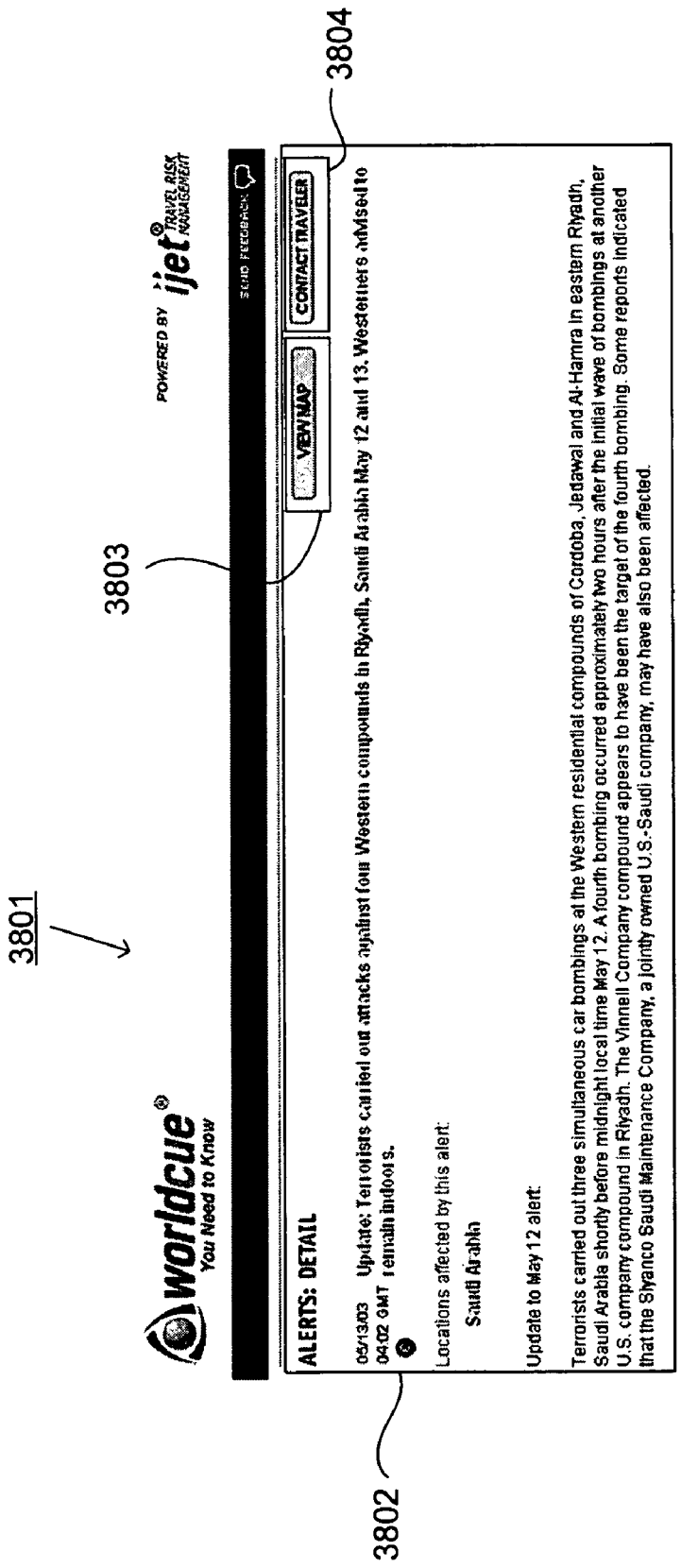
FIGS. 38a and 38b are exemplary pages of a risk assessment report according to at least one embodiment.
Figure 38B:
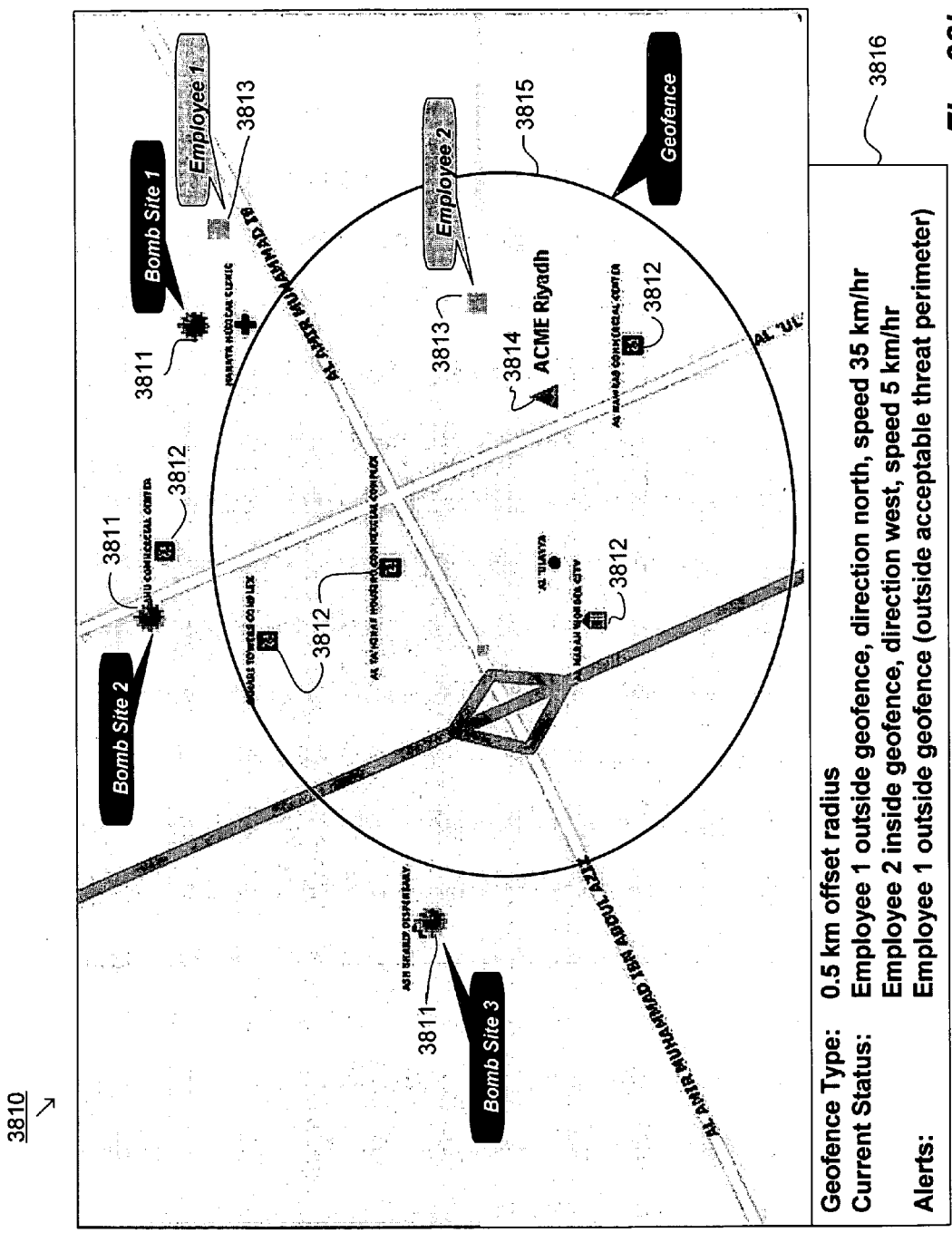

A further example of a risk assessment report according to an embodiment is shown in FIGS. 38*a* and 38*b*. Referring to FIG. 38*a*, a message portion 3801 of a risk assessment report may include a text message 3802 containing intelligence and affected asset information associated with an intelligence event. The message portion may also include a mapping interface 3803 and an asset communications interface 3804. The mapping interface 3803 may include a selection mechanism by which a user may select to view a map portion of the risk assessment report. In an embodiment, when the user selects the mapping interface 3803 the analysis engine may render a map page such as that shown in FIG. 38*b*. The analysis engine may use the CMS to obtain intelligence and information from the CRS in generating the map page. In an embodiment, when the user selects the asset communications interface 3804, the CMS may output an interactive page by which the user may compose and cause to be sent a message such as, for example, an electronic message or email, to the asset.

An example of a map page 3810 according to an embodiment is shown in FIG. 38*b*. Referring to FIG. 38*b*, the map page 3810 may include a graphical artifact representing an intelligence event 3811, a graphical artifact representing a landmark 3812, a graphical artifact representing a first asset 3813 such as a person on the ground at a location, and a graphical artifact representing a second asset 3814 such as a private facility. Further, the map page 3810 may also include a geofence 3815 representing a threat boundary. In the example, of FIG. 38b, the area inside the geofence may represent a safe area, and the area outside the geofence may represent an area having an unacceptably high threat or risk. Alternatively, the geofence 3815 may correspond to a threat perimeter of a geocode in which the area inside the geofence represents the area of unacceptably high risk. The map page 3810 may also include text information 3816 to provide the user with, among other things, the status of assets 3813 or 3814 with respect to the geofence 3815. Further, in at least one embodiment, in response to the user selecting an intelligence event 3811 on the interactive map page 3810 (using, for example, a mouse device), the system 400 may output to the user the source catalog page 2800 (see FIG. 28) so that the user may review the sources underlying the intelligence event. Thus, the risk assessment report may output to the user an indication of the vulnerability of one or more assets in the context of an intelligence event or events.

In at least one embodiment, the employee profile information 3900 and its component profiles or portions may be established and maintained using, for example, the Content Management Segment (CMS) described herein with respect to FIG. 39. In such embodiments, the employee profile information may be added or modified using one or more interactive pages of a computer system. For example, a user may add or modify employee profile information 3900 using a browser application of a computing system. In an embodiment, the interactive pages for outputting or accepting employee profile information 3900 may be accessed using a network. For example, such a network may be an office or organization Local Area Network (LAN) or the Internet. FIG. 41a is one example profile information page 4100 in accordance with at least one embodiment. Referring to FIG. 41a, a profile information page 4100 may include one or more page selection tabs such as 4101 to 4110, one or more information fields such as 4111 to 4124, a photograph 4125, and primary contact information 4126. Page selection tabs may include, for example, a Profile tab 4101, a User Preferences tab 4102, an Emergency Contact tab 4103, a Travel Documents tab 4104, a Personal Info tab 4105, a Medical Info tab 4106, a Vehicles tab 4107, an Images tab 4108, a Trip Profile tab 4109, and a Configure Reports tab 4110. User selection of one of the page selection tabs 4101 through 4110 may cause a corresponding profile information page 4100 to be output to the user via, for example, a computer or portable device display.

As shown in FIG. 41a, information fields in an interactive basic profile information page 4100, output in response to user selection of the Profile tab 4101, may include user name information such as Last Name 4111, First Name 4112, Middle Name 4113, Employee ID 4114, Alternative (Alt) Employee ID 4115, National ID (e.g., social security number) 4116, a first country of citizenship (Citizenship 1) 4117, a second country of citizenship (Citizenship 2) 4118, Birthplace 4119, Date of Birth 4120, Gender 4121, a Primary E-Mail address 4122, a first Alternative E-Mail (Alt E-Mail 1) 4123, and a second Alternative E-Mail (Alt E-Mail 2) 4124. The photograph 4125 may be a current photograph of the employee or expatriate. Primary contact information 4126 may include, for example, but not limited to, contact information such as E-mail address, various telephone numbers, and street address.

In an embodiment, upon user selection of the User Preferences tab 4102, the system 400 may output an interactive page 4100 that includes data entry fields for the user to specify a user name and password. Further, the user may be provided one or more checkboxes to specify an alert level and an alert email format (e.g., HTML or text). In addition, upon user selection of the Emergency Contact tab 4103, the system 400 may output an interactive page 4100 that includes data entry fields for the user to input contact information for an emergency contact such as, for example, e-mail address, various telephone numbers, and street address.). Further, upon user selection of the Travel Documents tab 4104, the system 400 may output an interactive page 4100 as shown in FIG. 41b that includes an Add Passport button 4127, an Add Visa button 4128, an employee/expatriate Passport Information data entry field 4129, and an employee/expatriate Visa Information data entry field 4130. The Passport information data entry field 4129 may include passport information such as, but not limited to, passport country, passport number, passport expiration date, and place of issue.

Figure 41C:
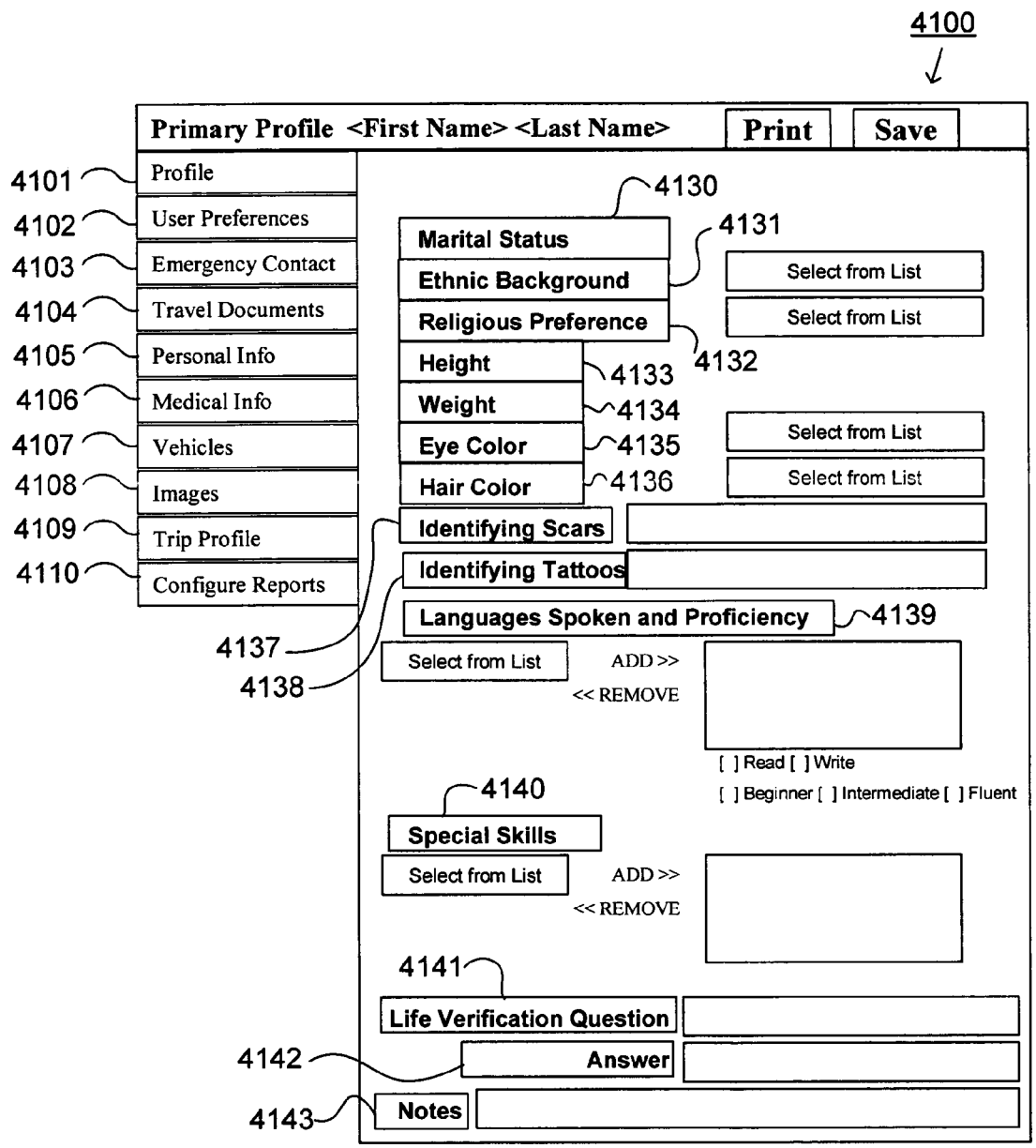

Upon user selection of the Personal Info tab 4104, the system 400 may output an interactive page 4100 as shown in FIG. 41c that includes data entry/selection fields such as, for example, Marital Status 4130, Ethnic Background 4131, Religious Preference 4132, and physical identifiers such as Height 4133, Weight 4134, Eye Color 4135, Hair Color 4136, Identifying Scars 4137, and Identifying Tattoos 4138. Personal information may also include Languages Spoken and Proficiency 4139, Special Skills 4140 (e.g., medic, pilot, radio operator), a Life Verification Question 4141 and Answer 4142, and a Notes field 4143. The Life Verification Question 4141 and Answer 4142 may relate to subject matter known only to the employee/expatriate. As shown in FIG. 41c, the system 400 may provide the user the capability to enter personal information via text entry or by selecting an item from a pull-down menu of possible choices or a list of such choices.

Figure 41E:
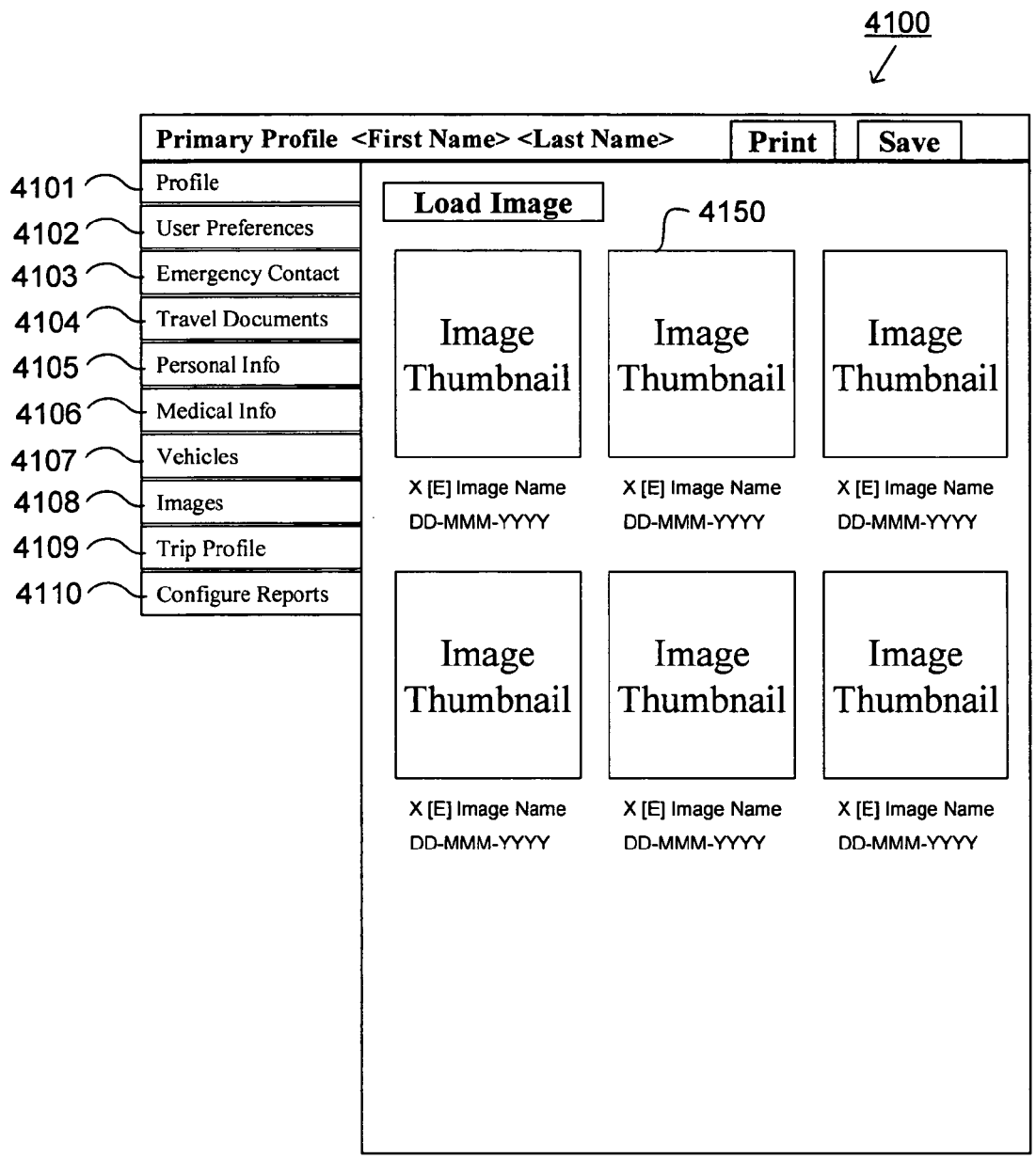

Upon user selection of the Medical Info tab 4106, the system 400 may output an interactive page 4100 as shown in FIG. 41d that includes data entry/selection fields such as, for example, Blood Type 4144, Allergies 4145, Chronic Conditions 4146, and Medical Contact information 4147. As shown in FIG. 41c, the system 400 may provide the user the capability to enter personal information via text entry or by selecting an item from a pull-down menu of possible choices or a list of such choices. Upon user selection of the Vehicles tab 4107, the system 400 may output an interactive page 4100 (not shown) that includes data entry/selection fields such as, for example, vehicle make, model, year, and color. Upon user selection of the Images tab 4108, the system 400 may output an interactive page 4100 as shown in FIG. 41e that includes images 4150. The images 4150 may be thumbnail images of scanned photographs, jpeg files, .bmp files, and the like, showing the employee/expatriate in various circumstances or other related visual identifiers or information. Upon user selection of the Trip Profile tab 4109, the system 400 may output an interactive page that includes data entry/selection fields associated with a trip. Upon user selection of the Configure Reports tab 4110, the system 400 may output an interactive page that includes data entry/selection fields to specify report output formats and content.

Furthermore, the system 400 may provide the capability for the user to define a Group of employees or expatriates having a common characteristic or particular relationship. FIG. 41f is an interactive page 4100 which may be used to manage group relationships, according to an embodiment. Referring to FIG. 41f, the system 400 may output an interactive page that includes an Add Group button 4160, as well as data entry/selection fields to specify Group Name/Type 4161, Relationship information 4162, and group contact information 4163.

Figure 42:
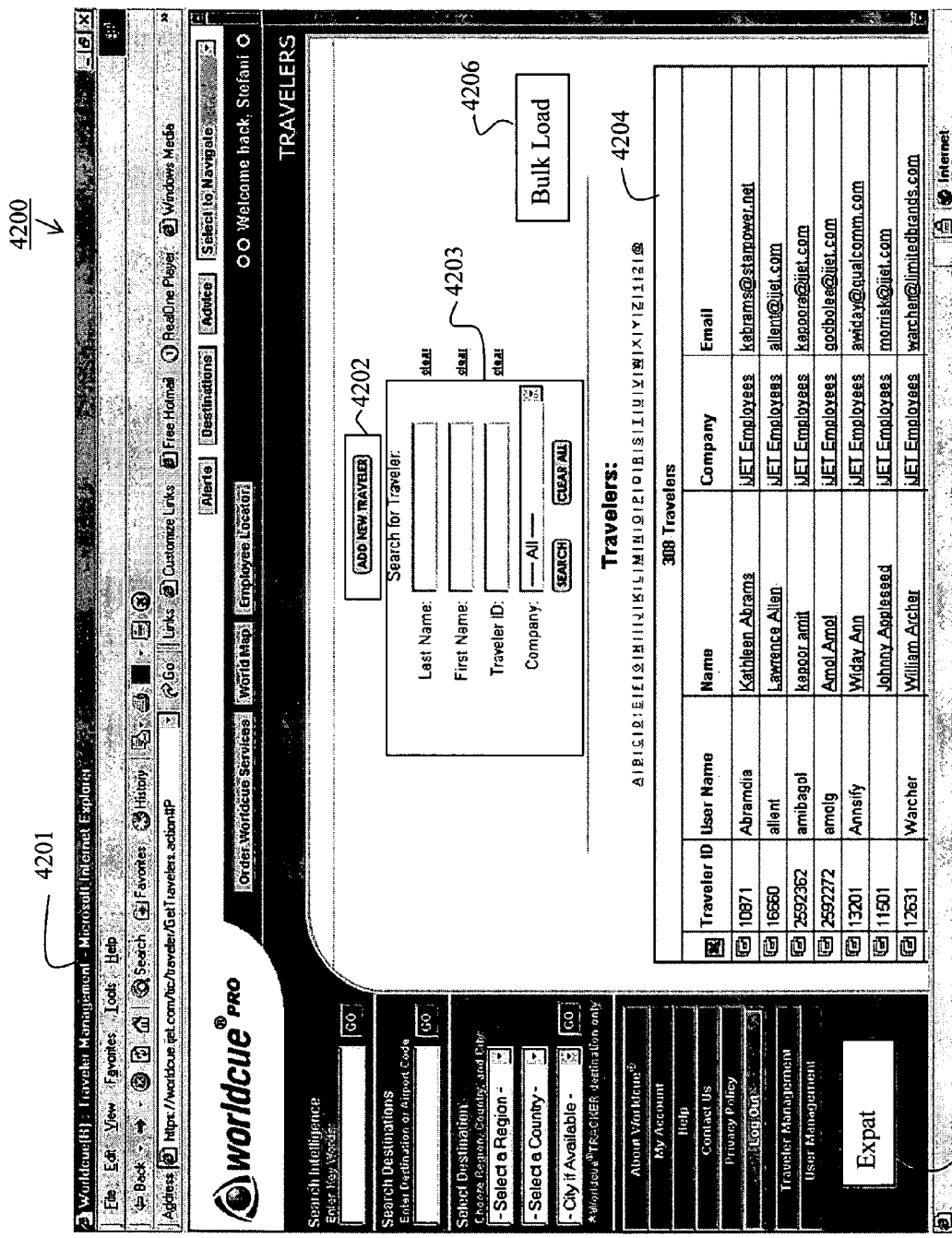
FIG. 42 is an example Traveler/Expatriate Management interactive page according to at least one embodiment.

FIG. 42 is an example Traveler/Expatriate Management interactive page 4200 according to at least one embodiment. Referring to FIG. 42, the Traveler/Expatriate Management interactive page 4200 may be output by the system 400 for display using a browser application such as, for example, Netscape™ Navigator™ available from Netscape Corporation of Mountain View, California. In at least one embodiment, the Traveler/Expatriate Management interactive page 4200 may include a title 4201, an Add New Traveler/Expat button 4202, Search for Traveler/Expat data entry fields 4203, and a Travelers/Expat list 4204. In at least one embodiment, the user may toggle between interactive pages 4200 showing "traveler" information and "Expat" information by selecting an Expat Management button 4205. The various static information fields of the interactive page 4200 may be output as "Traveler" or "Expat," according to whether traveler or expatriate management is being performed in accordance with the state of the Expat Management button 4205.

Further, in at least one embodiment, referring to FIG. 42, the Traveler/Expatriate Management interactive page 4200 may provide a search function for travelers or expatriates. For example, the user may be provided the capability to search for travelers or expatriates using the Search for Traveler/Expat data entry fields 4203. These fields may include, without limitation, the following search fields and terms: Last Name, First Name, Employee ID, Alt Employee ID, by Company, and/or Limited to: Expats, Dependents, or VIP. In an embodiment, if the user enters no fields and selects the SEARCH action, a count of the results and all Expats may be displayed. If an Expat has Dependents (an example of a Group), these may be displayed under the Expat entry. If the user selects "Limit to Dependents", the SEARCH action may list all Dependents. Further, each Dependent may display the Expat it is linked to. In an embodiment, the result list may be downloaded using a computer-readable medium for access and/or output to an external computing device using an application such as, for example, Microsoft® Excel™.

In addition, as discussed earlier herein, in at least one embodiment the system 400 may include a bulk load mechanism. For example, in an embodiment, the Traveler/Expatriate Management interactive page 4200 may include a Bulk Load button 4206 which, upon user selection, will allow a user to browse to a file to be uploaded into the system. In an embodiment, the user may define the format of the file. The format can be a previously saved format or a new format can be built and optionally saved. For example, the system 400 may include the capability to bulk load Expat data from a file in Excel or Comma Separated Values (CSV) formats. After defining the input fields and order, the user may select either CANCEL to quit this function or TEST to test load the first row of data. If TEST is selected, the first row of data will be loaded. The system will display the fields and associated data to enable the user to visually inspect that the field formats and mapping are correct. From this display, the user may select either CANCEL to return to the mapping definition or LOAD to load the rest of the data in the file. The system may display an indicator for each data row loaded. In the event of an error, the system may display the row number in error, error description, and a dump of the record data if possible. The user may have the ability to QUIT or CONTINUE. Once the Load is complete, the system may report the number of records loaded successfully.

Furthermore, in at least one embodiment, a user may set an automatic notification setting to output a high risk assignment notification if, for example, an expatriate is assigned to a high risk destination. For example, the user may select "Notification for Assignments registered to Locations >=CSAR". The Country Security Assessment Rating (CSAR) value can be selected as "1" through "5." If the User sets the CSAR value to "4", then any Assignment registered to a Location currently rated 4 or higher will trigger a Notification to the User's e-mail address.

In addition, in at least one embodiment, a user may add a group or dependent relationship or link to an existing expatriate. For example, the user may select an Employee Profile via Search or other link to the Employee Profile. Once the Employee Profile is displayed, the user may scroll to the Group section and select "Add Group Member". From "Add Group Member", the user may search for an Employee (Dependent) Profile and select a profile or "Add an Employee Profile" if the Dependent is not already in the system. Upon the user adding Group Member (Dependent) to an Employee Profile, the system may automatically designate the linked Employee Profile as a Dependent ("DEP") and optionally link the employee's Assignment to the Group Member. If the Dependent is not in the same Assignment Location as the Employee, then the user may create a Trip to designate where the Dependent is located or delete the Assignment from the dependent's Profile.

Figure 43:
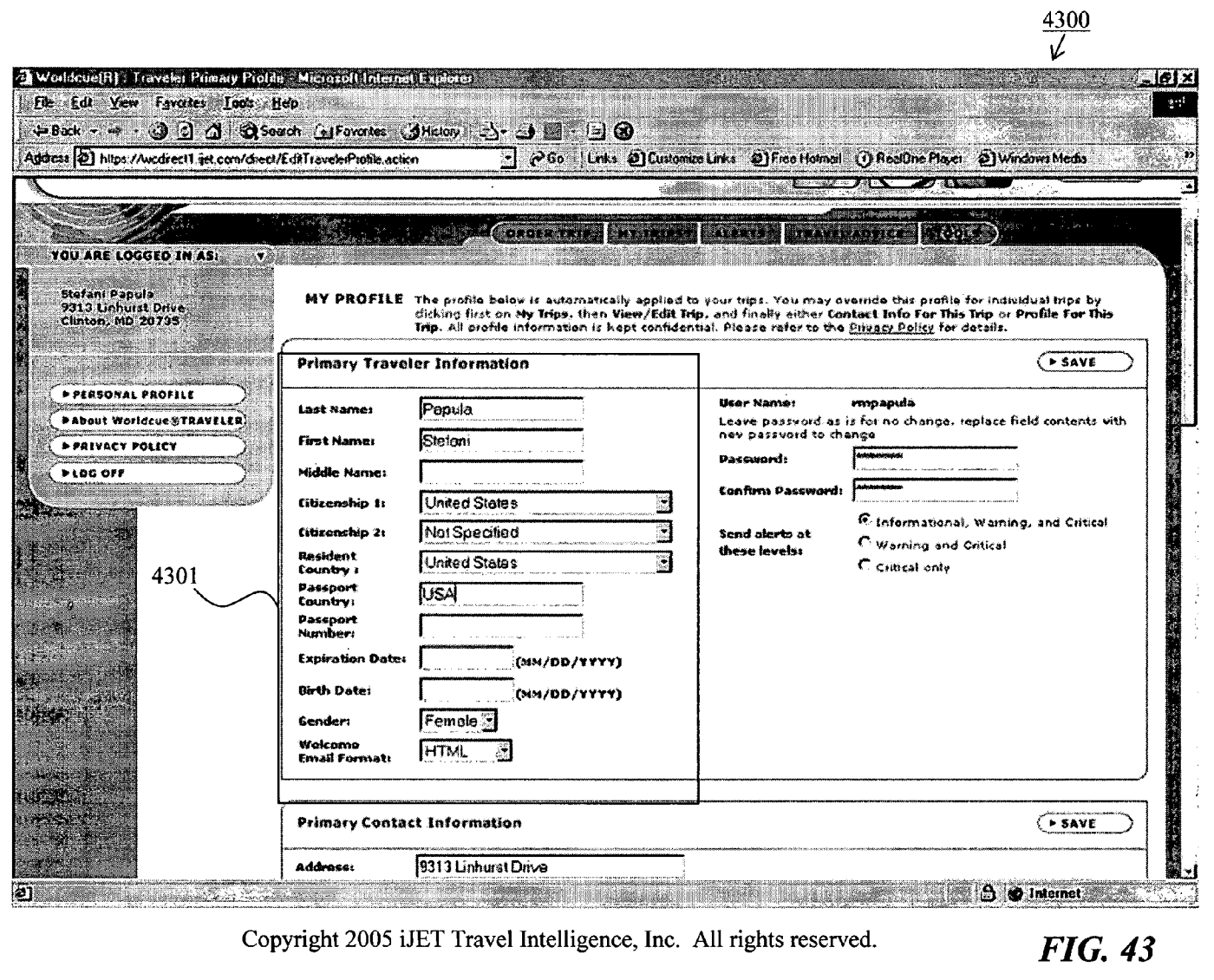

In at least one embodiment, the system 400 may output an employee profile interactive page 4300 as shown in FIG. 43. Referring to FIG. 43, the profile interactive page 4300 may include the information fields 4301 described earlier herein with respect to FIGS. 41*a* through 41*f* and as shown and described in Table 1 below.

TABLE 1

| | |
|---|---|
| Last Name (*) | Employee's last name |
| First Name (*) | Employee's first name |
| Middle Name | Employee's middle name(s) |
| Employee Number (*) | Employee ID used for system lookup |
| Alt Employee Number | Alternate Employee ID to be stored in the Profile. Not used by the system. |
| National ID (SSN) | National ID (SSN-Social Security Number). Not used by the system. |
| Birth Date | MM/DD/YYYY (manual or calendar entry) |
| Birth Place | City, Country (list) |
| Gender | Male/Female/Unknown |
| Citizenship 1 | Country (from list) |
| Citizenship 2 | Country (from list) |
| Passport Country 1 | Country (from list - new) |
| Passport Country 2 | Country (from list - new) |
| Passport Exp Date 1 | MM/DD/YYYY (manual or calendar entry) |
| Passport Exp Date 2 | MM/DD/YYYY (manual or calendar entry) |
| Welcome Email Format | Plain Text or HTML (List) |
| Alert Preference | Info/Warn/Critical (Radio Buttons) |
| Primary E-mail 1 (*) | Primary Contact E-Mail 1 - used by the system for Welcome e-mail. |
| E-mail 1 Alerts | Yes/No (button) |
| E-mail 1 Format | Plain Text/HTML (List) |
| Primary E-mail 2 | Alternate e-mail 2 with Alerts and Format options |
| Primary E-mail 3 | Alternate e-mail 3 with Alerts and Format options |
| Primary Address | Street, City, State, Country, Postal Code |
| Primary Phone Contact | Daytime, Evening, Fax, Cell/Pager |
| Emergency Contact | (N) Name, Relationship, Day Phone, Evening Phone, Mobile, E-mail (add Relationship and other Phone numbers to existing record) |
| Physical Description | Height (ft/in and meters), Weight (Lb and Kg), Eye Color (list), Hair Color (list), Identifying Scars (text), Identifying Tatoos (text) |
| Personal Information | Ethnic Background (list), Religious Preference (list), Languages Spoken (list) and Level (Read, Write, Beginner, |

TABLE 1-continued

| | |
|---|---|
| | Intermediate, Fluent), Special Skills (list and other with text) - Medic, Pilot, Radio Operator, Marital Status (Single, Married, Separated, Divorced, Widowed), Number of Children |
| Medical Information | (Use an external medical records system for HIPPA and EU Privacy?) Blood Type (list), Allergies (list), Chronic Conditions (list), Shot Record |
| Medical Provider Contact | (N) Type (list), Name, Day Phone, Night Phone, Mobile, E-mail, Address |
| Life Verification Question | (N) Question and Answer |
| Personal Vehicle | (N) Year, Make, Model, Color, VIN, License Number |
| Head Photo | Digital Photo (auto scale to standard thumbnail) |
| Image | (N) Digital Image (auto thumbnail) |
| Handwriting Sample | (N) Digital Image |

In Table 1, required fields are denoted as (*) and (N) denotes that the record can be entered multiple times, in an embodiment.

Figure 44:
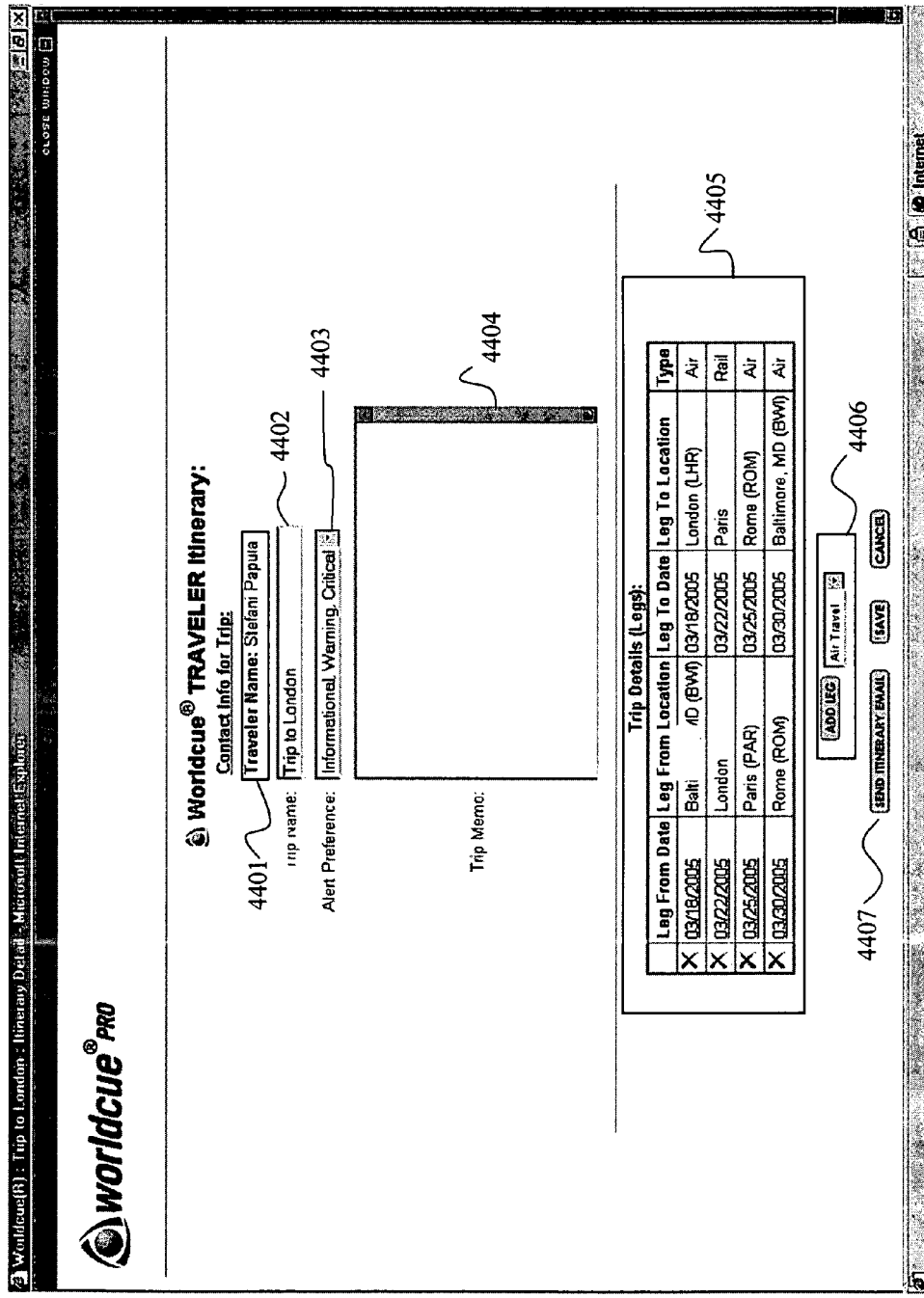
FIG. 44 is an example itinerary/assignment interactive page according to at least one embodiment.

In at least one embodiment, the system 400 may output an itinerary/assignment interactive page 4400 as shown in FIG. 44. Referring to FIG. 44, the itinerary/assignment interactive page 4400 may include a traveler/expatriate name 4401, a trip or assignment name 4402, an alert preference 4403, a trip or assignment memo field 4404, trip or assignment details 4405 including legs information, Add Leg information fields 4406, and a send itinerary email button 4407. As with interactive page 4200, the various static information fields of the interactive page 4400 may be output as "Traveler" or "Expat," according to whether traveler or expatriate management is being performed in accordance with the state of the Expat Management button 4205. In at least one embodiment, itinerary/assignment information which may be input into the system 400 using, for example, the interactive page 4400 is set forth in Table 2 below.

TABLE 2

| | |
|---|---|
| Assignment Name | Text field with default format as "Assignment:", Assignment Location, Arrival Date, "to", Departure Date. For example, "Assignment: London 01-Jan-05 to 31-Dec-05" |
| Assigned Location (*) | Location will be used throughout the system for query and reporting. Can be a Country or City designation. |
| Arrival Date (*) | The date the employee is expected to arrive to the Assigned Location. The system will default the Arrival Time as 00:01. |
| Departure Date (*) | The date the employee is expected to depart the Assigned Location and terminate his/her status as an EXPAT. The system will default the Departure Time as 23:59. |
| Assigned Company (*) | Ability to link the Assignment to a Company (Agency ID) other than the default Company. The default Company will be that of the responsible organization user entering the Assignment. |
| Assignment Notes PRO | Text field with free form text entry. Visible to responsible organization user only. |
| Assignment Notes BOTH | Text field with free form text entry. Visible to both the responsible organization user and Employee. |
| Local Address | Number, Street, City, Postal Code of local residence. |
| Local Contact Information | Phone (Day), Phone (Night), Mobile, Fax, Pager |
| Emergency Contact | (N) Name, Relationship, Phone (Day), Phone (Night), Mobile, Fax, Pager |

In Table 2, required fields are denoted as (*) and (N) denotes that the record can be entered multiple times, in an embodiment.

Furthermore, in at least one embodiment, the system 400 may include an employee/expatriate locator module. In an embodiment, the Employee Locator may be used to query the system, report and export information using query attributes of EXPAT, DEP and VIP. In particular, the system query interface may be designed to select ALL Employee records as a default. ALL Employees may include Travelers, Expatriates (EXPAT) and Dependents (DEP). For many queries, the user may limit the selection of Employees to a subset; for example, EXPATs only or DEPs only can be selected. The basic filter construct may be:

Limit Employees: [ ] Travelers [ ] VIP [ ] EXPAT [ ] DEP

Some examples of usage may be: 1) checking the Traveler checkbox may cause the system to process the query to mean "show all the Employees that are not EXPAT or DEP; 2) checking the Traveler and VIP checkboxes may cause the system to process the query to mean "show all Travelers that are VIPs," and 3) checking the EXPAT and DEP checkboxes may cause the system to process the query to mean "show all Expats and Dependents." Furthermore, in an embodiment, the user may query travelers/expatriates by "VIP" and airline, by date range, by destination, by hotel, by CSAR, and by employee.

Figure 45B:
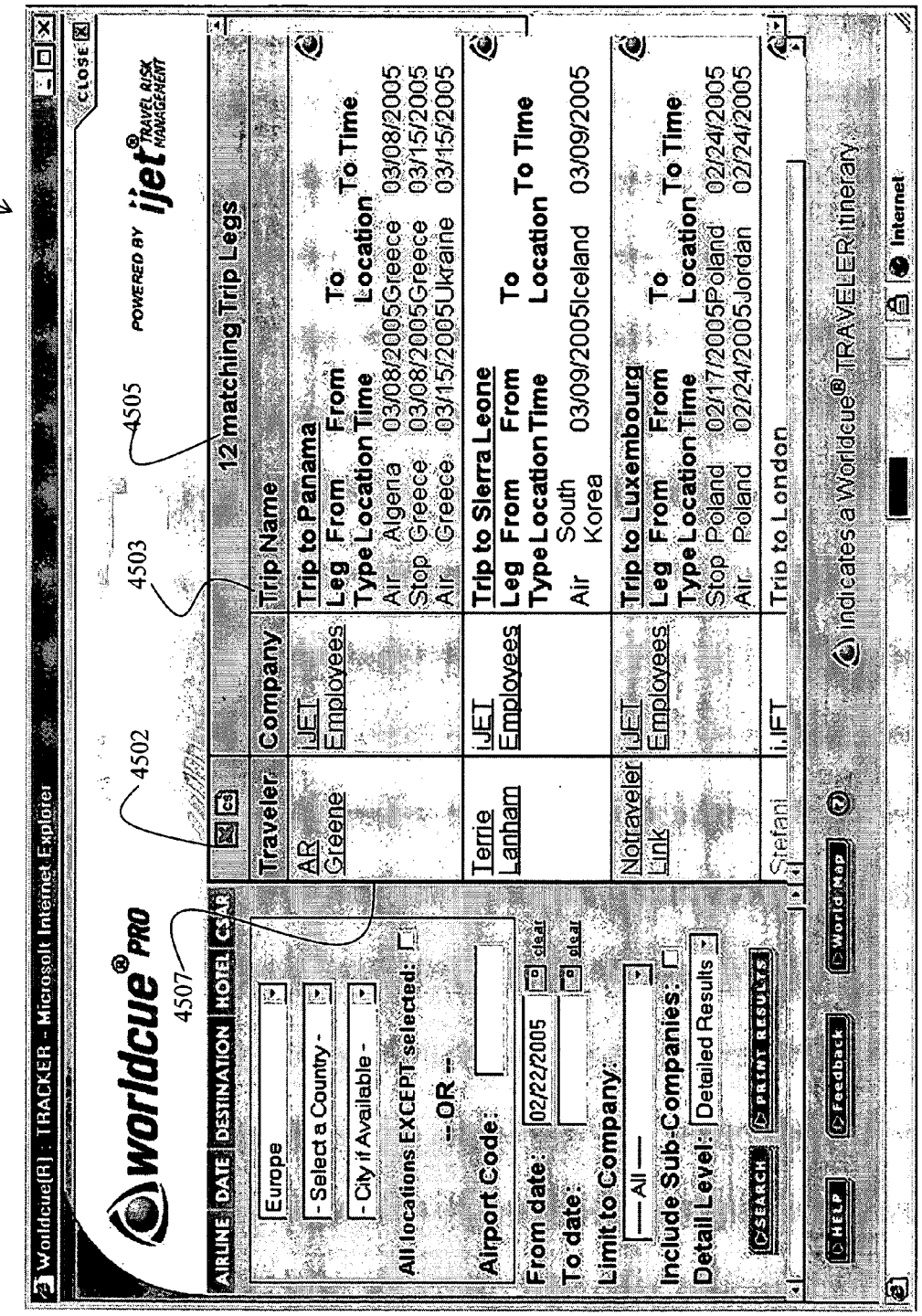
Figure 45C:
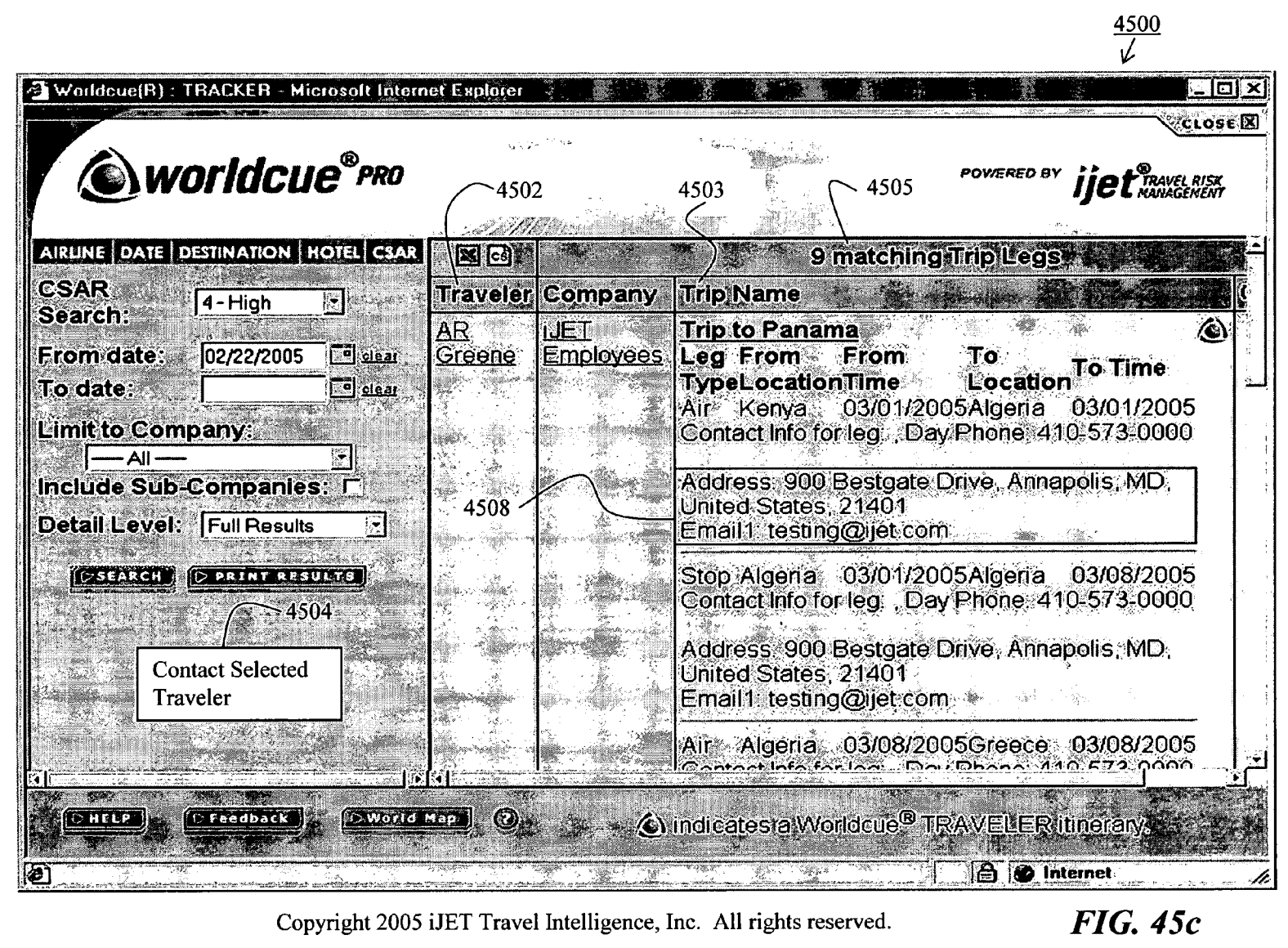

In at least one embodiment, the system 400 may output an one or more query results interactive pages 4500 as shown in FIGS. 45a through 45c. A simple query results interactive pages 4500 as shown in FIG. 45a. Referring to FIG. 45a, the query results interactive page 4500 may include a number of matching travelers/trips 4501 indicator, a traveler/expatriate name 4502, a trip/assignment name 4503, and a contact traveler/expatriate button 4504. A detailed query results interactive pages 4500 may be as shown in FIG. 45b. Referring to FIG. 45b, the detailed query results interactive page 4500 may include a number of matching legs 4505 indicator, a traveler/expatriate name 4502, a trip/assignment name 4503, the contact traveler/expatriate button 4504, and trip leg detailed information 4507. A full query results interactive pages 4500 may be as shown in FIG. 45c. Referring to FIG. 45c, the full query results interactive page 4500 may include a number of matching legs 4505 indicator, a traveler/expatriate name 4502, a trip/assignment name 4503, the contact traveler/expatriate button 4504, and trip leg detail and contact information 4508.

Figure 47:
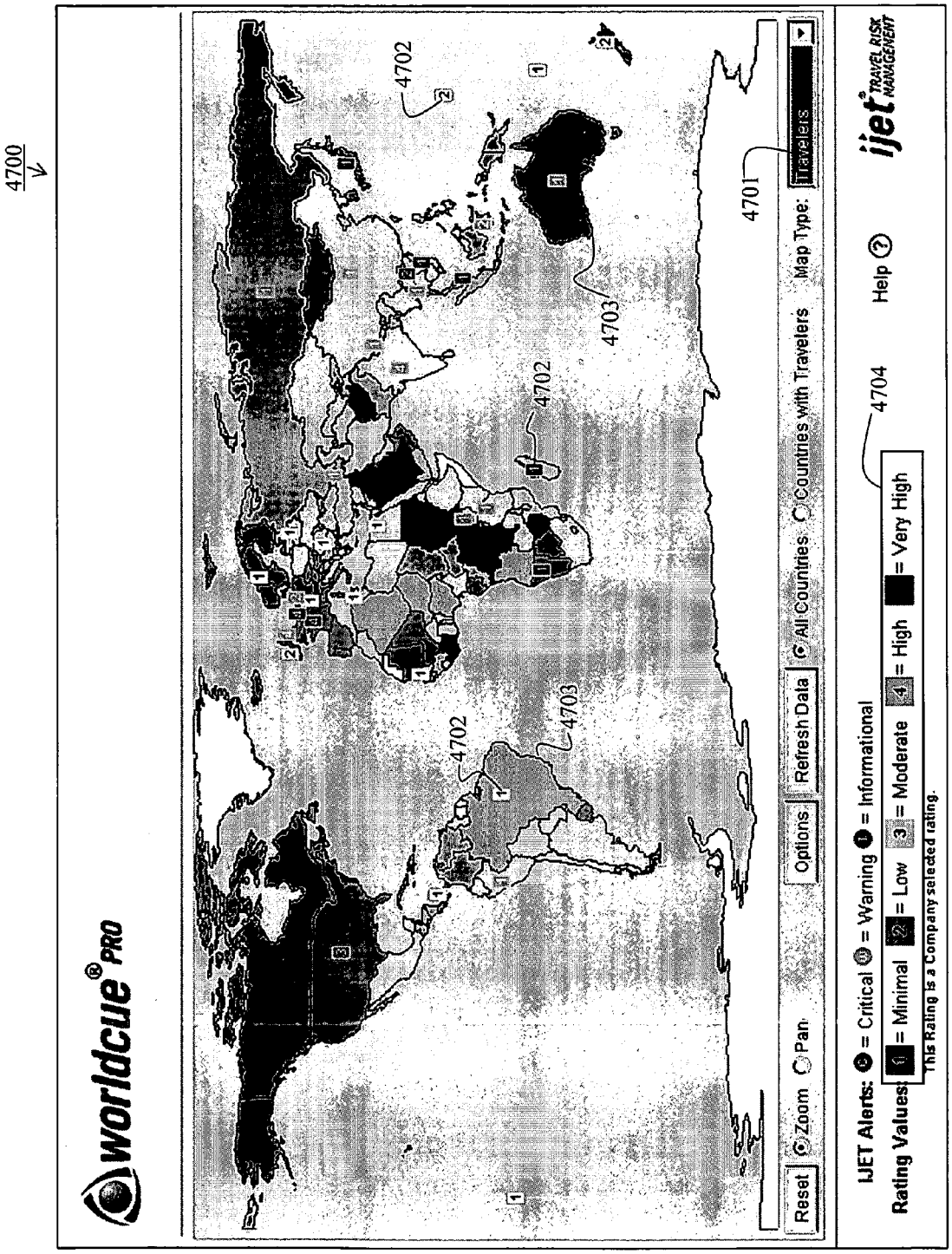
FIG. 47 is an example world map view report in accordance with at least one embodiment.

In addition, as discussed earlier herein, in at least one embodiment the system 400 may output a world map view output report. FIG. 47 is an example of a world map view report 4700 according to at least one embodiment. Referring to FIG. 47, the world map view report 4700 may provide the capability for the user to filter world location data displayed by EXPAT attribute, DEP attribute, and/or VIP attribute using, for example, a pull down menu 4701. Furthermore, in at least one embodiment, the world map view report 4700 may include the capability to provide a "Mouse Over Total Count" output. In particular, upon the user moving a cursor over the total "employee" count (N) 4702 in a country 4703 may cause the system to in response display the number of Travelers (X), Expats (Y), Dependents (Z) and VIPs (A) in a country. The total on the map (N) may be the count of Travelers plus the count of Expats and Dependents in the country. The VIP count may be the count of any Employee profile (Traveler, Expat or Dependent) with the VIP attribute. Further, the world map view report 4700 may include a rating value indication 4704. The rating value indication 4704 may provide an indication of an overall threat or safety level present in a country 4703. In at least one embodiment, the rating value indication 4704 may use different colors to differentiate among varying threat levels. Further, the rating value indication 4704 may reflect the CSAR for a given country.

Figure 46:
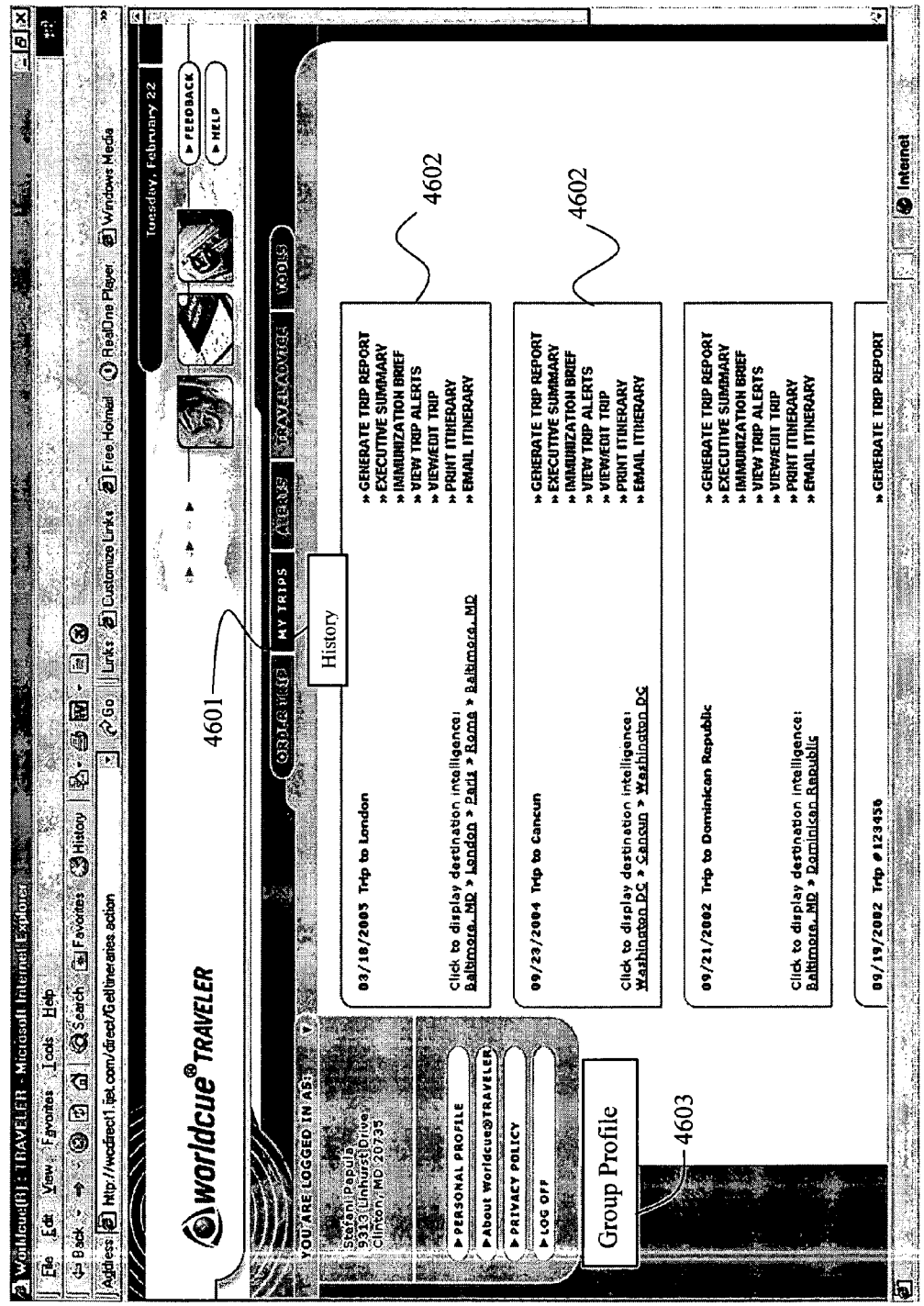
FIG. 46 is an example employee/expatriate personal interactive page in accordance with at least one embodiment.

Furthermore, as discussed earlier herein, in at least one embodiment the system 400 may provide employee/expatriate personal websites or interactive pages. FIG. 46 is an employee/expatriate personal interactive page 4600 in accordance with an embodiment. Referring to FIG. 46, the employee/expatriate personal interactive page 4600 may include a history button 4601, current trips/assignments 4602, and a group profile button 4603. In an embodiment, upon selection of the history button 4601, the system 400 may output an interactive page 4600 containing a list of completed trips/assignments. User selection of the group profile button 4602 may cause the system 400 to output an interactive page 4600 containing a group profile with which the employee/expatriate is associated.

Whereas particular embodiments of this invention have been described above for purposes of illustration, it can be evident to those skilled in the art that numerous variations of the details of the present invention may be made without departing from the invention as defined in the appended claims.

What is claimed is:

1. An expatriate risk management method comprising:
    monitoring a plurality of intelligence sources and receiving intelligence from at least one intelligence source so as to identify one or more risks;
    receiving asset information from at least one asset information source, wherein the asset information includes expatriate profile information; and
    generating a risk assessment report by a computer based on the intelligence and the expatriate profile information so as to enable an expatriate to take evasive action in response to the risk.

2. The expatriate risk management method of claim 1, wherein the asset information further includes a primary profile, a trip and assignment profile, and a travel leg profile.

3. The expatriate risk management method of claim 1, wherein the expatriate profile includes one or more passport countries, a primary e-mail contact address, at least one emergency contact, and a physical description of an expatriate.

4. The expatriate risk management method of claim 3, wherein the expatriate profile further includes personal vehicle information, a head photograph, and a handwriting sample.

5. The expatriate risk management method of claim 4, wherein the expatriate profile further includes a life verification question and answer.

6. The expatriate risk management method of claim 1, further comprising:
    establishing an assignment for the expatriate;
    notifying one or more users of changes in assignment information for the expatriate according to business rules; and
    outputting an electronic message to the expatriate including a link to a risk management website.

7. The expatriate risk management method of claim 1, in which the expatriate is a Very Important Person (VIP).

8. The expatriate risk management method of claim 1, in which the expatriate is a dependent.

9. The expatriate risk management method of claim 6, further comprising:
    outputting a world map display including an indication of the location of one or more expatriates.

10. The expatriate risk management method of claim 1, wherein the asset information includes geographic location information.

11. The expatriate risk management method of claim 10, wherein the geographic location information includes a set of Global Positioning System coordinates associated with an expatriate.

12. The expatriate risk management method of claim 10, wherein the geographic location information includes a set of coordinates for a geographic information system associated with an expatriate.

13. The expatriate risk management method of claim 1, wherein the intelligence includes geocodes.

14. The expatriate risk management method of claim 1, further including assigning a set of expatriate profiles to a group based on at least one common characteristic.

15. An expatriate risk management system comprising:
    at least one travel intelligence source selected form a plurality of travel intelligence sources which are being repeatedly monitored;
    at least one asset information source, wherein the asset information includes expatriate profile information; and
    a risk management module including an analysis engine coupled to the at least one travel intelligence source and the at least one asset information source so as to identify one or more risks, the analysis engine configured to provide a risk assessment report using the expatriate profile information so as to enable an expatriate to take evasive action in response to the risk.

16. The expatriate risk management system of claim 15, further comprising a risk mitigation toolbox configured to identify related intelligence maintained using the at least one travel intelligence source and related information maintained using the at least one asset information source.

17. The expatriate risk management system of claim 15, wherein the asset information includes geographic location information.

18. The expatriate risk management system of claim 17, wherein the geographic location information includes a set of coordinates for a geographic information system associated with an expatriate.

19. The expatriate risk management system of claim 15, wherein the expatriate profile information includes one or more passport countries, a primary e-mail contact address, at least one emergency contact, and an expatriate physical description.

20. The expatriate risk management system of claim 19, wherein the expatriate profile further includes personal vehicle information, a head photograph, a handwriting sample, and a life verification question and answer.

21. An expatriate risk management method comprising:
    monitoring a plurality of intelligence sources and receiving intelligence from at least one intelligence source;
    identifying one or more risks that will adversely affect an expatriates;
    receiving asset information from at least one asset information source, wherein the asset information includes expatriate profile information including primary overseas work and residence location information, and past, present, and future travel information for one or more trips; and
    generating a risk assessment report by a computer_based on the intelligence and the expatriate profile information so as to enable an expatriate to take evasive action from the adverse affect that the risk may have on them, their family, or performing their work.

* * * * *